(12) United States Patent
Auwera et al.

(10) Patent No.: US 7,876,820 B2
(45) Date of Patent: Jan. 25, 2011

(54) METHOD AND SYSTEM FOR SUBBAND ENCODING AND DECODING OF AN OVERCOMPLETE REPRESENTATION OF THE DATA STRUCTURE

(75) Inventors: Geert Van der Auwera, Bonheiden (BE); Ioannis Andreopoulos, Brussels (BE); Adrian Munteanu, Brussels (BE); Peter Schelkens, Willebroek (BE); Jan Cornelis, Overijse (BE)

(73) Assignees: IMEC, Leuven (BE); Vrije Universiteit Brussel, Brussels (BE)

( * ) Notice: Subject to any disclaimer, the term of this patent is extended or adjusted under 35 U.S.C. 154(b) by 1407 days.

(21) Appl. No.: 10/236,009

(22) Filed: Sep. 3, 2002

(65) Prior Publication Data
US 2003/0133500 A1    Jul. 17, 2003

Related U.S. Application Data

(60) Provisional application No. 60/317,429, filed on Sep. 4, 2001, provisional application No. 60/361,911, filed on Feb. 28, 2002.

(51) Int. Cl.
*H04N 7/12* (2006.01)
(52) U.S. Cl. .............. 375/240.11; 375/240.21; 375/240.29
(58) Field of Classification Search ........... 375/240.01, 375/240.08, 240.1, 240.11, 240.18, 240.19, 375/240.21, 240.24, 240.26, 240.29; 382/232; *H04N 7/12*
See application file for complete search history.

(56) References Cited

U.S. PATENT DOCUMENTS 5,719,627 A    2/1998   Ohta
6,222,941 B1*  4/2001   Zandi et al. ................. 382/232

OTHER PUBLICATIONS

Bottreau, et al., "A fully scalable 3D subband video codec," in Proc. ICIP'01, vol. 2, pp. 1017-1020, (2001).
Choi, et al., "Motion-compensated 3-D subband coding of video", IEEE Trans. Image Proc., vol. 8, pp. 155-167, (Feb. 1999).
Karlsson, et al., "Three dimensional sub-band coding of video," in Proc. ICASSP'88, vol. 3, pp. 1100-1103, (1998).
Kim, et al., "Low bit-rate scalable video coding with 3-D set partitioning in hierarchical trees (3-D SPIHT)," IEEE Trans. Circuits Syst. Video Technol., vol. 10, No. 8, pp. 1374-1387, (Dec. 2000).

(Continued)

*Primary Examiner*—Young Lee
(74) *Attorney, Agent, or Firm*—Knobbe Martens Olson & Bear LLP

(57) ABSTRACT

A bit stream representing n-dimensional data structures may be encoded and decoded. A part of the data can be mappable within predefined similarity criteria to a part of the data of another data structure. The similarity criteria may include, a spatial or temporal shift of the data. The data structures are typically sequential video frames such as is used in motion estimation and/or compensation of moving pictures, and a part of the data structure may be a block of data within a frame. The shift may be any suitable shift such as linear translation, rotation, or change of size. Digital filtering may be applied to a reference or other frame of data to generate subbands of a set of subbands of an overcomplete representation of the frame by calculations performed at single rate. The digital filtering may be implemented in a separate filter module or in software.

21 Claims, 19 Drawing Sheets

OTHER PUBLICATIONS

Kingsbury, N., "Shift invariant properties of the dual-tree complex wavelet transform", in Proc. ICASP'99, vol. 3, pp. 1221-1224, (1999).

Kovačević, et al., "Nonseparable multidimensional perfect reconstruction filter banks and wavelet bases for $R^n$,", IEEE Trans. Inform. Theory, vol. 38, No. 2, pp. 533-555, (Mar. 1992).

Lewis, et al., "Video compression using 3D wavelet transforms," Electronics Letters, vol. 26, No. 6, pp. 396-398, (Mar. 15, 1990).

Munteanu, et al., "Wavelet based lossless compression scheme with progressive transmission capability," Int. J. Imaging Syst. Technol., John Wiley & Sons, vol. 10, No. 1, pp. 76-85, (Jan. 1999).

Ohm, J.R., "Three-dimensional subband coding with motion compensation," IEEE Trans. Image Processing, vol. 3, No. 5, pp. 559-571, (Sep. 1994).

Park, et al., "Motion estimation using low-band-shift method for wavelet-based moving-picture coding," IEEE Trans. Image Proc., vol. 9, No. 4, pp. 577-587, (Apr. 2000).

Said, et al., "A new, fast, and efficient image codec based on set partitioning in hierarchical trees," IEEE Trans. Circuits Syst. Video Technol., vol. 6, No. 3, pp. 243-250, (Jun. 1996).

Sari-Sarraf, et al., "A shift-invariant discrete wavelet transform," IEEE Trans. Signal Proc., vol. 45, No. 10, pp. 2621-2626, (Oct. 1997).

Selesnick, I. W., "Hilbert transform pairs of wavelet bases," IEEE Signal Proc. Letters, vol. 8, No. 6, pp. 170-173, (Jun. 2001).

Sivaramakrishnan, et al., "A uniform transform domain video codec based on dual tree complex wavelet transform," in Proc. ICASSP'01, vol. 3, pp. 1821-1824, (2001).

Strang, et al., Wavelets and Filter Banks. Wellesley-Cambridge Press, Wellesly, MA, pp. 337-342, 365-383 and 501-513 (1996).

Taubman, D., "High performance scalable image compression with EBCOT," IEEE Trans. Image Proc., vol. 9, No. 7, pp. 1158-1170, (Jul. 2000).

Taubman, et al., "Multirate 3-D subband coding of video," IEEE Trans. Image Proc., vol. 3, No. 5, pp. 572-588, (Sep. 1994).

Van der Auwera, et al., "Video coding based on motion estimation in the wavelet detail images," in Proc. ICASSP-98, vol. 5, pp. 2801-2804, (1998).

Tourtier, et al., "Motion compensated subband coding schemes for compatible high definition TV coding", Signal Processing: Image Communication, vol. 4, pp. 325-344, (1992).

European Search Report for EP 02 44 7165.8 mailed on Sep. 15. 2004.

Park, H.W., et al. *Motion Estimation Using Low-Band-Shift Method for Wavelet-Based Moving-Picture Coding*. IEEE Transactions of Image Processing, IEEE Inc. New York. 9(4), Apr. 2000: 577-587.

Zaciu, R., et al. *Motion Estimation and Motion Compensation Using an Overcomplete Discrete Wavelet Transform*. Proceedings of the International Conference on Image Processing (ICIP), New York. Sep. 1, 1996:973-976.

Andrepoulos Y., et al. *Wavelet-Based Fully-Scalable Video Coding with In-Band Prediction*. Proceedings of the IEEE Benelus Signal Processing Symposium, Belgium. Mar. 2002: S02-1-S02-4.

Van der Schaar, M., et al. *Fully Scalable 3-D Overcomplete Wavelet Video Coding Using Adaptive Motion Compensated Temporal Filtering*. ISO/IEC JTC1/SC29/WG11. Oct. 2002: 1-8.

Van der Auwera, G., et al. *Scalable Wavelet Video-Coding with In-Band Prediction-the Bottom-Up Overcomplete Discrete Wavelet Transform*. Proceedings 2002 International Conference Image Processing, New York. (2) Sep. 2002:725-728.

\* cited by examiner

FIG. 5
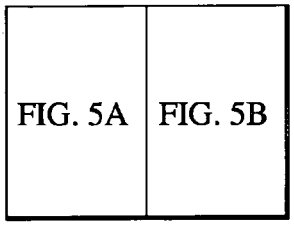
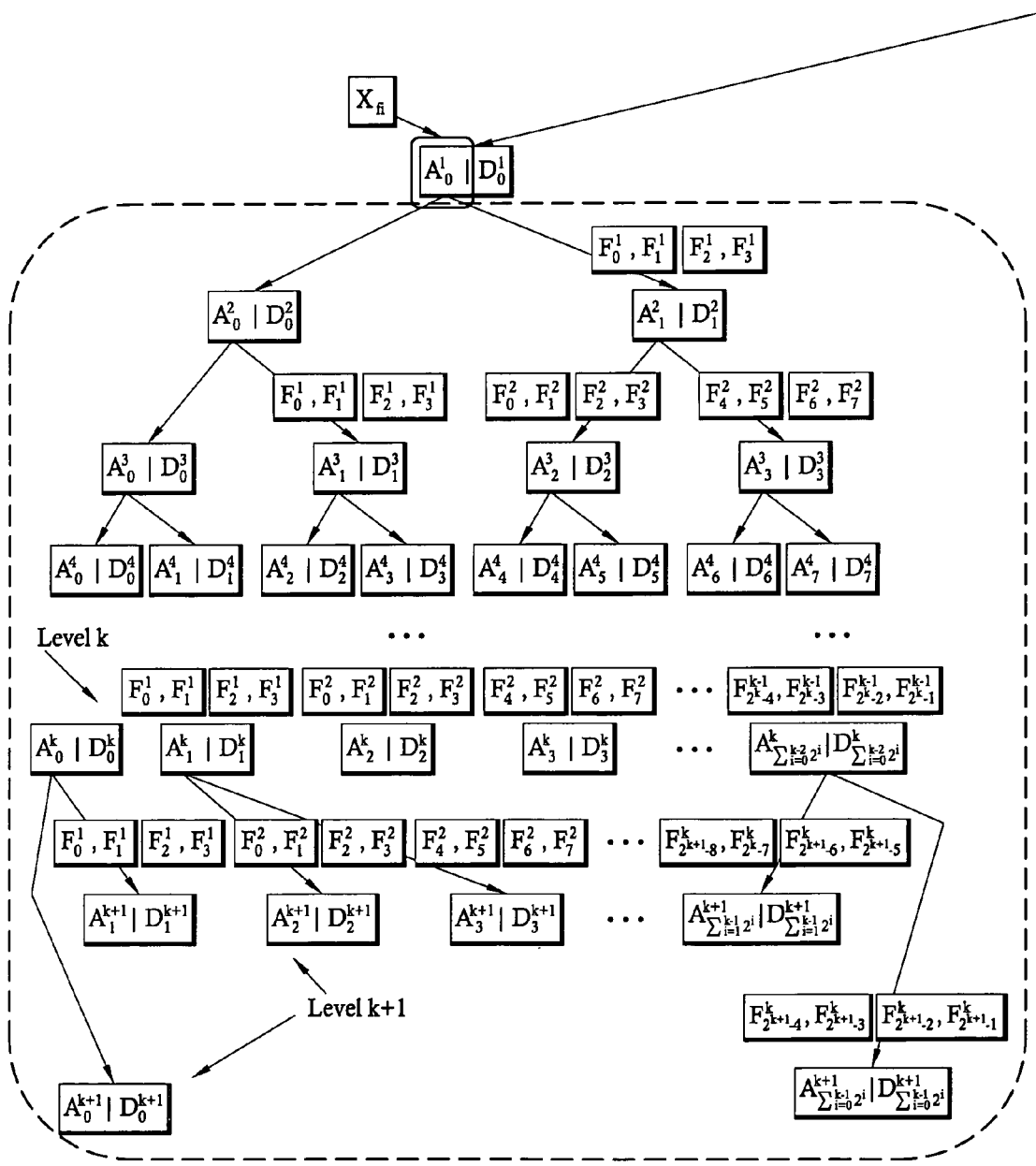
FIG. 5A

METHOD AND SYSTEM FOR SUBBAND ENCODING AND DECODING OF AN OVERCOMPLETE REPRESENTATION OF THE DATA STRUCTURE

RELATED APPLICATIONS

This application claims priority to, and hereby incorporates by reference in its entirety, provisional U.S. Patent Application No. 60/317,429, filed on Sep. 4, 2001, and entitled 'IN-BAND MOTION COMPENSATION WAVELET VIDEO ENCODERS AND DECODERS.' Further, this application claims priority to, and hereby incorporates by reference in its entirety, provisional U.S. Patent Application No. 60/361,911, filed on Feb. 28, 2002, and entitled 'IN-BAND MOTION COMPENSATION WAVELET VIDEO ENCODERS AND DECODERS'.

BACKGROUND OF THE INVENTION

1. Field of the Invention

The invention relates to methods of encoding and decoding a bit stream comprising a representation of a sequence of n-dimensional data structures or matrices, in which n is typically 2. The invention is particularly relevant to in-band motion estimation/motion compensation of video images.

2. Description of the Related Art

Wavelet-based coding has been generally accepted as the most efficient technique for still-picture compression. Wavelet transform schemes are described in detail in "Wavelets and Subbands", by Abbate, DeCusatis and Das, Birkhäuser press, 2002. The insertion of discrete wavelet transforms (DWT) in the new JPEG-2000 coding standard led to increased coding efficiency in comparison to previous standards in this area, and additionally, a number of interesting features including quality and resolution scalability, stemming from the multiresolution nature of the transform are provided. In the videocoding arena, although such scalability features (along with temporal scalability) are highly desired in a number of applications (like video streaming and multimedia over networks), wavelets are employed only for the texture coding in the MPEG-4 standard at present. To address scalability, the MPEG-4 standard adopts the multiresolution DCT approach within a hybrid coding structure, which performs relatively poorly in the complexity versus coding efficiency sense in comparison to wavelets. For these reasons, many authors have begun to explore wavelet-based scalable video-coding schemes. Until recently, the research efforts were mainly directed towards the use of 3-D wavelet decompositions for each input group of frames (GOF) in order to remove the spatial and the temporal redundancies in the video stream. This work was pioneered mainly by Karlsson and Vetterli [1], Lewis and Knowles [2], and more recently by Ohm [3] and Taubman and Zakhor [4] who introduced 3-D decompositions coupled with motion estimation (ME) and motion compensation (MC). More recent algorithms proposed by Kim, Xiong and Pearlman [5] and Bottreau et al [6] support all types of scalability (spatial, quality and temporal by using 3-D versions of the SPIHT algorithm [7] and hierarchical spatial-domain techniques for block-based ME and MC. A wavelet decomposition using a short filter-pair like the Haar transform is performed in the temporal direction to remove the redundancies between successive residual frames. Furthermore, a 2-D wavelet decomposition of the motion compensated sequence (i.e. the residual frames) is performed to reduce spatial redundancies and to compact the energy in the lower-frequency subbands (using classical filters from still-image coding, such as the 9/7 filter-pair). Quality scalability can be obtained with this type of algorithms by coding the three-dimensional transform-domain coefficients using the 3-D extensions [5] of the classical 2-D embedded zerotree-based [7] or block-based wavelet image coders [8][9]. Spatial scalability can be achieved only if the motion compensation is performed in a level-by-level manner. In addition, temporal scalability is inherent to such schemes, since in a multilevel temporal decomposition each resolution reconstructs to a dynamically-reduced frame-rate for the decoded sequence. In conclusion, these schemes algorithmically satisfy the scalability issues, and moreover, they provide good coding performance. Nevertheless, their limitation comes from the implementation point of view because they require a large memory budget for the 3-D transform-application to each GOF, and they distribute almost equally the computational load between the encoder and the decoder, thus making the decoder implementation relatively complex. In addition, the complete codec delay is also increased since the decoder can receive compressed data only after the full 3-D transform is completed in the current GOF of the encoder. Thus they are insufficient for bi-directional communications and for applications where power dissipation and memory are major cost issues, i.e. for portable systems. Other approaches for scalable wavelet video coding which try to reduce the implementation complexity and the system delay follow the classical MPEG-alike hybrid coding-structure, where the ME/MC is also performed in the spatial domain and the DCT transform is replaced with a wavelet transform. Typical examples of such systems are described in [10] and [11]. Although scalability in quality can be achieved by embedded wavelet coding [7][8][9], the main drawback of such techniques is that they fail to take advantage of the inherent multiresolution structure of the wavelet transform to provide drift-free spatial scalability. In addition, there is an inverse transform in the coding loop, resulting to two transform-applications (one forward and one inverse) per frame and per spatial resolution. This may also lead to large codec delays, since no parallelism is possible and each wavelet transform is applied to the complete frame. More recent research efforts tie the classic hybrid coding-structure with motion estimation and compensation techniques in the wavelet domain, leading to the so called in-band ME/MC class of wavelet video codecs [12][13][14][16]. This class of codecs presents a conceptually more appealing approach since the multiresolution features of the transform can be used so as to provide an inherent spatial and quality scalability similar to wavelet-based coding of still images. Hence, if motion compensation is performed in a level-by-level manner in the wavelet subbands, a decoder can decode without drift a video sequence with the horizontal and vertical frame-dimensions having half or quarter-size, since the same information as the encoder is utilized. In addition, the complexity is reduced, since the inverse wavelet transform is removed from the coding loop. However, a major bottleneck for this approach is that the classical dyadic wavelet decomposition (named also as the critically-sampled representation) is only periodically shift-invariant [14][16][17], with a period that corresponds to the subsampling factor of the specific decomposition level. Hence, accurate motion estimation is not feasible by using only the critically-sampled pyramid. Extensive research efforts have been spent in the recent years to overcome the shift-variance problem of the critically sampled wavelet transform. One common alternative is to use near shift-invariant wavelet transforms, and there are many solutions in the literature for this type of transforms. However, their main limitation stems from the fact that they all imply some degree of redundancy in comparison to the critically-sampled decomposition [18][19]. An example of a video-coding scheme that utilizes such a near shift-invariant transform, namely the complex wavelet transform of Kingsbury [18], is presented in [15]. The redundancy factor for this transform is four. Although the coding results obtained with this technique seem promising, the main disadvantage is that after performing in-band motion estimation/motion compensation (ME/MC), the error frames contain four times more wavelet coefficients than the input-frame samples. As a consequence, the error-frame coding tends to be inefficient, thus more complex error-frame coding algorithms should be envisaged to improve the coding performance. With this respect, it is important to notice that there is a trade-off between critical sampling implying efficient error-frame coding and redundancy of the transform implying near shift invariance. A completely different solution breaking this trade-off, that is, overcoming the shift-variance problem of the DWT while still producing critically sampled error-frames is the low-band shift method (LBS) introduced theoretically in [16] and used for in-band ME/MC in [14]. Firstly, this algorithm reconstructs spatially each reference frame by performing the inverse DWT. Subsequently, the LBS method is employed to produce the corresponding overcomplete wavelet representation, which is further used to perform in-band ME and MC, since this representation is shift invariant. Basically, the overcomplete wavelet decomposition is produced for each reference frame by performing the "classical" DWT followed by a unit shift of the low-frequency subband of every level and an additional decomposition of the shifted subband. Hence, the LBS method effectively retains separately the even and odd polyphase components of the undecimated wavelet decomposition [17]. The "classical" DWT (i.e. the critically-sampled transform) can be seen as only a subset of this overcomplete pyramid that corresponds to a zero shift of each produced low-frequency subband, or conversely to the even-polyphase components of each level's undecimated decomposition. The motion vectors can be detected by searching directly in the overcomplete wavelet representation of the reference frame to find the best match for the subband information present in the critically-sampled transform of the current frame. The motion compensation for the current frame is then performed directly in its critically-sampled decomposition. Hence, the produced error-frames are still critically-sampled. In comparison to image-domain ME/MC, the in-band ME/MC results of [14] demonstrate competitive coding performance, especially for high coding-rates.

SUMMARY OF THE INVENTION

The invention provides methods and apparatus for coding and/or encoding a bit stream comprising a representation of a sequence of n-dimensional data structures or matrices, in which n is typically 2. A part of the data of one data structure of the sequence can be mappable within predefined similarity criteria to a part of the data of a another data structure of the sequence. The invention also includes decoders and encoders for coding such a bitstream, e.g., a video signal for use in motion estimation and/or compensation as well as filter modules for digital filtering of such bit streams and computer program products for executing such filtering as well as subband coding methods. The similarity criteria may include, for instance, a spatial or temporal shift of the data within an image of a video signal such as is used in motion estimation and/or compensation of moving pictures, e.g., video images as well as coders and encoders for coding such a bitstream, e.g., a video signal for use in motion compensation and/or estimation. The data structures are typically video frames and a part of the data structure may be a block of data within a frame. The shift may be any suitable shift such as a linear translation at any suitable angle, a rotation of the data or change of size such as zooming between a part of the data in one data structure and a part of the data in another data structure of the sequence. The mapping may be to earlier and/or later data structures in the sequence. The data structures are typically sequential frames of a video information stream.

The invention provides a method of digital encoding or decoding a digital bit stream, the bit stream comprising a representation of a sequence of n-dimensional data structures, the method being of the type which derives at least one further subband of an overcomplete representation from a complete subband transform of the data structures, the method comprising:

providing a set of one or more critically subsampled subbands forming a transform of one data structure of the sequence;

applying at least one digital filter to at least a part of the set of critically subsampled subbands of the data structure to generate a further set of one or more subbands of a set of subbands of an overcomplete representation of the data structure, wherein the digital filtering step includes calculating at least one further subband of the overcomplete set of subbands at single rate. In the method a part of the data of one data structure of the sequence can be mapped within predefined similarity criteria to a part of the data of a another data structure of the sequence. The digital filter may be applied only to members of the set of critically subsampled subbands of the transform of the data structure. The method may use a digital filter having at least two non-zero values. The bit stream may be a video bit stream. The digital subband transform may be a wavelet. The method may be used in motion compensation and/or motion estimation of video or other signals which in turn allows compression of the coded video signals. The motion estimation may be carried out in the spatial domain or in the subband transform domain. In the motion estimation a current frame is compared with a reference frame which may be an earlier or later frame. The result of the motion estimation is the selection of one or more subbands from the set of subbands making up the overcomplete representation which is or are a best approximation to a shifted version of the reference video frame. This or these selected subbands are then used for motion compensation. To make the selection all the subbands of the overcomplete representation may be generated, or alternatively, if the motion estimation is known, e.g., from the spatial domain, only the relevant subband or subbands need to be generated.

The invention provides a coder for digital subband coding of a bit stream, the bit comprising a representation of a sequence of n-dimensional data structures, the coder being of the type which derives at least one further subband of an overcomplete representation from a complete subband transform of the data structures, the coder comprising:

means for providing a set of one or more critically subsampled subbands forming a transform of one data structure of the sequence;

means for applying at least one digital filter to at least a part of the set of critically subsampled subbands of the data structure to generate a further set of one or more further subbands of a set of subbands of an overcomplete representation of the data structure, wherein the means for applying at least one digital filter includes means for calculating at least a further subband of the overcomplete set of subbands at single rate. The coder may be used in motion compensation and/or motion estimation of video or other signals which in turn allows compression of the coded video signals. A motion estimation module may carry out motion estimation in the spatial domain or in the subband transform domain. In the motion estimation module means for comparing a current frame with a reference frame is provided; The reference frame may be an earlier or later frame. The motion estimation module also comprises means for selection of one or more subbands from the set of subbands making up the overcomplete representation which is or are a best approximation to a shifted version of the reference video frame. A motion compensation module uses this or these selected subbands for motion compensation. To make the selection means for generating all the subbands of the overcomplete representation may be provided, or alternatively, if the motion estimation is known, e.g., from the spatial domain, only means for generating the relevant subband or subbands need to be provided.

In accordance with the invention a decoder may receive data structures which are data frames and the set of critically subsampled subbands of the transform of the data structure may define a reference frame, and the decoder further comprises:

means to map a part of the data of one data structure of the sequence to a part of the data of a another data structure of the sequence within predefined similarity criteria and to generate a motion vector for that part and means to select a further subband of the overcomplete set of subbands in accordance with the motion vector. The decoder may further comprising means to provide a motion compensated representation of the reference frame using the selected further subband of the overcomplete set of subbands.

The invention also provides a computer program product comprising executable machine readable computer code which executes at least one digital filter for application to at least a part of a set of critically subsampled subbands of a data structure to generate a further set of one or more further subbands of a set of subbands of an overcomplete representation of the data structure, wherein the application of the at least one digital filter includes calculating at least a further subband of the overcomplete set of subbands at single rate. The computer program product may be stored on a data carrier.

The invention also includes a digital filter module comprising means for application of a digital filter to at least a part of a set of critically subsampled subbands of a data structure to generate a further set of one or more further subbands of a set of subbands of an overcomplete representation of the data structure, wherein the application of the at least one digital filter includes calculating at least a further subband of the overcomplete set of subbands at single rate.

It is an object of the invention to provide a method and apparatus for performing a subband transform which is easy to implement than known methods and apparatus.

It is also an object of the invention to provide a method and apparatus for performing a subband transform which requires less calculation steps than conventional methods and apparatus.

It is still a further object of the invention to provide a method digital filtering and apparatus for digital filtering to generate an overcomplete representation which is easy to implement than known methods and apparatus.

It is still a further object of the invention to provide compauter program products for carrying out a method for performing a subband transform when executed on a computing device.

Figure 1A:
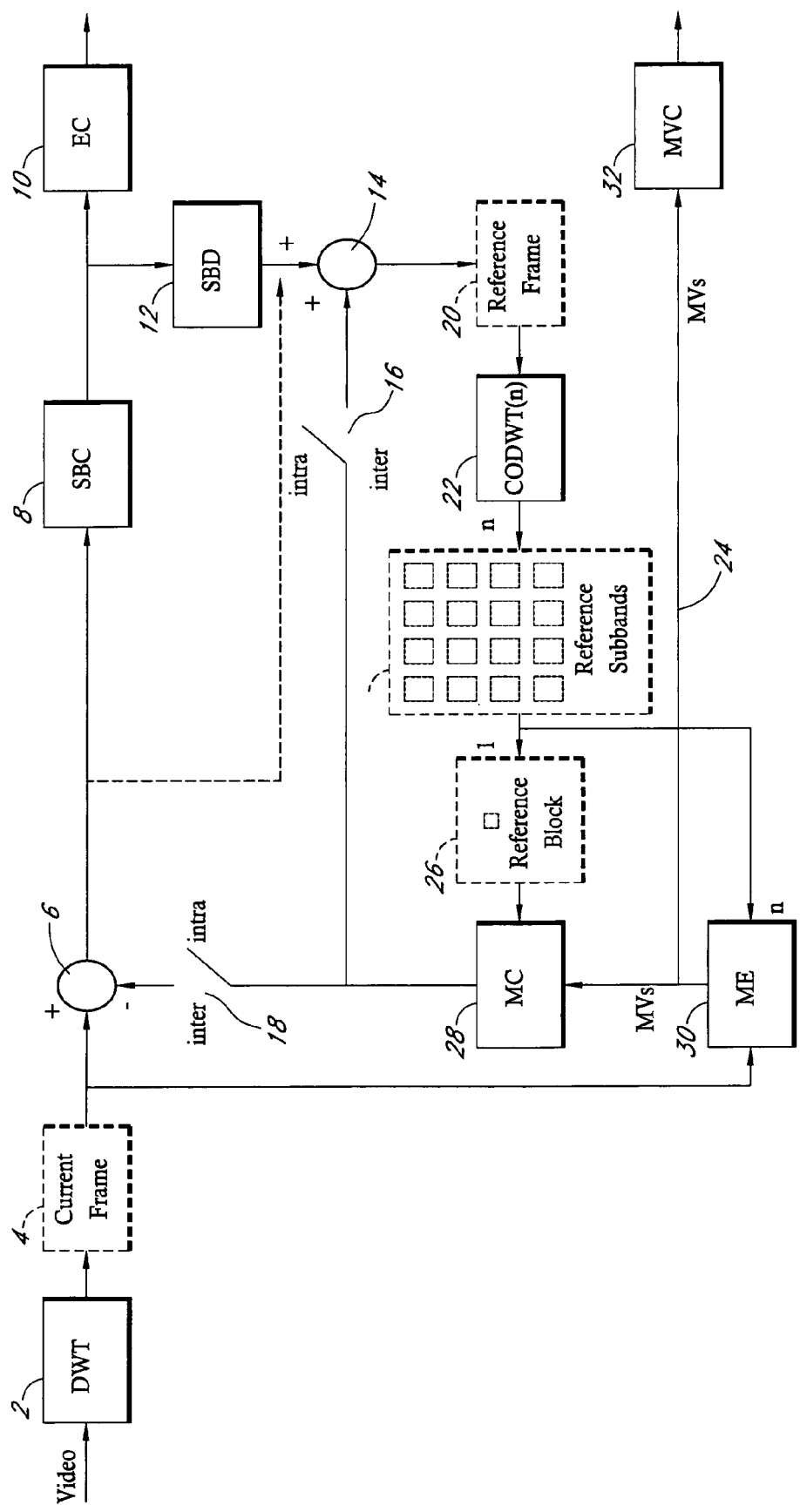
FIG. 1a is an encoder and FIG. 1b is a decoder with which embodiments of the invention may be used.

| DEFINITIONS: | |
|---|---|
| DWT: | Discrete Wavelet Transform |
| SBC: | Subband Coder |
| SBD: | Subband Decoder |
| EC: | Entropy Coder |
| CODWT: | Complete-to-Overcomplete DWT |

-continued

| DEFINITIONS: | |
|---|---|
| ME: | Motion Estimation |
| MC: | Motion Compensation |
| MVs: | Motion Vectors |
| MVC: | Motion-Vector Coder |
| IDWT: | Inverse DWT |
| ED: | Entropy Decoder |
| MVD: | Motion-Vector Decoder |

Single rate: a calculating a subband without upsampling or downsampling.

Level: refers to a level of a subband pyramid containing the subbands of the subband transform of a data structure such as an image Level-by-level encoding: in a multiresolutional, multilevel coding scheme, encoding each level of the subband transformed data structure to allow transmission of that level (resolution) independently of other levels (resolutions).

Level-by-level decoding: in a multiresolutional, multilevel coding scheme, decoding each level of the received bit stream to allow display of that level (resolution) independently of other levels (resolutions).

Scalability: the ability to decode a coded bitstream to different resolutions

Temporal scalability: ability to change the frame rate to number of frames ratio in a bitstream of framed digital data Quality scalability: the ability to change to the quality of a display Overcomplete representation Critically-sampled representation: a transform having the same number of coefficients as the data structure being transformed LBS: Low-band shift Baseline quality-layer: minimum information to be transmitted to provide a reconstruction of a data structure in the receiver.

DETAILED DESCRIPTION OF ILLUSTRATIVE EMBODIMENTS

The invention will be described with reference to certain embodiments and drawings but is not limited thereto but only by the attached claims. In the following reference is made to subband transforms. Included within these techniques are: wavelet, Discrete Fourier transform, Fast Fourier transform. In the following the invention will mainly be described with reference to in band motion compensation and estimation of framed data but the invention may find wider application than this application alone. Further, in the following the invention will be illustrated with respect to linear translations between parts of video frames, but the invention is not limited to linear translation models for motion compensation and estimation.

During encoding of video digital signals an original video image information stream is transformed into another digital representation. This digital representation may be stored on a suitable data carrier or transmitted to a remote location. The aim of coding is to provide an advantage, e.g., data compression and/or scalability of the data stream. The aim of decoding such an encoded signal is to reconstruct the original video information as economically and as well as possible, e.g., a lossless reconstruction. The arrays of pixels of such close frames often contain the same luminance and chrominance information except that the coordinates of pixel positions in the arrays are shifted or displaced. Shifting in position within the array is a function of time and defines a motion of these pixels within the arrays. The motion may be approximated by a motion vector. The encoding is based on the fact that at least parts of temporally close video frames either in the forward or backward direction are often quite similar except for motion. This similarity means that repeat transmission of this moving data in each frame is not required, it is only necessary to transmit a code of a shift of the data from a previous or subsequent frame, e.g., a motion vector.

Typically, the motion used for motion estimation and compensation is a linear translation, however more complex motions or changes in pixel distributions can be considered as a basis for motion compensation and estimation. Hence, the invention includes within its scope alternative motion estimation and compensation models, e.g., linear translations, rotational translation of pixels, zooming of one part of an image compared to another. Hence, the model used may be generalized to say that there is a mapping between a part of one video frame and another video frame, this mapping being determined by predefined similarity criteria, that is the criteria which are to be used to determine that there is similarity between the parts of the two frames. This similarity may include linear translation, rotational translation, zooming between frames.

In one aspect the invention provides an approach for in-band ME/MC wherein prediction-filters are used. The algorithm can achieve mathematically the same result as the LBS algorithm of [14]. The LBS algorithm is suitable for coding and/or encoding a bit stream comprising a representation of a sequence of n-dimensional data structures, in which n is typically 2 or 3, and where a part of the data of one data structure of the sequence maps within predefined similarity criteria to a part of the data of a another data structure of the sequence and is of the type which derives at least one further subband of an overcomplete representation from a complete subband transform of the data structures. The use in accordance with embodiments of the invention of prediction-filters for in-band ME/MC overcomes any shift-variance problem of the subband transform such as DWT. Critically sampled error-frames are produced. With this algorithm, the overcomplete wavelet representation of each reference frame is produced directly from its critically sampled wavelet representation by using a set of prediction filters. In this way, there is no need to reconstruct the spatial domain representation of each reference frame, and to produce from it the corresponding overcomplete representation, as is the case of the LBS method. When used in a level-by-level manner (i.e. ensuring spatial scalability), this is an advantage over the LBS method. Level-by-level processing provides scalability as each level may be transmitted and/or received and processed independently. Fast level-by-level calculation of the overcomplete discrete wavelet transform starting from the critically sampled pyramid is disclosed including a generalized form for the prediction filters for an arbitrary number of decomposition levels. Some symmetry properties between the prediction filters are disclosed, specifically, for biorthogonal point-symmetric filter-pairs that are the most-performing types of wavelets in still-image coding, leading to efficient implementation. A comparison from the computational point of view of the invention with the LBS method is given.

Figure 15:
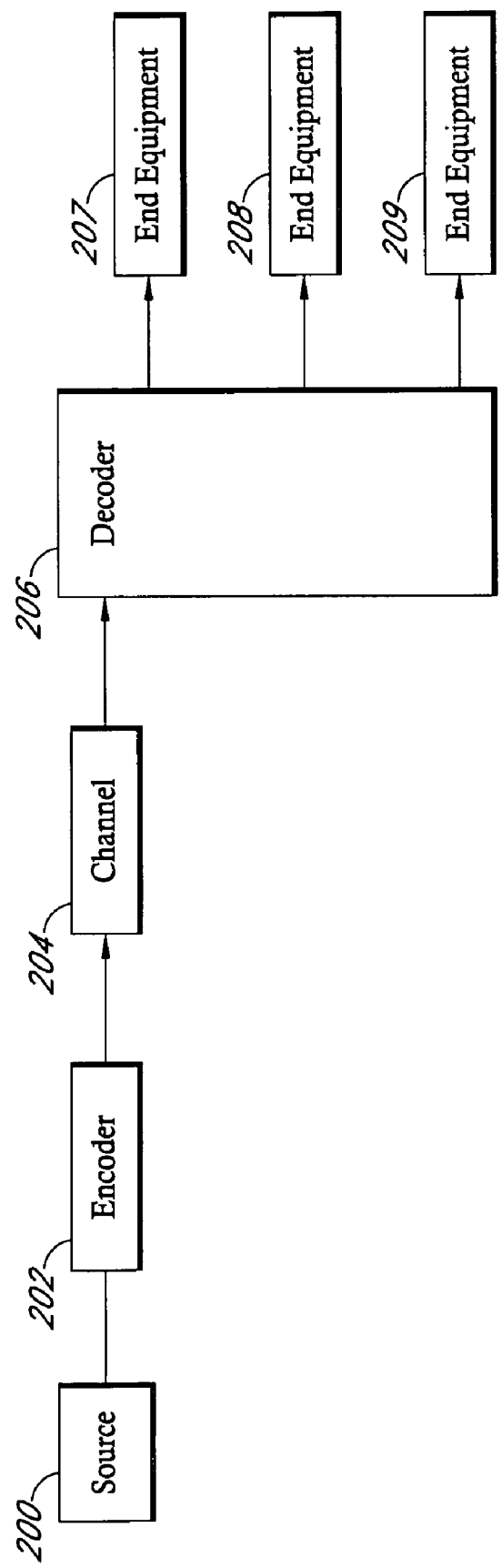
FIG. 15 shows a schematic representation of a telecommunications system to which the invention may be applied.

An example of a communication system 210 which can be used with the invention is shown in FIG. 15. It comprises a source 200 of information, e.g., a source of video signals such as a video camera or retrieval from a memory. The signals are encoded in an encoder 202 resulting in a bit stream, e.g., a serial bit stream which is transmitted through a channel 204, e.g., a cable network, a wireless network, an air interface, a public telephone network, a microwave link, a satellite link. The encoder 202 forms part of a transmitter or transceiver if both transmit and receive functions are provided. The received bit stream is then decoded in a decoder 206 which is part of a receiver or transceiver. The decoding of the signal may provide at least one of spatial scalablity, e.g., different resolutions of a video image are supplied to different end user equipments 207-209 such as video displays; temporal scalability, e.g., decoded signals with different frame rate/frame number ratios are supplied to different user equipments; and quality scalability, e.g., decoded signals with different signal to noise ratios are supplied to different user equipments.

Figure 1B:
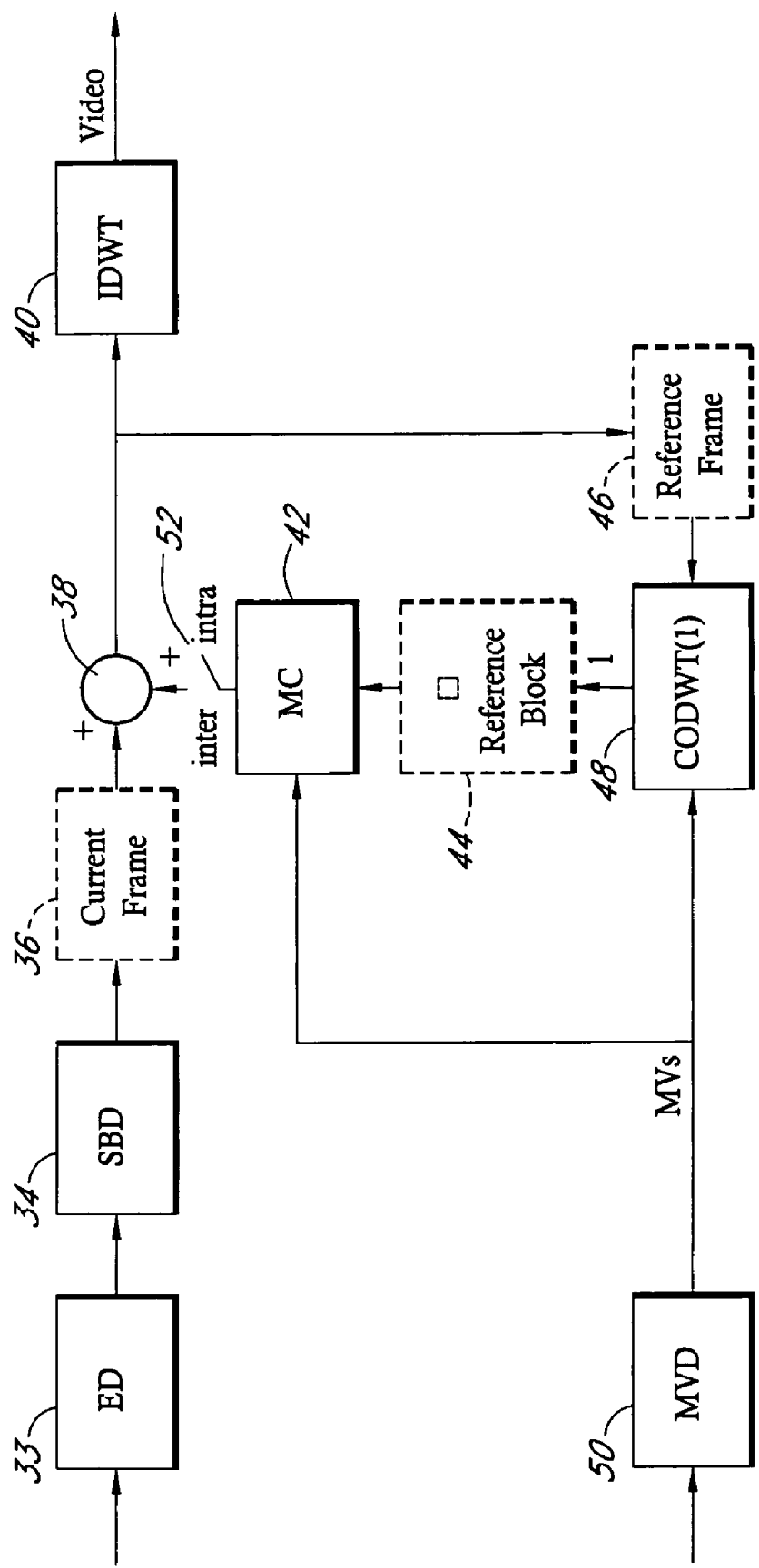

A potential architecture of a wavelet-based video codec performing in-band motion estimation/motion compensation (ME/MC) with which a first embodiment of the invention may be used is given in FIG. 1 whereby FIG. 1a shows the encoder and FIG. 1b the decoder. This architecture can be seen as an extension of the "classical" architecture of transform-based video coders/decoders. In this scheme there are two modes of operation as determined by the setting of the switches 16, 18, as explained in the following. In the intra-frame coding mode, the current input frame 4 is first of all wavelet transformed using a suitable compression technique such as the DWT module 2 of FIG. 1, the resulting wavelet subbands are quantized and encoded using an embedded intra-band coding technique, (SBC module 8) and the result is entropy-coded using the EC module 10. The embedded intra-band coding and the entropy coding are performed in a level-by-level fashion to guarantee resolution scalability. Furthermore, this process is performed until the target bit-rate for the currently coded frame is met. The second coding mode is the inter-frame coding mode, where each reference frame is first of all wavelet transformed using the DWT module 2 of FIG. 1. As in the previous mode, the subbands of every decomposition level are encoded using the intra-band embedded coding technique in SBC module 8 and entropy-coded in EC module 10. The SBD module 12 performs the decoding operation and produces the base quality layer of the reference frame, which is stored in a memory buffer 20. The complete-to-overcomplete DWT module 22 (CODWT) produces, for each level, the set of one or more subbands of the overcomplete representation of the reference frame starting from the subbands of the critically sampled pyramid. These are stored in a buffer memory 24. The resulting n subbands per level are then used during the motion estimation which is performed by the block-based ME module 30 to find the best match between the subband-information present in the current frame, received at module 30 from the output of DWT module 2, and the overcomplete representation of the reference frame received from the buffer 24. A block 26 is selected using selecting means in the motion compensation module 28 or the motion estimation module 30 from the buffered subbands of the reference frame that represents the best match is used for the motion-compensation process which is performed by the MC module 28. The resulting motion-vectors of every decomposition level are sent to the motion-vector coder (MVC module 32). The output of the motion compensation is an error frame in the wavelet domain which is generated by subtracting the output of MC module 28 from the subband transformed current frame in subtractor 6. This error frame is intra-band embedded coded in SBC module 8 and entropy-coded in EC module 10 in a level-by-level fashion. To generate the reference frame 20 from the subband decoded intra-band coded signal the output of SBD 12 is added to the output from MC 28 in adder 14. This reference frame is used in the next iteration. The dashed line shows a less preferred embodiment in which the error frame is supplied directly to the adder 14.

As shown in FIG. 1b, the decoder operates exactly in the mirror fashion, the intra-frame or inter-frame decoding being determined by the switch 52. Hence, in the intra-frame mode, the resolution-scalable coded frame is received and the bitstream parsing can cease at any resolution or quality level (provided that the minimal base-quality layer is received). The next operations are entropy decoding in ED module 32 followed by subband decoding in SBD module 34 and inverse DWT in IDWT module 40. At this stage, the frame corresponding to the specific operational settings e.g., quality and resolution, is reconstructed.

In the inter-frame mode, the error-frame is received at the desired quality level at the ED module 32 and the corresponding motion vectors of each decomposition level are received and decoded as well by a MVD module 50. Similar to the encoder, the complete-to-overcomplete DWT of the reference frame 46 is constructed in a level-by-level manner in CODWT module 48. The key difference is that since the motion vectors are known, only individual blocks 44 needed for the motion compensation which is to be performed in module 42, are calculated by the CODWT module 48. In the motion-compensation phase carried out in module 42, these blocks 44 are used to reconstruct the predicted frame. The predicted frame is added to the error-frame 36 of the current decomposition level in adder 38. To ensure drift-free quality scalability, the CODWT unit 48 operates on the base-quality layer for every decomposition level. Hence the decoder reconstructs the identical overcomplete representation per level as the encoder. In this manner, the decoder is free to stop decoding at any resolution or quality level.

From the description of the previous subsection, it can be seen that the CODWT module 22, 48 is a key part of the ME/MC subsystem of the scalable video-codec.

Figure 2:
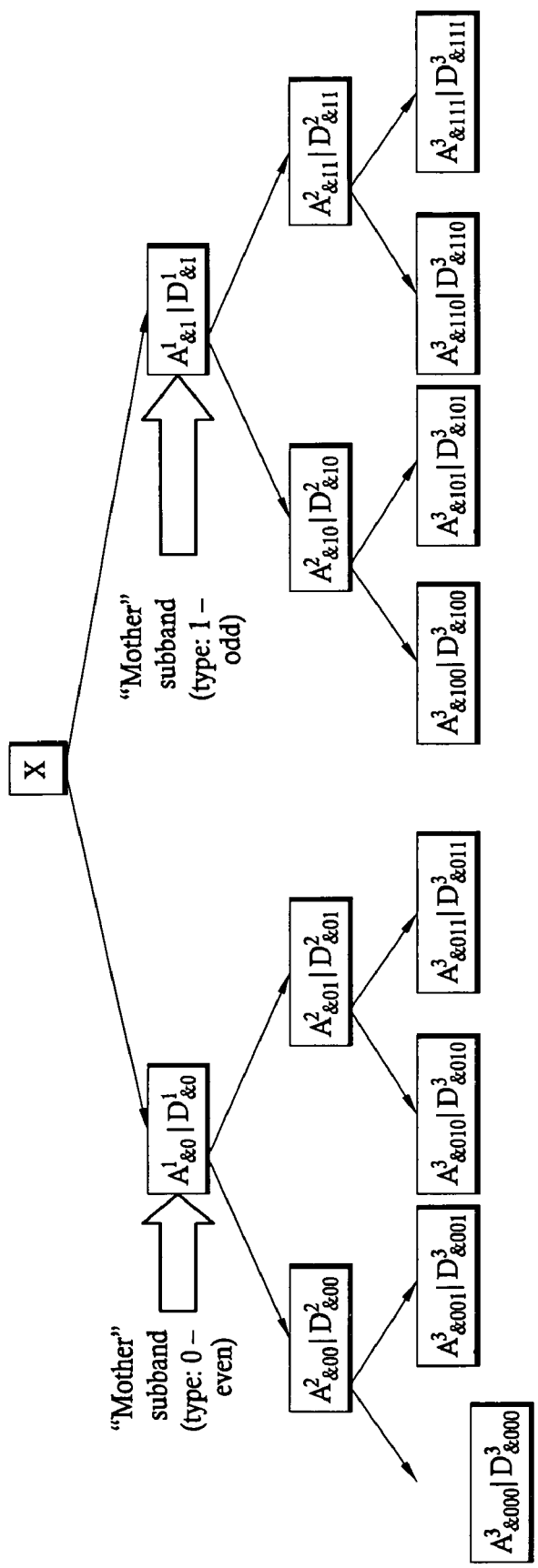
FIG. 2 shows a representation of a three-level overcomplete DWT decomposition.
Figure 3:
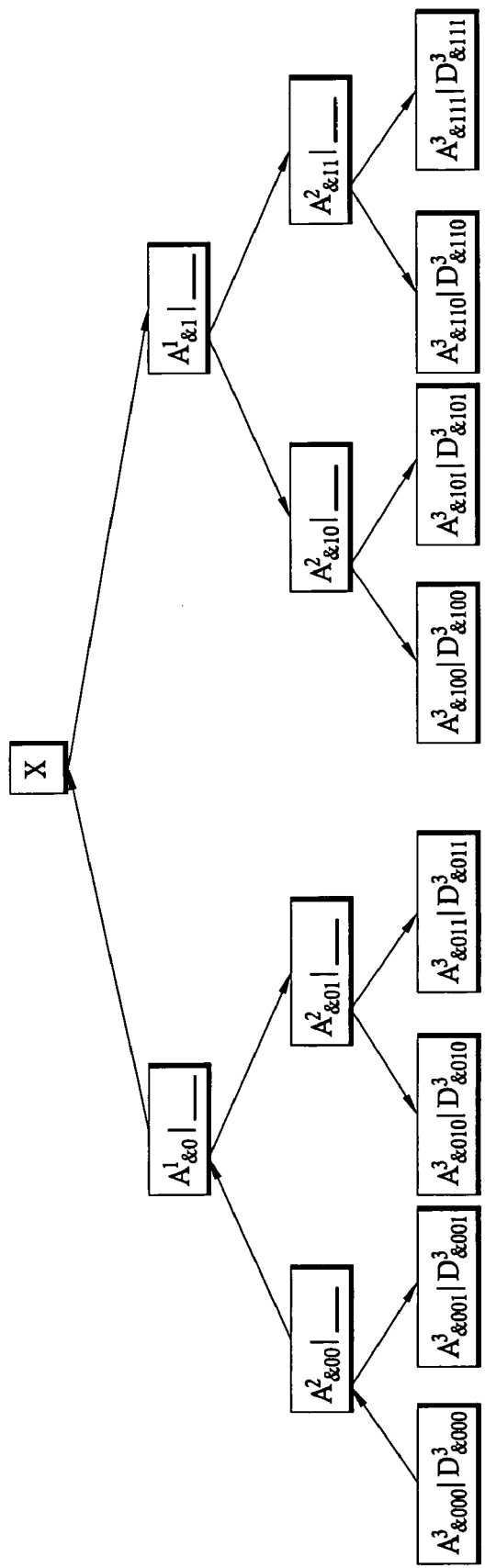
FIG. 3 shows an example of the derivation of the subbands of the overcomplete wavelet transform of level 3 using the conventional LL-LBS method. In a scalable coding framework, only subbands $A_0^3, D_0^3$ are available at this level, since subbands $D_0^2$ and $D_0^1$ cannot be received by the decoders of this resolution.

FIG. 2 shows an example of the 1-D overcomplete pyramid for three decomposition levels as constructed by the LBS method. Initially, the input signal X is decomposed into two sets by retaining separately the even or odd polyphase components of the undecimated decomposition, or equivalently performing two "classical" wavelet decompositions; one in the zero-shifted input signal and one in the unit-shifted input. Each of the low-frequency subbands of the two decompositions is further analyzed into two sets by performing again an undecimated wavelet decomposition and retaining separately the even and odd polyphase components and so on. The 2-D overcomplete pyramid is constructed in the identical manner, with the application of the LBS method in the input-subband rows and the columns of the results. Hence, to facilitate the explanation, the description in the following is restricted to the one-dimensional case for clarity's sake, with the extension in two dimensions following the row-column approach. By definition $S_0$, $S_1$ denote the even and odd polyphase components of signal S respectively (named also type 0 and type 1). Each low-frequency (average) subband of decomposition level i is denoted as $A_x^i$, where x is a binary representation that shows the subband type, with the Most-Significant Bit (MSB) denoting the "Mother"—subband type and the Least-Significant Bit (LSB) denoting the current-subband type. For example, subband $A_{\&011}^3$ denotes the low-frequency subband of level 3 that has been produced by retaining the even polyphase components of decomposition level 1 and the odd polyphase components of levels 2 and 3. Similar notations apply for the high-frequency (detail) subbands $D_x^1$. Note how the LSB of the binary representation denotes a "turn" in the pyramid (0 for "left", 1 for "right") in comparison to the previous-level subband ("parent"). Thus, for every decomposition level, the subscript bits are shifted to the left and a new LSB is entered, depending on the polyphase grid that is retained from the decomposition (even, odd). In a scalable-coding framework, the key-difference is that the subband-transmission and decoding occur in a bottom-up manner, every decoder receives the coarsest-resolution subbands first (i.e. subbands $A_0^3, D_0^3$) and is free to stop the bitstream-parsing at any time after the baseline quality-layer has been received for each level. In this way, the quality and resolution of the decoded video can vary accordingly. Under such a progressive decoding environment, the LBS method is modified to perform a level-by-level construction of the overcomplete representation (denoted by LL-LBS), starting from the subbands of the critically-sampled transform of each coded level. Such a situation is illustrated in FIG. 3 for the LL-LBS method applied on a 3-level decomposition; firstly, three inverse wavelet transforms are performed starting from the subbands $A_0^3, D_0^3$, as shown in the left part of FIG. 3. Notice that in this situation, the subbands $D_0^2$ and $D_0^1$ are not present (i.e. are not received at the decoder site), and as a consequence, the subbands shown in FIG. 3 are not identical with the corresponding ones of FIG. 2. Subsequently, from the highest-resolution signal X, all the subbands $A_i^3, D_i^3$, $i\in[1,7]$, $i\in Z$ are constructed by performing the forward transforms shown in the rest of FIG. 3. The low-frequency subbands $A_i^k$ are constructed only if k is the coarsest-resolution level of the decomposition. In all the other cases, only the high-frequency subbands $D_j^k$, with $j\in[1,2^k-1]$, $j\in Z$ are needed. This is imposed by the fact that no motion estimation or compensation is performed for the subband $A_0^k$ if k is not the coarsest decomposition level. Hence, in the example if after the construction of the overcomplete transform of level 3, one more resolution level is received (i.e. subband $D_0^2$), then the LL-LBS operates again in the same fashion, but constructs only the subbands $D_j^2$, with $j\in[1,3]$, $j\in Z$. Although approximations of the subbands $D_j^2$ can already be calculated during the calculations of level 3, at this time the subband $D_0^2$ is not available; as a consequence, these approximations are obtained based only on the subband $A_0^2$ and hence they do not have the best accuracy possible. This observation indicates a significant difference between the LL-LBS and the LBS methods: because of the bottom-up level-by-level construction, the high-frequency subbands of the higher-resolution levels (levels 2 and 1 in the example) are not available when the current level is processed (level 3). Hence, the resulting overcomplete representation of each level obtained with the LL-LBS method is not identical to the one constructed with the LBS algorithm. Actually, in its original form, the LBS algorithm creates the overcomplete representation under the assumption that all the subbands of the critically sampled pyramid are available, and this is not always the case in a resolution-scalable framework. This means that the LBS method requires the receipt of all resolutions in order to create the overcomplete representation. This places a limitation on the time required to decode an image—all resolutions should be available. However, once all the information has been made available at the decoding time, the level-by-level LBS produces the subbands of the overcomplete representation with the best accuracy possible while simultaneously ensuring drift-free, full resolution-progressive decoding (i.e. spatial scalability).

In accordance with one embodiment of the invention, it is not necessary to receive the highest resolution information in order to generate a useful overcomplete representation. In accordance with an aspect of the invention, the overcomplete representation can be obtained by the application of prediction filters. An example of the derivation of the subbands of level 3 with the prediction-filters method is given in FIG. 4. It can be noticed that the overcomplete representation is "predicted" in a level-by-level manner using the sets of filters $F_R^Q$, with $Q\in[1,3], Q\in Z$ and $R\in[0,15], R\in Z$ indicated under the subband-pairs of FIG. 4. However, no upsampling or downsampling is performed with this algorithm and this leads to substantial complexity reductions. Where no upsampling or downsampling is used, the calculation is said to be at single rate. The form and utilization of filters $F_R^Q$ is explained in the following, where, in accordance with an embodiment of the invention, the general proof for an arbitrary-level complete-to-overcomplete transform is presented. In the same manner as in the LL-LBS method, for the higher-resolutions (decomposition levels 2 and 1 in the example of FIG. 3), only the high-frequency subbands are constructed. Also, if applied in a level-by-level manner, both methods produce identical results. In the general case of an overcomplete representation with k+1 levels shown in FIG. 5, the binary representation of the subband indices becomes impractical, and thus they are simply denoted with their decimal equivalent, in the form $$\sum_{i=0}^{k} b_i 2^i,$$

with $b_i = \{0,1\}$. In addition, as shown in FIG. 2, the overcomplete pyramid is separated into the "left-half" and "right-half" pyramids respectively. These parts correspond to the two "Mother" subbands containing the even and odd-polyphase components respectively of the undecimated decomposition of the original signal. To conclude the notations, in the Z-plane expressions, frequently $H(z), A_4^3(z), F_2^1(z)$ are simply denoted as $H, A_4^3, F_2^1$ respectively, to reduce the expressions' length, while $(H)_0, (H)_1$ denote the even or odd polyphase components (similar applies for $H_{i,0}, H_{i,1}$ for filter $H_i$).

In this section a generic framework is presented for an embodiment of a prediction filter. This framework allows the complete to overcomplete transform derivation for an arbitrary decomposition level. The mathematical derivations are performed for the 1-D overcomplete representation; nevertheless, as it will be shown later, the extension to 2-D is straightforward following the row-column approach or equivalent thereto. Firstly, the subbands of decomposition level k of the overcomplete representation are expressed as a function of the critically-sampled wavelet decomposition (i.e. the subbands $A_0^k, D_0^l$, with $l\in[1,k], l\in Z$). From this generic mathematical formulation, the level-by-level overcomplete transform of level k is readily extracted as a special case, in which the overcomplete subbands are calculated using only the critically-sampled representation of the same level. Finally, the symmetry properties of the prediction filters for every decomposition level are given, which allow their efficient implementation.

Derivation of Subbands of Decomposition Level k from the Critically-Sampled Pyramid of Level k—the Prediction Filters in Accordance with an Embodiment of the Invention The proof of the general form of the invented prediction filters is as follows in which the prediction filters for the decomposition levels E=1,2,3 are derived. The proposition P(1) corresponding to E=1 is:

$$P(1): \begin{cases} A_1^1 = F_0^1 A_0^1 + F_1^1 D_0^1 \\ D_1^1 = F_2^1 A_0^1 + F_3^1 D_0^1 \end{cases}. \tag{1}$$

For level E=2, the set of prediction propositions P(2) is:

$$P(2): \begin{cases} \begin{cases} A_1^2 = F_0^1 A_0^2 + F_1^1 D_0^2 \\ D_1^2 = F_2^1 A_0^2 + F_3^1 D_0^2 \end{cases} \\ \begin{cases} A_2^2 = F_0^2 A_0^2 + F_1^2 D_0^2 + (H \cdot F_1^1 D_0^1)_0 \\ D_2^2 = F_2^2 A_0^2 + F_3^2 D_0^2 + (G \cdot F_1^1 D_0^1)_0 \end{cases} \\ \begin{cases} A_3^2 = F_4^2 A_0^2 + F_5^2 D_0^2 + (H \cdot F_1^1 D_0^1)_1 \\ D_3^2 = F_6^2 A_0^2 + F_7^2 D_0^2 + (G \cdot F_1^1 D_0^1)_1 \end{cases} \end{cases} \quad (2)$$

The proofs for E=1 and E=2 are given in Appendix I. The generalization and the proof for an arbitrary level E=k will be attempted with mathematical induction. Thus we assume the set of prediction propositions P(k) for an arbitrary level k to be true and based on them we derive the propositions P(k+1) and the filters for level k+1. The formulas derived for level k+1 are true if, and only if, they can be derived from level k by replacing k with k+1. In addition, if they are true for level k+1, then according to the induction principle, they are true for any level E.

Therefore, let us assume that the propositions for the levels E=1,2, ... k−1, k with k≧2 are all true. The proposed set of propositions P(k) corresponding to the level E=k of the overcomplete decomposition pyramid is:

$$P(k): \begin{cases} A_x^k = F_{4p}^{l+1} A_0^k + F_{4p+1}^{l+1} D_0^k + (H \cdot F_{i(1)}^l D_0^{k-1})_{b_0} + [H(H \cdot F_{i(2)}^{l-1} D_0^{k-2})_{b_1}]_{b_0} + \ldots + [H(H(\ldots(H \cdot F_{i(l)}^1 D_0^{k-1})_{b_{l-1}})_{b_{l-2}}\ldots)_{b_1}]_{b_0} \\ D_x^k = F_{4p+2}^{l+1} A_0^k + F_{4p+3}^{l+1} D_0^k + (G \cdot F_{i(1)}^l D_0^{k-1})_{b_0} + [G(H \cdot F_{i(2)}^{l-1} D_0^{k-2})_{b_1}]_{b_0} + \ldots + [G(H(\ldots(H \cdot F_{i(l)}^1 D_0^{k-1})_{b_{l-1}})_{b_{l-2}}\ldots)_{b_1}]_{b_0} \end{cases} \quad (3)$$

Figure 5B:
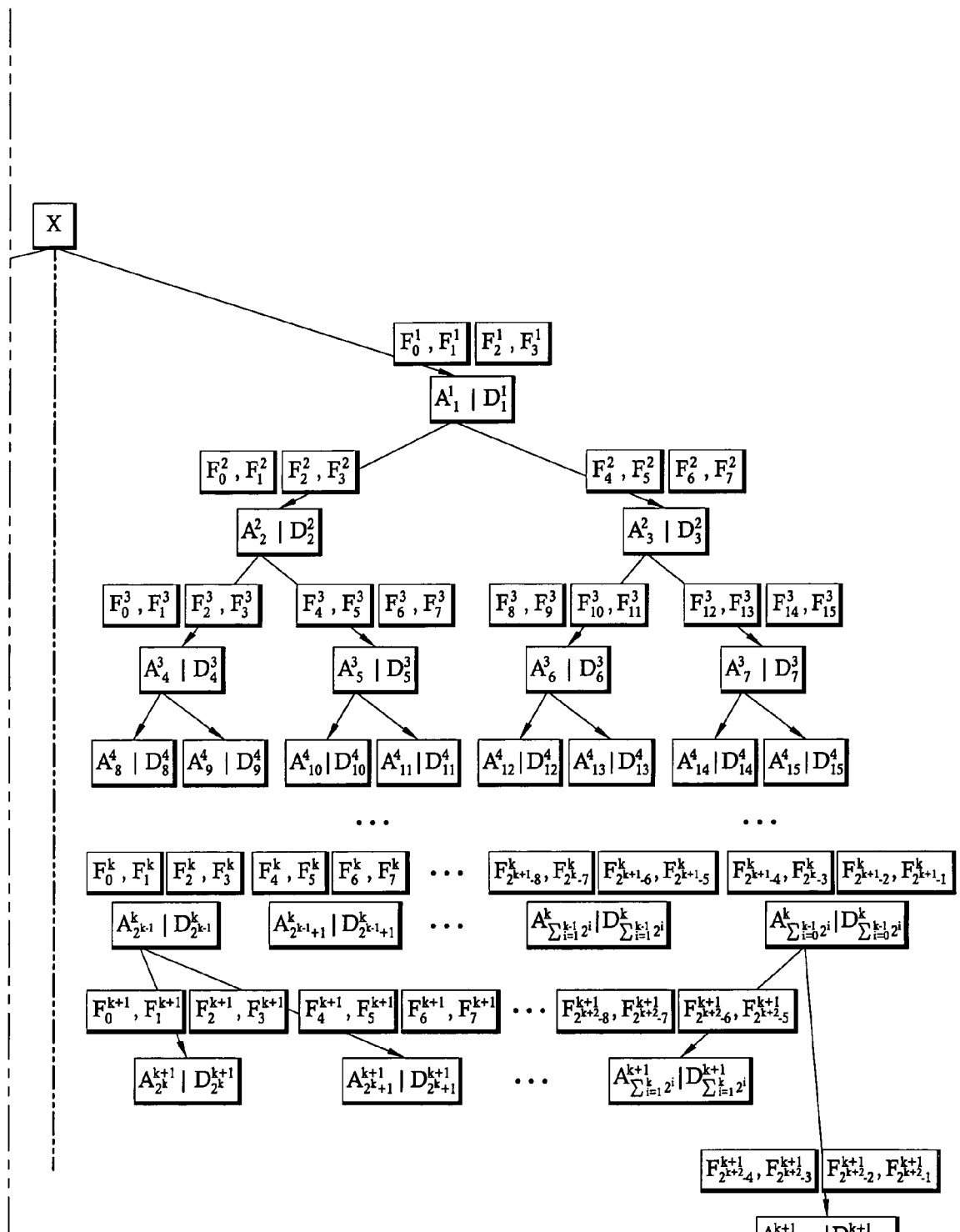
FIG. 5, shown on two pages as FIGS. 5A and 5B, shows an Overcomplete DWT of k+1 levels starting from signal X . A "fictitious" pyramid that emerges from signal $X_{fi}$ is shown in the circled area.

A pictorial representation of the subbands of level k and the corresponding prediction filters is given in FIG. 5. In these equations, $x \in [1, 2^k-1]$, $x \in \mathbb{Z}$ denotes the subband index at level k, and it is written as:

$$x = 2^l + p, \quad (4)$$

where l is given by:

$$l = \lfloor \log_2 x \rfloor, \quad (5)$$

and $\lfloor a \rfloor$ denotes the integer part of a. From (4) and (5) if follows that $l \in [0, k-1], l \in \mathbb{Z}$ and $p \in [0, 2^l-1]$, $p \in \mathbb{Z}$ for any subband index x taken in the interval $[1, 2^k-1]$. Considering $l \geq 1$ in the set of equations (3), $b_i$, $0 \leq i \leq l-1$ are defined as the binary values from the binary representation of p, given by $$p = \sum_{i=0}^{l-1} b_i \cdot 2^i,$$

with $b_i \in \{0,1\}$, while i(m) are filter indices defined as i(m)

$$i(m) = 4 \left\lfloor \frac{p}{2^m} \right\rfloor + 1,$$

for $m \in [1, l]$, $m \in \mathbb{Z}$. In the particular case of l=0 corresponding to k=1 and x=1 we set $b_i = 0$, $\forall i \in \mathbb{Z}$ and $F_A^B = 0$ for any indices A<0 or B≦0, to ensure that the set of equations (3) is identical with P(1) given in (1).

The proposed set of propositions P(k) can be divided into two sets of equations $P_L(k)$ and $P_R(k)$ with $P(k) = P_L(k) \cup P_R(k)$, each set corresponding to the subbands of the "left-half" and "right-half" parts respectively of the pyramid of level k (see FIG. 3). Proving by induction the set of propositions P(k) is equivalent to proving by induction each set of propositions $P_L(k)$ and $P_R(k)$.

The set of propositions $P_L(k)$ corresponding to the left side of the pyramid of level k, with k≧2 is obtained from (3) for $x \in [1, 2^{k-1}-1]$:

$$P_L(k): \begin{cases} A_x^k = F_{4p}^{l+1} A_0^k + F_{4p+1}^{l+1} D_0^k + (H \cdot F_{i(1)}^l D_0^{k-1})_{b_0} + [H(H \cdot F_{i(2)}^{l-1} D_0^{k-2})_{b_1}]_{b_0} + \ldots + [H(H(\ldots(H \cdot F_{i(l)}^1 D_0^{k-1})_{b_{l-1}})_{b_{l-2}}\ldots)_{b_1}]_{b_0} \\ D_x^k = F_{4p+2}^{l+1} A_0^k + F_{4p+3}^{l+1} D_0^k + (G \cdot F_{i(1)}^l D_0^{k-1})_{b_0} + [G(H \cdot F_{i(2)}^{l-1} D_0^{k-2})_{b_1}]_{b_0} + \ldots + [G(H(\ldots(H \cdot F_{i(l)}^1 D_0^{k-1})_{b_{l-1}})_{b_{l-2}}\ldots)_{b_1}]_{b_0} \end{cases} \quad (6)$$

Note that for k=1 there are no predictions to be made for the left side of the pyramid, that is $P_L(1) = \emptyset$. The remaining set of propositions $P_R(k)$ corresponding to the right side of the pyramid of level k is obtained for $x \in [2^{k-1}, 2^k-1]$. Notice that from (5) it results that l=k−1 therefore equation (4) is equivalent to:

$$x = 2^{k-1} + p. \quad (7)$$

Since $x \in [2^{k-1}, 2^k-1]$, it results from (7) that $p \in [0, 2^{k-1}-1]$, $p \in \mathbb{Z}$. Replacing l=k−1 in (3) yields:

$$P_R(k): \begin{cases} A_x^k = F_{4p}^k A_0^k + F_{4p+1}^k D_0^k + (H \cdot F_{i(1)}^{k-1} D_0^{k-1})_{b_0} + [H(H \cdot F_{i(2)}^{k-2} D_0^{k-2})_{b_1}]_{b_0} + \ldots + [H(H(\ldots(H \cdot F_{i(k-1)}^1 D_0^1)_{b_{k-2}})_{b_{k-3}} \ldots)_{b_1}]_{b_0} \\ D_x^k = F_{4p+2}^k A_0^k + F_{4p+3}^k D_0^k + (G \cdot F_{i(1)}^{k-1} D_0^{k-1})_{b_0} + [G(H \cdot F_{i(2)}^{k-2} D_0^{k-2})_{b_1}]_{b_0} + \ldots + [G(H(\ldots(H \cdot F_{i(k-1)}^1 D_0^1)_{b_{k-2}})_{b_{k-3}} \ldots)_{b_1}]_{b_0} \end{cases} \quad (8)$$

We follow in these equations the same definitions as given in equation (3), that is, $b_i$, $0 \leq i \leq k-2$ with $k \geq 2$ are the binary values ($b_i \in \{0,1\}$) from the binary representation of p given by
p=

$$p = \sum_{i=0}^{l-1} b_i \cdot 2^i,$$

and i(m) are filter indices given by i(m)

$$i(m) = 4 \left\lfloor \frac{p}{2^m} \right\rfloor + 1,$$

$m \in [1, k-1]$. In the particular case of k=1, we set $b_i=0, \forall i \in Z$ and $F_A^B = 0$ for any indices $A<0$ or $B \leq 0$, to ensure that $P_R(1)$ given in (8) is identical with P(1) given in (1).

For the particular case of biorthogonal point-symmetric filter-pairs, the filters $F_i^k$ of decomposition level k needed to calculate the subbands of the "right" side of the pyramid of level k, with i=0, 1, ..., $2^{k-2}-1$, are:

$$F_{8i}^k = F_{4i,0}^{k-1} - z^{-1} F_3^1 F_{4i,1}^{k-1}, \quad (9)$$

$$F_{8i+1}^k = z^{-1} F_1^1 F_{4i,1}^{k-1}, \quad (10)$$

$$F_{8i+2}^k = z^{-1} F_2^1 F_{4i,1}^{k-1}, \quad (11)$$

$$F_{8i+3}^k = F_{4i,0}^{k-1} + z^{-1} F_3^1 F_{4i,1}^{k-1}, \quad (12)$$

$$F_{8i+4}^k = F_{4i,1}^{k-1} + F_0^1 F_{4i,0}^{k-1}, \quad (13)$$

$$F_{8i+5}^k = F_1^1 F_{4i,0}^{k-1}, \quad (14)$$

-continued $$F_{8i+6}^k = F_2^1 F_{4i,0}^{k-1}, \quad (15)$$

$$F_{8i+7}^k = F_{4i,1}^{k-1} + F_3^1 F_{4i,0}^{k-1}, \quad (16)$$

For completeness, we give the filters of the proposition P(1). They have the form:

$$F_0^1 = Det^{-1}(H_1 G_1 - zH_0 G_0), \; F_1^1 = Det^{-1}(zH_0 H_0 - H_1 H_1), \quad (17)$$

$$F_2^1 = Det^{-1}(G_1 G_1 - zG_0 G_0), \; F_3^1 = Det^{-1}(zH_0 G_0 - H_1 G_1), \quad (18)$$

where Det is the determinant of the analysis polyphase matrix $\underline{H}_p(z)$, given by:

$$\underline{H}_p(z) = \begin{pmatrix} H_0(z) & H_1(z) \\ G_0(z) & G_1(z) \end{pmatrix}, \quad (19)$$

Let us prove now that the propositions $P_L(k+1)$ formulated for level E=k+1 are true. Notice from FIG. 5 that the "left" side of the pyramid with k+1 decomposition levels (original pyramid) emerges only from the subband $A_0^i$. Hence, one can define a new, "fictitious" pyramid with subbands $A_{fi,j_z}^{i_z}, D_{fi,j_z}^{i_z}$, $i_s \in [1,k], j_s \in [1, 2^{i_s}-1]$ that emerges from an input signal $X_{fi}$ with $X_{fi} = A_0^i$. This pyramid is shown in FIG. 5 in the dashed line-enclosed area. One can notice that the entire decomposition level $i_s$ of this "fictitious" pyramid is equivalent to the "left" side of level $i_s+1$ of the original pyramid emerging from X, with the relationship:

$$A_{j_s}^{i_s+1} = A_{fi,j_s}^{i_s}, \; D_{j_s}^{i_s+1} = D_{fi,j_s}^{i_s}, \; i_s \in [1, k], \; j_s \in [1, 2^{i_s}-1]. \quad (20)$$

Notice that $i_s \in [1, k]$, therefore the set of propositions P(k) can be applied for the level k of the "fictitious" pyramid, since they are true by assumption. Hence, by using equation (3) one can write:

$$A_{fi,x}^k = F_{4p}^{l+1} A_{fi,0}^k + F_{4p+1}^{l+1} D_{fi,0}^k + (H \cdot F_{i(1)}^l D_{fi,0}^{k-1})_{b_0} + [H(H \cdot F_{i(2)}^{l-1} D_{fi,0}^{k-2})_{b_1}]_{b_0} + \ldots + [H(H(\ldots(H \cdot F_{i(l)}^1 D_{fi,0}^{k-l})_{b_{l-1}})_{b_{l-2}} \ldots)_{b_1}]_{b_0}, \quad (21)$$

$$D_{fi,x}^k = F_{4p+2}^{l+1} A_{fi,0}^k + F_{4p+3}^{l+1} D_{fi,0}^k + (G \cdot F_{i(1)}^l D_{fi,0}^{k-1})_{b_0} + [G(H \cdot F_{i(2)}^{l-1} D_{fi,0}^{k-2})_{b_1}]_{b_0} + \ldots + [G(H(\ldots(H \cdot F_{i(l)}^1 D_{fi,0}^{k-l})_{b_{l-1}})_{b_{l-2}} \ldots)_{b_1}]_{b_0}, \quad (22)$$

in which all indices have the same definitions as in equation (3).

By performing the transformations of variables specified by equation (20), equations (21)-(22) become:

$$A_x^{k+1} = F_{4p}^{l+1} A_0^{k+1} + F_{4p+1}^{l+1} D_0^{k+1} + (H \cdot F_{i(1)}^{l} D_0^{k})_{b_0} + [H(H \cdot F_{i(2)}^{l-1} D_0^{k-1})_{b_1}]_{b_0} + \ldots + [H(H(\ldots(H \cdot F_{i(l)}^{1} D_0^{k+1-l})_{b_{l-1}})_{b_{l-2}} \ldots)_{b_1}]_{b_0} \quad (23)$$

$$D_x^{k+1} = F_{4p+2}^{l+1} A_0^{k+1} + F_{4p+3}^{l+1} D_0^{k+1} + (G \cdot F_{i(1)}^{l} D_0^{k})_{b_0} + [G(H \cdot F_{i(2)}^{l-1} D_0^{k-1})_{b_1}]_{b_0} + \ldots + [G(H(\ldots(H \cdot F_{i(l)}^{1} D_0^{k+1-l})_{b_{l-1}})_{b_{l-2}} \ldots)_{b_1}]_{b_0} \quad (24)$$

Notice that these equations are identical to the set of equations (6) in which k is replaced with k+1. This means that the propositions $P_L(k+1)$ are true. Additionally, only filters of levels 1,2, ..., k are used, which are true by the assumption of level k.

The propositions $P_R(k+1)$ for the "right" side of the pyramid remain to be proven. In addition the form of the filters $$F_i^{k+1}$$

has to be proven as well.

The set of propositions $P_R(k+1)$ are formulated by replacing k with k+1 in equation (8):

$$P_R(k+1): \begin{cases} A_x^{k+1} = F_{4p}^{k+1} A_0^{k+1} + F_{4p+1}^{k+1} D_0^{k+1} + (H \cdot F_{i(1)}^{k} D_0^{k})_{b_0} + [H(H \cdot F_{i(2)}^{k-1} D_0^{k-1})_{b_1}]_{b_0} + \ldots + [H(H(\ldots(H \cdot F_{i(k)}^{1} D_0^{1})_{b_{k-1}})_{b_{k-2}} \ldots)_{b_1}]_{b_0} \\ D_x^{k+1} = F_{4p+2}^{k+1} A_0^{k+1} + F_{4p+3}^{k+1} D_0^{k+1} + (G \cdot F_{i(1)}^{k} D_0^{k})_{b_0} + [G(H \cdot F_{i(2)}^{k-1} D_0^{k-1})_{b_1}]_{b_0} + \ldots + [G(H(\ldots(H \cdot F_{i(k)}^{1} D_0^{1})_{b_{k-1}})_{b_{k-2}} \ldots)_{b_1}]_{b_0} \end{cases} \quad (25)$$

To prove these propositions, let us start by performing an inverse wavelet transform in order to calculate the $A_0^k$ subband in function of the $$A_0^{k+1} \text{ and } D_0^{k+1}$$

subbands:

$$A_0^k = z[\tilde{H}(z) A_0^{k+1}(z^2) + \tilde{G}(z) D_0^{k+1}(z^2)]. \quad (26)$$

Since both $A_0^k$ and $D_0^k$ subbands are known now, we can apply any of the propositions of level k (involving the $F_i^k$ filters), since they are true by assumption. Hence, we can calculate any subband $A_x^k$, with $x \in [2^{k-1}, 2^k-1]$ by using the set of propositions $P_R(k)$ given in equation (8). By replacing (26) in (8) we obtain:

$$A_x^k(z) = z F_{4p}^k(z) \tilde{H}(z) A_0^{k+1}(z^2) + z F_{4p}^k(z) \tilde{G}(z) D_0^{k+1}(z^2) + F_{4p+1}^k(z) D_0^k(z) + T(k-1, z), \quad (27)$$

with:

$$T(k-1, z) = (H \cdot F_{i(1)}^{k-1} D_0^{k-1})_{b_0} + [H(H \cdot F_{i(2)}^{k-2} D_0^{k-2})_{b_1}]_{b_0} + \quad (28)$$

$$\ldots + \left[ H\left( H(\ldots(H \cdot F_{i(k-1)}^{1} D_0^{1})_{b_{k-2}})_{b_{k-3}} \ldots \right)_{b_1} \right]_{b_0},$$

and $b_i$, i(m) defined as for equation (8). The "tail" T(k−1,z) denotes the contributions of levels 1,2, ..., k−1.

In order to calculate the $$A_{2x}^{k+1}, D_{2x}^{k+1}$$

subbands (even-numbered subbands of level k+1), we need to perform a single-level forward transform, retaining the even samples ("classic" transform):

$$\begin{bmatrix} A_{2x}^{k+1} \\ D_{2x}^{k+1} \end{bmatrix} = \frac{1}{2} \begin{bmatrix} H_0(z) + z^{-\frac{1}{2}} H_1(z) & H_0(z) - z^{-\frac{1}{2}} H_1(z) \\ G_0(z) + z^{-\frac{1}{2}} G_1(z) & G_0(z) - z^{-\frac{1}{2}} G_1(z) \end{bmatrix} \begin{bmatrix} A_x^k(z^{\frac{1}{2}}) \\ A_x^k(-z^{\frac{1}{2}}) \end{bmatrix}. \quad (29)$$

To derive the terms in (29) we need to evaluate $A_x^k(z^{1/2})$ and $A_x^k(-z^{1/2})$. By replacing z with $z^{1/2}$ in (27) we get:

$$A_x^k\left(z^{\frac{1}{2}}\right) = z^{\frac{1}{2}} F_{4p}^k\left(z^{\frac{1}{2}}\right) \tilde{H}\left(z^{\frac{1}{2}}\right) A_0^{k+1}(z) + \qquad (30)$$
$$z^{\frac{1}{2}} F_{4p}^k\left(z^{\frac{1}{2}}\right) \tilde{G}\left(z^{\frac{1}{2}}\right) D_0^{k+1}(z) + F_{4p+1}^k\left(z^{\frac{1}{2}}\right) D_0^k\left(z^{\frac{1}{2}}\right) + T\left(k-1, z^{\frac{1}{2}}\right)$$

The filter $$F_{4p}^k\left(z^{\frac{1}{2}}\right)$$

can be written using the Type I polyphase representation as:

$$F_{4p}^k\left(z^{\frac{1}{2}}\right) = F_{4p,0}^k(z) + z^{-\frac{1}{2}} F_{4p,1}^k(z), \qquad (31)$$

while $\tilde{H}(z^{1/2})$ and $\tilde{G}(z^{1/2})$ can be substituted by the Type II polyphase representation, as follows:

$$\tilde{H}(z^{1/2}) = \tilde{H}_1(z) + z^{-1/2} \tilde{H}_0(z) \qquad (32)$$

$$\tilde{G}(z^{1/2}) = \tilde{G}_1(z) + z^{-1/2} \tilde{G}_0(z) \qquad (33)$$

Equations (32) and (33) are equivalent to:

$$\tilde{H}(z^{1/2}) = Det^{-1}[-G_0(z) + z^{-1/2} G_1(z)], \qquad (34)$$

$$\tilde{G}(z^{1/2}) = Det^{-1}[H_0(z) - z^{-1/2} H_1(z)], \qquad (35)$$

due to the relations:

$$\tilde{H}_0(z) = Det^{-1} \cdot G_1(z), \tilde{H}_1(z) = -Det^{-1} \cdot G_0(z),$$

$$\tilde{G}_0(z) = -Det^{-1} \cdot H_1(z), \tilde{G}_1(Z) = Det^{-1} \cdot H_0(z), \qquad (36),$$

between the polyphase components of the decomposition and reconstruction filters in a filter-bank. These relationships can be immediately verified by validating the perfect reconstruction condition. In the following, we always assume that the filters H and G are properly shifted so that $Det^{-1} = -1$, in order to simplify the expressions. shows such an example for a biorthogonal point-symmetric filter-pair, namely the 9/7 transform of Cohen, Daubechies, Feauveau.

By replacing equations (31), (34), (35) in equation (30) we obtain:

$$A_x^k\left(z^{\frac{1}{2}}\right) = z^{\frac{1}{2}}\left(F_{4p,0}^k + z^{-\frac{1}{2}} F_{4p,1}^k\right)\left(G_0 - z^{-\frac{1}{2}} G_1\right) A_0^{k+1} + \qquad (37)$$
$$z^{\frac{1}{2}}\left(F_{4p,0}^k + z^{-\frac{1}{2}} F_{4p,1}^k\right)\left(-H_0 + z^{-\frac{1}{2}} H_1\right) D_0^{k+1} + T\left(k, z^{\frac{1}{2}}\right),$$

where $$T\left(k, z^{\frac{1}{2}}\right) = F_{4p+1}^k\left(z^{\frac{1}{2}}\right) D_0^k\left(z^{\frac{1}{2}}\right) + T\left(k-1, z^{\frac{1}{2}}\right), \qquad (38)$$

is the "'tail'" that includes the contribution of level k. By grouping together the factors of the polyphase components of $$F_{4p}^k$$

in equation (37) we obtain:

$$A_x^k\left(z^{\frac{1}{2}}\right) = \left[\left(z^{\frac{1}{2}} G_0 - G_1\right) F_{4p,0}^k + \left(G_0 - z^{-\frac{1}{2}} G_1\right) F_{4p,1}^k\right] A_0^{k+1} + \qquad (39)$$
$$\left[\left(H_1 - z^{\frac{1}{2}} H_0\right) F_{4p,0}^k + \left(z^{-\frac{1}{2}} H_1 - H_0\right) F_{4p,1}^k\right] D_0^{k+1} + T\left(k, z^{\frac{1}{2}}\right)$$

We denote the factors of the two subbands $$A_0^{k+1}, D_0^{k+1}$$

of equation (39) as:

$$L_{k+1}^{+A} = \left(z^{\frac{1}{2}} G_0 - G_1\right) F_{4p,0}^k + \left(G_0 - z^{-\frac{1}{2}} G_1\right) F_{4p,1}^k, \qquad (40)$$

$$L_{k+1}^{+D} = \left(H_1 - z^{\frac{1}{2}} H_0\right) F_{4p,0}^k + \left(z^{-\frac{1}{2}} H_1 - H_0\right) F_{4p,1}^k. \qquad (41)$$

By using these notations, equation (39) is equivalent to:

$$A_x^k\left(z^{\frac{1}{2}}\right) = L_{k+1}^{+A} A_0^{k+1} + L_{k+1}^{+D} D_0^{k+1} + T\left(k, z^{\frac{1}{2}}\right). \qquad (42)$$

Similarly as above, we can calculate $A_x^k(-z^{1/2})$ by replacing z with $(-z^{1/2})$ in equation (27):

$$A_x^k\left(-z^{\frac{1}{2}}\right) = \qquad (43)$$
$$-z^{\frac{1}{2}} F_{4p}^k\left(-z^{\frac{1}{2}}\right) \tilde{H}\left(-z^{\frac{1}{2}}\right) A_0^{k+1}(z) - z^{\frac{1}{2}} F_{4p}^k\left(-z^{\frac{1}{2}}\right) \tilde{G}\left(-z^{\frac{1}{2}}\right) D_0^{k+1}(z) +$$
$$F_{4p+1}^k\left(-z^{\frac{1}{2}}\right) D_0^k\left(-z^{\frac{1}{2}}\right) + T\left(k-1, -z^{\frac{1}{2}}\right)$$

The filter $$F_{4p}^k\left(-z^{\frac{1}{2}}\right)$$

can be written using the Type I polyphase representation as:

$$F_{4p}^k\left(-z^{\frac{1}{2}}\right) = F_{4p,0}^k(z) - z^{-\frac{1}{2}} F_{4p,1}^k(z), \qquad (44)$$

while for point-symmetric, biorthogonal filter-pairs, $\tilde{H}(-z^{1/2})$ and $\tilde{G}(-z^{1/2})$ can be substituted by the Type II polyphase representation as:

$$\tilde{H}(-z^{1/2}) = \tilde{H}_1(z) - z^{-1/2} \tilde{H}_0(z), \qquad (45)$$

$$\tilde{G}(-z^{1/2}) = \tilde{G}_1(z) - z^{-1/2} \tilde{G}_0(z), \qquad (46)$$

equivalent to:

$$\tilde{H}(-z^{1/2}) = D^{-1}[-G_0(z) - z^{-1/2}G_1(z)], \quad (47)$$

$$\tilde{G}(-z^{1/2}) = D^1[H_0(z) + z^{-1/2}H_1(z)], \quad (48)$$

due to the relations mentioned before—equation (36)—for the polyphase components of the decomposition and reconstruction filters in the filter-bank.

By replacing equations (44), (47) and (48) in equation (43) with $\text{Det}^{-1} = -1$ we get:

$$A_x^k\left(-z^{\frac{1}{2}}\right) = -z^{\frac{1}{2}}\left(F_{4p,0}^k - z^{-\frac{1}{2}}F_{4p,1}^k\right)\left(G_0 + z^{-\frac{1}{2}}G_1\right)A_0^{k+1} - \quad (49)$$
$$z^{\frac{1}{2}}\left(F_{4p,0}^k - z^{-\frac{1}{2}}F_{4p,1}^k\right)\left(-H_0 - z^{-\frac{1}{2}}H_1\right)D_0^{k+1} + T\left(k, -z^{\frac{1}{2}}\right)$$

where $T(k, -z^{1/2}) = F_{4p+1}^k(-z^{1/2})D_0^k(-z^{1/2}) + T(k-1, -z^{1/2})$ is the "tail" that includes the contribution of level k. By grouping together the factors of the polyphase components of $$F_{4p}^k$$

in equation (49) we get:

$$A_x^k\left(-z^{\frac{1}{2}}\right) = \left[\left(-z^{\frac{1}{2}}G_0 - G_1\right)F_{4p,0}^k + \left(G_0 + z^{-\frac{1}{2}}G_1\right)F_{4p,1}^k\right]A_0^{k+1} + \quad (50)$$
$$\left[\left(H_1 + z^{\frac{1}{2}}H_0\right)F_{4p,0}^k\right] + \left(-z^{-\frac{1}{2}}H_1 - H_0\right)F_{4p,1}^k\right]D_0^{k+1} + T\left(k, -z^{\frac{1}{2}}\right)$$

We denote the factors of the two subbands $$A_0^{k+1}, D_0^{k+1}$$

as:

$$L_{k+1}^{-A} = (-z^{1/2}G_0 - G_1)F_{4p,0}^k + (G_0 + z^{-1/2}G_1)F_{4p,1}^k, \quad (51)$$

$$L_{k+1}^{-D} = (H_1 + z^{1/2}H_0)F_{4p,0}^k + (-z^{-1/2}H_1 - H_0)F_{4p,1}^k. \quad (52)$$

By using these notations, equation (50) is equivalent to:

$$A_x^k(-z^{1/2}) = L_{k+1}^{-A}A_0^{k+1} + L_{k+1}^{-D}D_0^{k+1} + T(k, -z^{1/2}). \quad (53)$$

The final expressions of $$A_{2x}^{k+1}, D_{2x}^{k+1}$$

are obtained by replacing equations (42) and (53) in equation (29), as shown in the equation below:

$$\begin{bmatrix} A_{2x}^{k+1} \\ D_{2x}^{k+1} \end{bmatrix} = \frac{1}{2}\begin{bmatrix} H_0(z) + z^{-1/2}H_1(z) & H_0(z) - z^{-1/2}H_1(z) \\ G_0(z) + z^{-1/2}G_1(z) & G_0(z) - z^{-1/2}G_1(z) \end{bmatrix} \quad (54)$$
$$\begin{bmatrix} L_{k+1}^{+A}A_0^{k+1} + L_{k+1}^{+D}D_0^{k+1} + T(k, z^{1/2}) \\ L_{k+1}^{-A}A_0^{k+1} + L_{k+1}^{-D}D_0^{k+1} + T(k, -z^{1/2}) \end{bmatrix}.$$

Equation (54) shows that the calculation of the subbands $$A_{2x}^{k+1}, D_{2x}^{k+1}$$

consists of separate calculations of factors like $$1/2[(H_0 + z^{-1/2}H_1)L_{k+1}^{+A} + (H_0 - z^{-1/2}H_1)L_{k+1}^{-A}]$$

and $$1/2[(H_0 + z^{-1/2}H_1)L_{k+1}^{+D} + (H_0 - z^{-1/2}H_1)L_{k+1}^{-D}],$$

multiplying the subbands $$A_0^{k+1} \text{ and } D_0^{k+1}$$

respectively. These factors correspond actually to the prediction filters of the even-numbered subbands of level k+1. The calculation of these factors is done in the following.

Part 0: Replacement of $$L_{k+1}^{+A} \text{ and } L_{k+1}^{-A}$$

in equation (54) for the calculation of $$A_{2x}^{k+1}:$$

$$2F_{8p}^{k+1} = (H_0 + z^{-1/2}H_1)[(z^{1/2}G_0 - G_1)F_{4p,0}^k + (G_0 - z^{1/2}G_1)F_{4p,1}^k] + \quad (55)$$
$$(H_0 - z^{-1/2}H_1)[(-z^{1/2}G_0 - G_1)F_{4p,0}^k + +(G_0 + z^{-1/2}G_1)F_{4p,1}^k] \Rightarrow$$
$$F_{8p}^{k+1} = F_{4p,0}^k - z^{-1}F_3^1 F_{4p,1}^k.$$

Part 1: Replacement of $$L_{k+1}^{+D} \text{ and } L_{k+1}^{-D}$$

in equation (54) for the calculation of $$A_{2x}^{k+1}:$$

$$2F_{8p+1}^{k+1} = (H_0 + z^{-1/2}H_1) \quad (56)$$

$$[(H_1 - z^{1/2}H_0)F_{4p,0}^k + (z^{-1/2}H_1 - H_0)F_{4p,1}^k] + (H_0 - z^{-1/2}H_1)$$

$$[(H_1 + z^{1/2}H_0)F_{4p,0}^k + + (-z^{-1/2}H_1 - H_0)F_{4p,1}^k] \Rightarrow F_{8p+1}^{k+1} =$$

$$z^{-1}F_1^1 F_{4p,1}^k.$$

Part 2: Replacement of $$L_{k+1}^{+A} \text{ and } L_{k+1}^{-A}$$

in equation (54) for the calculation of $$D_{2x}^{k+1}:$$

$$2F_{8p+2}^{k+1} = (G_0 + z^{-1/2}G_1)[(z^{1/2}G_0 - G_1)F_{4p,0}^k + (G_0 - z^{-1/2}G_1)F_{4p,1}^k] + \quad (57)$$

$$(G_0 - z^{-1/2}G_1)[(-z^{1/2}G_0 - G_1)F_{4p,0}^k + + (G_0 + z^{-1/2}G_1)F_{0,1}^k] \Rightarrow$$

$$F_{8p+2}^{k+1} = z^{-1}F_2^1 F_{4p,1}^k.$$

Part 3: Replacement of $$L_{k+1}^{+D} \text{ and } L_{k+1}^{-D}$$

in equation (54) for the calculation of $$D_{2x}^{k+1}:$$

$$2F_{8p+3}^{k+1} = \quad (58)$$

$$(G_0 + z^{-1/2}G_1)[(H_1 - z^{1/2}H_0)F_{4p,0}^k + (z^{-1/2}H_1 - H_0)F_{4p,1}^k] +$$

$$(G_0 - z^{-1/2}G_1)[(H_1 + z^{1/2}H_0)F_{4p,0}^k + + (-z^{-1/2}H_1 - H_0)F_{4p,1}^k] \Rightarrow$$

$$F_{8p+3}^{k+1} = F_{4p,0}^k + z^{-1}F_3^1 F_{4p,1}^k.$$

By definition $p=0,1,\ldots,2^{k-1}-1$.

We can complete now equation (54), and hence the propositions for the even-numbered subbands of the "right" side of the pyramid, at decomposition level $k+1$:

and with:

$$A_{2x}^{k+1} = F_{8p}^{k+1}A_0^{k+1} + F_{8p+1}^{k+1}D_0^{k+1} + \quad (59)$$

$$\frac{1}{2}\left[\left(H_0 + z^{-\frac{1}{2}}H_1\right)T\left(k, z^{\frac{1}{2}}\right) + \left(H_0 - z^{-\frac{1}{2}}H_1\right)T\left(k, -z^{\frac{1}{2}}\right)\right] \Rightarrow \Rightarrow$$

$$A_{2x}^{k+1} = F_{8p}^{k+1}A_0^{k+1} + F_{8p+1}^{k+1}D_0^{k+1} + [H(z)T(k,z)]_0$$

-continued $$D_{2x}^{k+1} = F_{8p+2}^{k+1}A_0^{k+1} + F_{8p+3}^{k+1}D_0^{k+1} + \quad (60)$$

$$\frac{1}{2}\left[\left(G_0 + z^{-\frac{1}{2}}G_1\right)T\left(k, z^{\frac{1}{2}}\right) + \left(G_0 - z^{-\frac{1}{2}}G_1\right)T\left(k, -z^{\frac{1}{2}}\right)\right] \Rightarrow \Rightarrow$$

$$D_{2x}^{k+1} = F_{8p+2}^{k+1}A_0^{k+1} + F_{8p+3}^{k+1}D_0^{k+1} + [G(z)T(k,z)]_0$$

$$T(k,z) = F_{4p+1}^k D_0^k + (H \cdot F_{i(1)}^{k-1}D_0^{k-1})b_0 + \left[H(H \cdot F_{i(2)}^{k-2}D_0^{k-2})_{b_1}\right]_{b_0} + \quad (61)$$

$$\ldots + \left[H\left(H\left(\ldots(H \cdot F_{i(k-1)}^1 D_0^1)_{b_{k-2}}\right)_{b_{k-3}}\ldots\right)_{b_1}\right]_{b_0}.$$

Define $y=2x$. Since $x \in [2^{k-1}, 2^k-1]$ it follows that $y \in [2^k, 2^{k+1}-2]$. The equivalent of equation (7) is:

$$y=2^k+q, \quad (62)$$

with $q \in [0, 2^k-2]$. Also, the definition of y and equations (7) and (62) imply that:

$$q=2p. \quad (63)$$

This equation shows that q is an even number, therefore its binary representation is given by $$q = \sum_{i=0}^{k-1} c_i \cdot 2^i,$$

$$p = \sum_{i=0}^{k-2} b_i \cdot 2^i,$$

with $c_i \in \{0,1\}$, $\forall i \in [1,k-1]$ and $c_0=0$. The binary representation of p is therefore by using (63) one can write:

$$\sum_{i=1}^{k-1} c_i \cdot 2^i = \sum_{i=0}^{k-2} b_1 \cdot 2^{i+1}. \quad (64)$$

From (64) it follows that $c_i = b_{i-1}$ for any $i \in [1, k-1]$.

By using these observations and by replacing the expression of the "tail" T given in equation (61), one can write equations (59) and (60) as follows:

$$A_y^{k+1} = F_{4q}^{k+1}A_0^{k+1} + F_{4q+1}^{k+1}D_0^{k+1} + \left[H \cdot F_{4\lfloor\frac{q}{2}\rfloor+1}^k D_0^k\right]_{c_0} + \quad (65)$$

$$\left[H(H \cdot F_{j(2)}^{k-1}D_0^{k-1})_{c_1}\right]_{c_0} + \left[H\left(H(H \cdot F_{j(3)}^{k-2}D_0^{k-2})_{c_2}\right)_{c_1}\right]_{c_0} +$$

$$\ldots + + \left[H\left(H\left(\ldots(H \cdot F_{j(k)}^1 D_0^1)_{c_{k-1}}\ldots\right)_{c_{k-2}}\right)_{c_1}\right]_{c_0},$$

and $$D_y^{k+1} = F_{4q+2}^{k+1}A_0^{k+1} + F_{4q+3}^{k+1}D_0^{k+1} + \left[G \cdot F_{4\lfloor\frac{q}{2}\rfloor+1}^k D_0^k\right]_{c_0} + \quad (66)$$

-continued
$$\left[G(H \cdot F_{j(2)}^{k-1} D_0^{k-1})_{c_1}\right]_{c_0} + \left[G\left(H(H \cdot F_{j(3)}^{k-2} D_0^{k-2})_{c_2}\right)_{c_1}\right]_{c_0} +$$
$$\ldots + + \left[G\left(H\left(\ldots(H \cdot F_{j(k)}^1 D_0^1)_{c_{k-1}}\right)_{c_{k-2}} \ldots\right)_{c_1}\right]_{c_0},$$

where j(m) are defined as $$j(m) = 4\left\lfloor \frac{q}{2^m} \right\rfloor + 1,$$

for any m∈[1,k].

Equations (65), (66) are equivalent to equations (25) for the even values of x (even-numbered subbands). Hence, in this case the propositions $P_R(k+1)$ are true.

The proof of $P_R(k+1)$ for odd values of x is done in a similar manner. In order to calculate the subbands $$A_{2x+1}^{k+1}, D_{2x+1}^{k+1},$$

we perform a single-level forward transform retaining the odd samples ("complementary" transform):

$$\begin{bmatrix} A_{2x+1}^{k+1} \\ D_{2x+1}^{k+1} \end{bmatrix} = \frac{1}{2} \begin{bmatrix} H_0(z) + z^{\frac{1}{2}} H_1(z) & H_1(z) - z^{\frac{1}{2}} H_0(z) \\ G_0(z) + z^{\frac{1}{2}} G_1(z) & G_1(z) - z^{\frac{1}{2}} G_0(z) \end{bmatrix} \begin{bmatrix} A_x^k\left(z^{\frac{1}{2}}\right) \\ A_x^k\left(-z^{\frac{1}{2}}\right) \end{bmatrix}. \quad (67)$$

Notice that the terms $A_x^k(z^{1/2}), A_z^k(-z^{1/2})$ are already calculated in equations (42) and (53). Replacing their expressions in equation (67) yields:

$$\begin{bmatrix} A_{2x}^{k+1} \\ D_{2x}^{k+1} \end{bmatrix} = \frac{1}{2} \begin{bmatrix} H_0(z) + z^{\frac{1}{2}} H_1(z) & H_1(z) - z^{\frac{1}{2}} H_0(z) \\ G_0(z) + z^{\frac{1}{2}} G_1(z) & G_1(z) - z^{\frac{1}{2}} G_0(z) \end{bmatrix} \begin{bmatrix} L_{k+1}^{+A} A_0^{k+1} + L_{k+1}^{+D} D_0^{k+1} + T\left(k, z^{\frac{1}{2}}\right) \\ L_{k+1}^{-A} A_0^{k+1} + L_{k+1}^{-D} D_0^{k+1} + T\left(k, -z^{\frac{1}{2}}\right) \end{bmatrix}. \quad (68)$$

Equation (68) shows that the calculation of the subbands $$A_{2x+1}^{k+1}, D_{2x+1}^{k+1}$$

consists of separate calculations of factors like $$\frac{1}{2}\left[\left(H_0 + z^{\frac{1}{2}} H_1\right) L_{k+1}^{+A} + \left(H_1 - z^{\frac{1}{2}} H_0\right) L_{k+1}^{-A}\right]$$

and $$\frac{1}{2}\left[\left(H_0 + z^{\frac{1}{2}} H_1\right) L_{k+1}^{+D} + \left(H_1 - z^{\frac{1}{2}} H_0\right) L_{k+1}^{-D}\right],$$

multiplying the subbands $$A_0^{k+1} b \text{ and } D_0^{k+1}$$

respectively. These factors correspond actually to the prediction filters of the odd-numbered subbands of level k+1. The calculation of these factors is done in the following.

Part 4: Replacement of $$L_{k+1}^{+A} \text{ and } L_{k+1}^{-A}$$

in equation (68) for the calculation of $$A_{2x+1}^{k+1}:$$

$$2F_{8p+4}^{k+1} = \left(H_1 + z^{\frac{1}{2}} H_0\right)\left[\left(z^{\frac{1}{2}} G_0 - G_1\right) F_{4p,0}^k + \left(G_0 - z^{-\frac{1}{2}} G_1\right) F_{4p,1}^k\right] + \quad (69)$$
$$\left(H_1 - z^{\frac{1}{2}} H_0\right)\left[\left(-z^{\frac{1}{2}} G_0 - G_1\right) F_{4p,0}^k + + \left(G_0 + z^{-\frac{1}{2}} G_1\right) F_{4p,1}^k\right] \Rightarrow$$
$$F_{8p+4}^{k+1} = F_{4p,1}^k + F_0^1 F_{4p,0}^k.$$

Part 5: Replacement of $$L_{k+1}^{+D} \text{ and } L_{k+1}^{-D}$$

in equation (68) for the calculation of $$A_{2x+1}^{k+1}:$$

$$2F_{8p+5}^{k+1} = \left(H_1 + z^{\frac{1}{2}} H_0\right)\left[\left(H_1 - z^{\frac{1}{2}} H_0\right) F_{4p,0}^k + \left(z^{-\frac{1}{2}} H_1 - H_0\right) F_{4p,1}^k\right] + \quad (70)$$
$$\left(H_1 - z^{\frac{1}{2}} H_0\right)\left[\left(H_1 + z^{\frac{1}{2}} H_0\right) F_{4p,0}^k + + \left(-z^{-\frac{1}{2}} H_1 - H_0\right) F_{4p,1}^k\right] \Rightarrow$$
$$F_{8p+5}^{k+1} = F_1^1 F_{4p,0}^k.$$

Part 6: Replacement of $$L_{k+1}^{+A} \text{ and } L_{k+1}^{-A}$$

in equation (68) for the calculation of $$D_{2x+1}^{k+1}:$$

$$2F_{8p+6}^{k+1} = \left(G_1 + z^{\frac{1}{2}}G_0\right)\left[\left(z^{\frac{1}{2}}G_0 - G_1\right)F_{4p,0}^k + \left(G_0 - z^{-\frac{1}{2}}G_1\right)F_{4p,1}^k\right] + \quad (71)$$
$$\left(G_1 - z^{\frac{1}{2}}G_0\right)\left[\left(-z^{\frac{1}{2}}G_0 - G_1\right)F_{4p,0}^k + +\left(G_0 + z^{-\frac{1}{2}}G_1\right)F_{4p,1}^k\right] \Rightarrow$$
$$F_{8p+6}^{k+1} = F_2^1 F_{4p,0}^k.$$

Part 7: Replacement of $$L_{k+1}^{+D} \text{ and } L_{k+1}^{-D}$$

in equation (68) for the calculation of $$D_{2x+1}^{k+1}:$$

$$2F_{8p+7}^{k+1} = \left(G_1 + z^{\frac{1}{2}}G_0\right)\left[\left(H_1 - z^{\frac{1}{2}}H_0\right)F_{4p,0}^k + \left(z^{-\frac{1}{2}}H_1 - H_0\right)F_{4p,1}^k\right] + \quad (72)$$
$$\left(G_1 - z^{\frac{1}{2}}G_0\right)\left[\left(H_1 - z^{\frac{1}{2}}H_0\right)F_{4p,0}^k + +\left(-z^{-\frac{1}{2}}H_1 - H_0\right)F_{4p,1}^k\right] \Rightarrow$$
$$F_{8p+7}^{k+1} = F_{4p,1}^k + F_3^1 F_{4p,0}^k.$$

By definition $p=0,1,\ldots,2^{k-1}-1$.

We can complete now equation (68), and hence the second proposition of level k+1:

$$A_{2x+1}^{k+1} = F_{8p+4}^{k+1} A_0^{k+1} + F_{8p+5}^{k+1} D_0^{k+1} + \quad (73)$$
$$\frac{1}{2}\left[\left(H_1 + z^{\frac{1}{2}}H_0\right)T\left(k, z^{\frac{1}{2}}\right) + \left(H_1 - z^{\frac{1}{2}}H_0\right)T\left(k, -z^{\frac{1}{2}}\right)\right] \Rightarrow \Rightarrow$$
$$A_{2x+1}^{k+1} = F_{8p+4}^{k+1} A_0^{k+1} + F_{8p+5}^{k+1} D_0^{k+1} + [H(z)T(k,z)]_1,$$
and
$$D_{2x+1}^{k+1} = F_{8p+6}^{k+1} A_0^{k+1} + F_{8p+7}^{k+1} D_0^{k+1} + \quad (74)$$
$$\frac{1}{2}\left[\left(G_1 + z^{\frac{1}{2}}G_0\right)T\left(k, z^{\frac{1}{2}}\right) + \left(G_1 - z^{\frac{1}{2}}G_0\right)T\left(k, -z^{\frac{1}{2}}\right)\right] \Rightarrow \Rightarrow$$
$$D_{2x+1}^{k+1} = F_{8p+6}^{k+1} A_0^{k+1} + F_{8p+7}^{k+1} D_0^{k+1} + [G(z)T(k,z)]_1$$
with
$$T(k,z) = F_{4p+1}^k D_0^k + (H \cdot F_{i(1)}^{k-1} D_0^{k-1})_{b_0} + \left[H(H \cdot F_{i(2)}^{k-2} D_0^{k-2})_{b_1}\right]_{b_0} + \quad (75)$$
$$\ldots + \left[H(H(\ldots(H \cdot F_{i(k-1)}^1 D_0^1) b_{k-2} \ldots)_{b_{k-3}})_{b_1}\right]_{b_0}.$$

Define $y=2x+1$. Since $x \in [2^{k-1}, 2^k-1]$ it follows that $y \in [2^k, 2^{k+1}-1]$. The equivalent of equation (7) is:

$$y = 2^k + q, \quad (76)$$

with $q \in [0, 2^k-1]$. Also, the definition of y and equations (7) and (76) imply that:

$$q = 2p+1. \quad (77)$$

This equation shows that q is an odd number, therefore its binary representation is given by $$q = \sum_{i=0}^{k-1} c_i \cdot 2^i,$$

$$p = \sum_{i=0}^{k-2} b_i \cdot 2^i,$$

with $c_i \in \{0,1\}$, $\forall i \in [1,k-1]$ and $c_0=1$. The binary representation of p is therefore by using (77) one can write:

$$\sum_{i=1}^{k-1} c_i \cdot 2^i = \sum_{i=0}^{k-2} b_i \cdot 2^{i+1}. \quad (78)$$

From (78) again it follows that $c_i = b_{i-1}$ for any $i \in [1,k-1]$. Also, from (77) it follows that $$p = \left\lfloor \frac{q}{2} \right\rfloor.$$

By using these observations and by replacing the expression of the "tail" T, given in equation (75), one can write equations (73) and (74) as follows:

$$A_y^{k+1} = F_{4q}^{k+1} A_0^{k+1} F_{4q+1}^{k+1} D_0^{k+1} + \left(H \cdot F_{4\lfloor\frac{q}{2}\rfloor+1}^k D_0^k\right)_{c_0} + \quad (79)$$
$$\left[H(H \cdot F_{j(2)}^{k-1} D_0^{k-1})_{c_i}\right]_{c_0} + \left[H(H(H \cdot F_{j(3)}^{k-2} D_0^{k-2})_{c_2})_{c_i}\right]_{c_0} + \ldots ++$$
$$\left[H\left(H\left(\ldots(H \cdot F_{j(k)}^1 D_0^1)_{c_k}\right)_{c_{k-1}}\ldots\right)_{c_2}\right]_{c_1 \, c_0},$$

and $$D_y^{k+1} = F_{4q+2}^{k+1} A_0^{k+1} + F_{4q+3}^{k+1} D_0^{k+1} + \left(G \cdot F_{4\lfloor\frac{q}{2}\rfloor+1}^k D_0^k\right)_{c_0} + \quad (80)$$
$$\left[G(H \cdot F_{j(2)}^{k-1} D_0^{k-1})_{c_i}\right]_{c_0} + \left[G(H(H \cdot F_{j(3)}^{k-2} D_0^{k-2})_{c_2})_{c_i}\right]_{c_0} + \ldots +$$
$$+ \left[G\left(H\left(.(H \cdot F_{j(k)}^1 D_0^1)_{c_k}\right)_{c_{k-i}}\ldots\right)_{c_2}\right]_{c_i \, c_0},$$

where j(m) are defined as $$j(m) = 4\left\lfloor \frac{q}{2^m} \right\rfloor + 1$$

for any $m \in [1,k]$.

Equations (79), (80) are equivalent with equations (25) for the odd values of x (odd-numbered subbands) Hence the propositions $P_R(k+1)$ are true in this case too. By joining equations (65), (66) with (79), (80) we derive the set of propositions $P_R(k+1)$ of level k+1, for any values of x. One can also verify immediately that the filters calculated by equations (55)-(58), (69)-(71) can be derived from the general description of equations (9)-(16) for every $i \in [0, 2^{k-1}-1]$, if in these equations k is replaced with k+1. Hence, the derivations of the filters for level k+1 are true.

This leads to the conclusion that the propositions P(k+1) are true for the case of E=k+1. This means that they are true for every E, E≧1.

Properties of the Prediction Filters for Biorthogonal Point-Symmetric Filter-Pairs Several symmetry properties of the prediction filters derived in the previous subsection for an arbitrary decomposition level k are demonstrated. The general form of the prediction filters for level k is given in equations (9)-(16). The prediction filters of level k+1 are obtained from (9)-(16) by replacing k with k+1:

$$F_{8i}^{k+1} = F_{4i,0}^k - z^{-1} F_3^1 F_{4i,1}^k, \tag{81}$$

$$F_{8i+1}^{k+1} = z^{-1} F_1^1 F_{4i,1}^k, \tag{82}$$

$$F_{8i+2}^{k+1} = z^{-1} F_2^1 F_{4i,1}^k, \tag{83}$$

$$F_{8i+3}^{k+1} = F_{4i,0}^k + z^{-1} F_3^1 F_{4i,1}^k, \tag{84}$$

$$F_{8i+4}^{k+1} = F_{4i,1}^k F_0^1 F_{4i,0}^k, \tag{85}$$

$$F_{8i+5}^{k+1} = F_1^1 F_{4i,0}^k, \tag{86}$$

$$F_{8i+6}^{k+1} = F_2^1 F_{4i,0}^k, \tag{87}$$

$$F_{8i+7}^{k+1} = F_{4i,1}^k + F_3^1 F_{4i,0}^k, \tag{88}$$

where $i=0,1,\ldots,2^{k-1}-1$.

The mathematical formalizm describing the symmetry properties proven in this section is expressed for biorthogonal point-symmetric filters by the set of propositions given below:

$$P_s(k): \begin{cases} F_{4m}^k(z) = z F_{4(2^{k-1}-m-1)}^k(z^{-1}), & (89) \\ F_{4m+1}^k(z) = F_{4(2^{k-1}-m-1)+1}^k(z^{-1}), & (90) \\ F_{4m+2}^k(z) = z^2 F_{4(2^{k-1}-m-1)+2}^k(z^{-1}), & (91) \\ F_{4m+3}^k(z) = z F_{4(2^{k-1}-m-1)+3}^k(z^{-1}). & (92) \end{cases}$$

for $m=0,1,\ldots,2^{k-2}-1$ and $k>1$.

These equations indicate the fact that we can derive half of the F-filters of level k as the time-inverses of the other half of the set of filters for the same level under by some shifts. Specifically, the filters are time-inversed in groups of four filters that lay in a "mirror" fashion in the group of the prediction filters. Thus, the first four F-filters are related with the last four, the second four F-filters with the penultimate four, and so on.

These properties will be demonstrated by mathematical induction. Thus we first give the proof of $P_S(2)$. Then we assume that the equations $P_S(k)$ are true, and based on this assumption we derive the symmetry properties $P_S(k+1)$ between the F-filters of level k+1. If the derived set of equations $P_S(k+1)$ can be simply obtained from $P_S(k)$ by replacing k with k+1, then according to the induction principle the propositions $P_S(E)$ are true for any level E, E>1.

Throughout the proofs given in this paper, the following relationships are used for the prediction filters of the first decomposition level:

$$F_0^1(z^{-1}) = z^{-1} F_0^1(z), \tag{93}$$

$$F_1^1(z^{-1}) = F_1^1(z), \tag{94}$$

$$F_2^1(z^{-1}) = z^{-2} F_2^1(z), \tag{95}$$

$$F_3^1(z^{-1}) = z^{-1} F_3^1(z), \tag{96}$$

$$F_0^1(z) = -F_3^1(z), \tag{97}$$

$$F_3^1(z) = -z F_0^1(z^{-1}). \tag{98}$$

These properties are proven in the appendix II for biorthogonal point-symmetric filters. The symmetry propositions $P_S(2)$ corresponding to the case k=2 are:

$$P_s(2): \begin{cases} F_0^2(z) = z F_4^2(z^{-1}), & (99) \\ F_1^2(z) = F_5^2(z^{-1}), & (100) \\ F_2^2(z) = z^2 F_6^2(z^{-1}), & (101) \\ F_3^2(z) = z F_7^2(z^{-1}). & (102) \end{cases}$$

The proof of these equations is given in appendix III. We assume that the symmetry propositions $P_S(k)$ are true and based on them we derive the symmetry relationships for level k+1. Consider equation (89), which is true by assumption, and replace z with $z^{1/2}$ and $-z^{1/2}$ respectively. The following two equations are obtained:

$$F_{4m}^k(z^{1/2}) = z^{1/2} F_{4(2^{k-1}-m-1)}^k(z^{-1/2}), \tag{103}$$

$$F_{4m}^k(-z^{1/2}) = -z^{1/2} F_{4(2^{k-1}-m-1)}^k(-z^{-1/2}). \tag{104}$$

The polyphase components of $F_{4m}^k$, with $m=0,1,\ldots,2^{k-2}-1$ are given by:

$$F_{4m,0}^k(z) = 1/2 [F_{4m}^k(z^{1/2}) + F_{4m}^k(-z^{1/2})], \tag{105}$$

$$F_{4m,1}^k(z) = 1/2z^{1/2} [F_{4m}^k(z^{1/2}) - F_{4m}^k(-z^{1/2})]. \tag{106}$$

In equations (105), (106) we can replace the terms $$F_{4m}^k(z^{1/2}), F_{4m}^k(-z^{1/2})$$

by using (103), (104), yielding:

$$F_{4m,0}^k(z) = \tag{107}$$
$$1/2z^{1/2} [F_{4(2^{k-1}-m-1)}^k(z^{-1/2}) - F_{4(2^{k-1}-m-1)}^k(-z^{-1/2})] \Leftrightarrow F_{4m,0}^k(z) =$$
$$z F_{4(2^{k-1}-m-1),1}^k(z^{-1}),$$

-continued $$F_{4m,1}^k(z) = \quad (108)$$
$$1/2z[F_{4(2^{k-1}-m-1)}^k(z^{-1/2}) + F_{4(2^{k-1}-m-1)}^k(-z^{-1/2})] \Leftrightarrow F_{4m,1}^k(z) = zF_{4(2^{k-1}-m-1),0}^k(z^{-1}),$$

with m=0,1, ..., $2^{k-2}-1$ and k>1.

Let us start by proving the symmetry properties for the filters of the form $$F_{4m}^{k+1},$$

with m=0,1, ..., $2^{k-1}-1$; these properties are separately derived for m even and m odd. For the case of m even, we define m=2j, with 2j=0,2,4, ..., $2^{k-1}-2$, equivalent to j=0,1, 2, ..., $2^{k-2}-1$. Hence, from equations (81) and (98) we have:

$$F_{4m}^{k+1}(z) = F_{8j}^{k+1}(z) = F_{4j,0}^k(z) - z^{-1}F_3^1(z)F_{4j,1}^k(z) \Leftrightarrow F_{4m}^{k+1}(z) = \quad (109)$$
$$F_{4j,0}^k(z) + F_0^1(z^{-1})F_{4j,1}^k(z).$$

Since j=0,1, ..., $2^{k-2}-1$, we can substitute (107) and (108) in equation (109), obtaining that:

$$F_{4m}^{k+1}(z) = z\left(F_{4(2^{k-1}-j-1),1}^k(z^{-1}) + F_0^1(z^{-1}) \cdot F_{4(2^{k-1}-j-1),0}^k(z^{-1})\right). \quad (110)$$

From (85) in which z is replaced with $z^{-1}$ and from the definition of m we obtain that:

$$F_{4m}^{k+1}(z) = zF_{8(2^{k-1}-j-1)+4}^{k+1}(z^{-1}) \Leftrightarrow F_{4m}^{k+1}(z) = zF_{4(2^k-m-1)}^{k+1}(z^{-1}), \quad (111)$$

for $m = 0, 2, 4, \ldots, 2^{k-1} - 2$.

For the case of m odd, we may define m=2j+1 with 2j+1=1, 3,5, ... $2^{k-1}-1$, equivalent to j=0,1,2, ..., $2^{k-2}-1$. Thus, from equations (85) and (98) we have:

$$F_{4m}^{k+1}(z) = F_{8j+4}^{k+1}(z) = \quad (112)$$
$$F_{4j,1}^k(z) + F_0^1(z)F_{4j,0}^k(z) \Leftrightarrow F_{4m}^{k+1}(z) = F_{4j,1}^k(z) - zF_3^1(z^{-1})F_{4j,0}^k(z).$$

Since j=0,1, ..., $2^{k-2}-1$, we can substitute (107) and (108) in equation (112) and we get:

$$F_{4m}^{k+1}(z) = z\left(F_{4(2^{k-1}-j-1),0}^k(z^{-1}) - zF_3^1(z^{-1})F_{4(2^{k-1}-j-1),1}^k(z^{-1})\right). \quad (113)$$

From (81) in which z is replaced with $z^{-1}$ and from the definition of m we obtain:

$$F_{4m}^{k+1}(z) = zF_{8(2^{k-1}-j-1)}^{k+1}(z^{-1}) \Leftrightarrow F_{4m}^{k+1}(z) = zF_{4(2^k-m-1)}^{k+1}(z^{-1}), \quad (114)$$

for m=1,3,5, ..., $2^{k-1}-1$. Thus combining the results of equations (111) and (114), we have:

$$F_{4m}^{k+1}(z) = zF_{4(2^k-m-1)}^{k+1}(z^{-1}) \text{ for } m = 0, 1, 2, \ldots, 2^{k-1} - 1. \quad (115)$$

To prove the symmetry properties for the prediction filters of the form $F_{4m}^{k+1}$, with m=0,1, ..., $2^{k-1}-1$, we follow the same rationale as before. Hence, these properties are separately derived for m even and m odd. For the case of m even, we denote m=2j with 2j=0,2,4, ..., $2^{k-1}-2$ equivalent to j=0,1, 2, ..., $2^{k-2}-1$. By using equations (82) and (94) we obtain:

$$F_{4m+1}^{k+1}(z) = F_{8j+1}^{k+1}(z) = z^{-1}F_1^1(z)F_{4j,1}^k(z) \Leftrightarrow F_{4m+1}^{k+1}(z) = z^{-1}F_1^1(z^{-1})F_{4j,1}^k(z). \quad (116)$$

Since j=0,1, ..., $2^{k-2}-1$, we can substitute (108) in equation (116), obtaining:

$$F_{4m+1}^{k+1}(z) = F_1^1(z^{-1})F_{4(2^{k-1}-j-1),0}^k(z^{-1})$$

From (86) in which z is replaced with $z^{-1}$ and from the definition of m, we obtain that:

$$F_{4m+1}^{k+1}(z) = F_{8(2^{k-1}-j-1)+5}^{k+1}(z^{-1}) \Leftrightarrow F_{4m+1}^{k+1}(z) = F_{4(2^k-m-1)+1}^{k+1}(z^{-1}), \quad (117)$$

for $m = 0, 2, 4, \ldots, 2^{k-1} - 2$.

For the case of m odd, we denote m=2j+1 with 2j+1=1,3, 5, ..., $2^{k-1}-1$ equivalent to j=0,1,2, ..., $2^{k-2}-1$. Thus, from equations (87) and (94) we obtain:

$$F_{4m+1}^{k+1}(z) = F_{8j+5}^{k+1}(z) = F_1^1(z)F_{4j,0}^k(z) \Leftrightarrow F_{4m+1}^{k+1}(z) = F_1^1(z^{-1})F_{4j,0}^k(z). \quad (118)$$

Since j=0,1, ..., $2^{k-2}-1$, we can substitute (107) in equation (118), obtaining:

$$F_{4m+1}^{k+1}(z) = zF_1^1(z^{-1})F_{4(2^{k-1}-j-1),1}^k(z). \quad (119)$$

From (82) in which z is replaced with $z^{-1}$ and from the definition of m, we obtain that:

$$F_{4m+1}^{k+1}(z) = F_{8(2^{k-1}-j-1)+1}^{k+1}(z^{-1}) \Leftrightarrow F_{4m+1}^{k+1}(z) = F_{4(2^k-m-1)+1}^{k+1}(z^{-1}), \quad (120)$$

for m=1,3,5, ..., $2^{k-1}-1$. Thus combining the results of equations (117) and (120), we have:

$$F_{4m+1}^{k+1}(z) = F_{4(2^k-m-1)+1}^{k+1}(z^{-1}) \text{ for } m = 0, 1, 2, \ldots, 2^{k-1} - 1. \quad (121)$$

For the prediction filters of the form $$F_{4m+2}^{k+1},$$

with $m=0,1,\ldots,2^{k-1}-1$, we follow the same reasoning as before, hence the symmetry properties are derived separately for m odd or even. For the case of m even, we denote $m=2j$, with $2j=0,2,4,\ldots,2^{k-1}-2$ equivalent to $j=0,1,2,\ldots,2^{k-2}-1$, and we use equations (83) and (95), obtaining:

$$F_{4m+2}^{k+1}(z) = \qquad (122)$$

$$F_{8j+2}^{k+1}(z) = z^{-1}F_2^1(z)F_{4j,1}^k(z) \Leftrightarrow F_{4m+2}^{k+1}(z) = zF_2^1(z^{-1})F_{4j,1}^k(z).$$

Since $j=0,1,\ldots,2^{k-2}-1$, we substitute (108) in equation (122) and we get:

$$F_{4m+2}^{k+1}(z) = z^2 F_2^1(z^{-1}) F_{4(2^{k-1}-j-1),0}^k(z^{-1})$$

From (87) in which z is replaced with $z^{-1}$ and from the definition of m, we obtain that:

$$F_{4m+2}^{k+1}(z) = z^2 F_{8(2^{k-1}-j-1)+6}^{k+1}(z^{-1}) \Leftrightarrow F_{4m+2}^{k+1}(z) = z^2 F_{4(2^k-m-1)+2}^{k+1}(z^{-1}), \qquad (123)$$

for $m=0,2,4,\ldots,2^{k-1}-2$.

For the case of m odd, we denote $m=2j+1$ with $2j+1=1,3,5,\ldots,2^{k-1}-1$ equivalent to $j=0,1,2,\ldots,2^{k-2}-1$. Thus, for this case we use equations (87) and (95), and we get:

$$F_{4m+2}^{k+1}(z) = F_{8j+6}^{k+1}(z) = F_2^1(z)F_{4j,0}^k(z) \Leftrightarrow F_{4m+2}^{k+1}(z) = z^2 F_2^1(z^{-1})F_{4j,0}^k(z). \qquad (124)$$

Since $j=0,1,\ldots,2^{k-2}-1$, we substitute (107) in equation (124) and we obtain that:

$$F_{4m+2}^{k+1}(z) = z^3 F_2^1(z^{-1}) F_{4(2^{k-1}-j-1),1}^k(z^{-1}).$$

From (83) in which z is replaced with $z^{-1}$ and from the definition of m, we obtain:

$$F_{4m+2}^{k+1}(z) = z^2 F_{8(2^{k-1}-j-1)+2}^{k+1}(z^{-1}) \Leftrightarrow F_{4m+2}^{k+1}(z) = z^2 F_{4(2^k-m-1)+2}^{k+1}(z^{-1}), \qquad (125)$$

for $m=1,3,5,\ldots,2^{k-1}-1$. Thus combining the results of equations (123) and (125) we have:

$$F_{4m+2}^{k+1}(z) = z^2 F_{4(2^k-m-1)+2}^{k+1}(z^{-1}) \text{ for } m=0,1,2,\ldots,2^{k-1}-1. \qquad (126)$$

Finally, for the filters of the form $$F_{4m+3}^{k+1},$$

with $m=0,1,\ldots,2^{k-1}-1$ we follow the same approach as previously. For the case of m even, we denote $m=2j$ with $j=0,1,2,\ldots,2^{k-2}-1$. Hence, for this case we use equations (84) and (96):

$$F_{4m+3}^{k+1}(z) = F_{8j+3}^{k+1}(z) = F_{4j,0}^k(z) + z^{-1}F_3^1(z)F_{4j,1}^k(z) \Leftrightarrow F_{4m+3}^{k+1}(z) = \qquad (127)$$

$$F_{4j,0}^k(z) + F_3^1(z^{-1})F_{4j,1}^k(z).$$

Since $j=0,1,\ldots,2^{k-2}-1$, we substitute (107) and (108) in equation (127) and we get:

$$F_{4m+3}^{k+1}(z) = z(F_{4(2^{k-1}-j-1),1}^k(z^{-1}) + F_3^1(z^{-1})F_{4(2^{k-1}-j-1),0}^k(z^{-1}))$$

From (88) in which z is replaced with $z^{-1}$ and from the definition of m, we obtain:

$$F_{4m+3}^{k+1}(z) = zF_{8(2^{k-1}-j-1)+7}^{k+1}(z^{-1}) \Leftrightarrow F_{4m+3}^{k+1}(z) = z^{-1}F_{4(2^k-m-1)+3}^{k+1}(z^{-1}), \qquad (128)$$

for $m=0,2,4,\ldots,2^{k-1}-2$.

For the case of m odd, we consider $m=2j+1$ with $j=0,1,2,\ldots,2^{k-2}-1$. Hence, by equations (88) and (96):

$$F_{4m+3}^{k+1}(z) = F_{8j+7}^{k+1}(z) = F_{4j,1}^k(z) + F_3^1(z)F_{4j,0}^k(z) \Leftrightarrow F_{4m+3}^{k+1}(z) = F_{4j,1}^k(z) + zF_3^1(z^{-1})F_{4j,0}^k(z). \qquad (129)$$

Since $j=0,1,\ldots,2^{k-2}-1$, we can substitute (107) and (108) in equation (129) and we get:

$$F_{4m+3}^{k+1}(z) = z(F_{4(2^{k-1}-j-1),0}^{k}(z^{-1}) + zF_3^1(z^{-1})F_{4(2^{k-1}-j-1),1}^{k}(z^{-1})).$$

From (84) in which z is replaced with $z^{-1}$ and from the definition of m, we obtain:

$$F_{4m+3}^{k+1}(z) = zF_{8(2^{k-1}-j-1)+3}^{k+1}(z^{-1}) \Leftrightarrow F_{4m+3}^{k+1}(z) = zF_{4(2^k-m-1)+3}^{k+1}(z^{-1}), \quad (130)$$

for $m=1,3,5\ldots,2^{k-1}-1$. Thus, by combining the results of equations (128) and (130) we have:

$$F_{4m+3}^{k+1}(z) = zF_{4(2^k-m-1)+3}^{k+1}(z^{-1}) \text{ for } m = 0, 1, 2, \ldots, 2^{k-1}-1. \quad (131)$$

Equations (115), (121), (126) (131) can be derived from equations (89)-(92) by replacing k with k+1 Thus the symmetry propositions $P_S(k+1)$ are true. This end the proof of the induction, that is the symmetry propositions $P_S(E)$ are true for any level E, with $E>1$.

As a practical example of the symmetry properties, the filter taps of the prediction filters of the 9/7 filter-pair for decomposition levels 1,2,3 are shown in Table II, III and IV. These properties, expressed by the set of equations (89)-(92), allow the reduction of the necessary multiplications for the complete-to-overcomplete transform derivation. This complexity analysis is given below.

As explained above, the level-by-level calculation of the overcomplete representation from the critically-sampled pyramid can be performed by using two techniques: the LL-LBS method described above and the prediction-filters method in accordance with the invention. Each technique operates in two modes depending on the current decomposition level. The first mode is the full-overcomplete (FO) transform-production mode, where the current decomposition level is the coarsest-resolution representation, therefore the low and the high-frequency subbands are produced (level 3 in the particular example of FIG. 3). The second is the high-frequency overcomplete (HFO) transform-production mode, where the current decomposition level is an intermediate-resolution level, and as a consequence, only the high-frequency subbands of this resolution need to be computed. In order to estimate the complexity of each technique, two factors are taken into account. The first is the necessary number of multiplication operations, which corresponds to the computational complexity of each method, since multiplication is the dominant operation in convolutional systems. The second is the delay for the production of the results of every level, which can be estimated under some assumptions concerning the degree of parallelism achievable in the implementation of every technique. Since systems with a high degree of parallelism are assumed and designs with the minimum amount of multiplications are chosen for both methods, the results of this section are more realistic for custom-hardware rather than processor-based solutions; in the latter, a lower level of parallelism is feasible and the minimization of MAC operations is the critical issue in the complexity reduction.

The following section focuses on the complexity analysis of the 1-D application of both methods. Moreover, following the extension of the prediction-filters to 2-D decompositions, it can be shown that the level-by-level application of the 2-D prediction filters is completely separable to the row and column filtering with the corresponding 1-D kernels. This matter is further discussed below.

Required Number of Multiplication Operations

We assume the general case of a biorthogonal filter-pair with $T_H$, $T_G$ denoting the number of taps for the filters H, $\tilde{G}$, and G, $\tilde{H}$ respectively. In addition we restrict our further presention to the case of point-symmetric filters, though the invention is not limited thereto; this option is mainly motivated by the fact that this sub-family of biorthogonal filters typically gives very good results in still-image and video coding.

For both methods we assume convolutional implementations. A lifting implementation is possible for the prediction filters, if the factorization algorithm of Sweldens is applied. Assuming convolutional implementation, for every application of the filter kernels we need to perform $$\left\lfloor \frac{T_H+1}{2} \right\rfloor \text{ and } \left\lfloor \frac{T_G+1}{2} \right\rfloor$$

multiplications because of the point-symmetry property of filters H,G. Notice that, both for the LL-LBS and the prediction-filters method, the classical point-symmetric extension (mirroring) is assumed for the signal edges. For an one-level wavelet decomposition or reconstruction of an N-point signal, the required number of multiplications is:

$$X_C(N) = \Psi_C(N) = \left(\left\lfloor \frac{T_H+1}{2} \right\rfloor + \left\lfloor \frac{T_G+1}{2} \right\rfloor\right)\frac{N}{2}, \quad (132)$$

where $X_C(N), \Psi_C(N)$ denote the number of multiplications needed to perform a complete decomposition and reconstruction of N samples respectively. For a decomposition where only the low-frequency (average) subband is produced, the required number of multiplications for an N-sample signal is:

$$X_A(N) = \left\lfloor \frac{T_H+1}{2} \right\rfloor \frac{N}{2}. \quad (133)$$

Similarly, for a decomposition where only the high-frequency (detail) subband is produced, the number of multiplications is:

$$X_D(N) = \left\lfloor \frac{T_G+1}{2} \right\rfloor \frac{N}{2}. \quad (134)$$

Finally, for a reconstruction from the low-frequency (average) subband only (only the number of non-zero multiplication operations is taken into account), the required multiplications for an N-sample output signal are:

$$\Psi_A(N) = \left\lfloor \frac{T_G+1}{2} \right\rfloor \frac{N}{2}. \quad (135)$$

By utilizing equations (132)-(135), we can calculate the required number of multiplications needed to derive the subbands $A_i^k, D_i^k$ starting from subbands $A_0^k$ and $D_0^k$, with k and $i \in [1, 2^k-1]$ denoting the decomposition level and the subband index respectively. As explained before, in order to ensure spatial scalability, all higher-resolution levels are assumed non-present during this procedure, hence $D_0^l=0$ for any $l\in[1,k-1]$.

As described above k inverse transforms should be performed to reconstruct the low-frequency subband (or the input signal) in the case of the LL-LBS method; for an example of k=3. Then, by performing a number of forward transforms retaining the even or odd polyphase components, all the subbands of the overcomplete representation at level k are produced. In general, starting from the subbands of the critically-sampled decomposition of an N-point sequence at level k, the number of multiplications required to perform the inverse transforms is:

$$\Psi_C\left(\frac{N}{2^{k-1}}\right) + \Psi_A\left(\frac{N}{2^{k-2}}\right) + \Psi_A\left(\frac{N}{2^{k-3}}\right) + \ldots + \Psi_A(N) = N\left[\left\lfloor\frac{T_H+1}{2}\right\rfloor 2^{-k} + \left\lfloor\frac{T_G+1}{2}\right\rfloor(1-2^{-k})\right]. \quad (136)$$

The multiplications required to perform the forward transforms, when operating in the FO-mode, are:

$$(2-1)X_A(N) + (4-1)X_A\left(\frac{N}{2}\right) + \ldots + (2^{k-1}-1)X_A\left(\frac{N}{2^{k-2}}\right) + (2^k-1)X_C\left(\frac{N}{2^{k-1}}\right) = \quad (137)$$
$$= N\left[\left\lfloor\frac{T_H+1}{2}\right\rfloor \cdot (k-1+2^{-k}) + (1-2^{-k})\left\lfloor\frac{T_G+1}{2}\right\rfloor\right]$$

The total number of multiplications performed with the LL-LBS method in order to calculate all the subbands of level k in the FO-mode can be derived by the sum of equations (136) and (137), given by:

$$M_{LL\text{-}LBS,FO}(k) = N\left[\left\lfloor\frac{T_H+1}{2}\right\rfloor \cdot (k-1+2^{1-k}) + \left\lfloor\frac{T_G+1}{2}\right\rfloor \cdot (2-2^{1-k})\right]. \quad (138)$$

When operating in the HFO-mode, the number of multiplications for the forward transforms of the current decomposition level k is modified, since for this level only the high-frequency subbands are produced:

$$(2-1)X_A(N) + (4-1)X_A\left(\frac{N}{2}\right) + \ldots + (2^{k-1}-1)X_A\left(\frac{N}{2^{k-2}}\right) + (2^k-1)X_D\left(\frac{N}{2^{k-1}}\right) = \quad (139)$$
$$= N\left[\left\lfloor\frac{T_H+1}{2}\right\rfloor \cdot (k-2+2^{1-k}) + (1-2^{-k})\left\lfloor\frac{T_G+1}{2}\right\rfloor\right]$$

Hence, the total multiplication budget is in this case:

$$M_{LL\text{-}LBS,HFO}(k) = N\left[\left\lfloor\frac{T_H+1}{2}\right\rfloor \cdot (k-2+3\cdot 2^{-k}) + \left\lfloor\frac{T_G+1}{2}\right\rfloor(2-2^{1-k})\right]. \quad (140)$$

In order to derive for the prediction-filters method the necessary number of multiplications for the level-by-level calculation of the overcomplete representation in the FO and HFO modes, we need to specify the necessary convolutions. For the level-by-level construction of level k with $k\geq 2$, we only have the subbands $A_0^k, D_0^k$, since $D_0^l=0$ for any $l\in[1,k-1]$. As a consequence, the sets of equations (6) and (8) are simplified to the following expressions:

$$A_1^k[n] = F_0^1[n]*A_0^k[n] + F_1^1[n]*D_0^k[n]$$
$$D_1^k[n] = F_2^1[n]*A_0^k[n] + F_3^1[n]*D_0^k[n], \quad (141)$$

with $k\geq 2$, and $$A_{2i_L+2^l}^k[n] = F_{8i_L+2}^{l+1}[n]*A_0^k[n] + F_{8i_L+1}^{l+1}[n]*D_0^k[n] \quad (142)$$
$$D_{2i_L+2^l}^k[n] = F_{8i_L+2}^{l+1}[n]*A_0^k[n] + F_{8i_L+3}^{l+1}[n]*D_0^k[n]$$
$$A_{2i_L+2^l+1}^k[n] = F_{8i_L+4}^{l+1}[n]*A_0^k[n] + F_{8i_L+5}^{l+1}[n]*D_0^k[n],$$
$$D_{2i_L+2^l+1}^k[n] = F_{8i_L+6}^{l+1}[n]*A_0^k[n] + F_{8i_L+7}^{l+1}[n]*D_0^k[n]$$

with $i_L\in[0,2^{l-1}-1]$, for every $l\in[1,k-2]$ and $k\geq 3$. Also, $$A_{2i_R+2^{k-1}}^k[n] = F_{8i_R}^k[n] * A_0^k[n] + F_{8i_R+1}^k[n] * D_0^k[n] \quad (143)$$

$$D_{2i_R+2^{k-1}}^k[n] = F_{8i_R+2}^k[n] * A_0^k[n] + F_{8i_R+3}^k[n] * D_0^k[n]$$

$$A_{2i_R+2^{k-1}+1}^k[n] = F_{8i_R+4}^k[n] * A_0^k[n] + F_{8i_R+5}^k[n] * D_0^k[n]$$

$$D_{2i_R+2^{k-1}+1}^k[n] = F_{8i_R+6}^k[n] * A_0^k[n] + F_{8i_R+7}^k[n] * D_0^k[n]$$

with $i_R \in [0, 2^{k-2}-1], i_R \in Z$ and $k \geq 2$.

Figure 4:
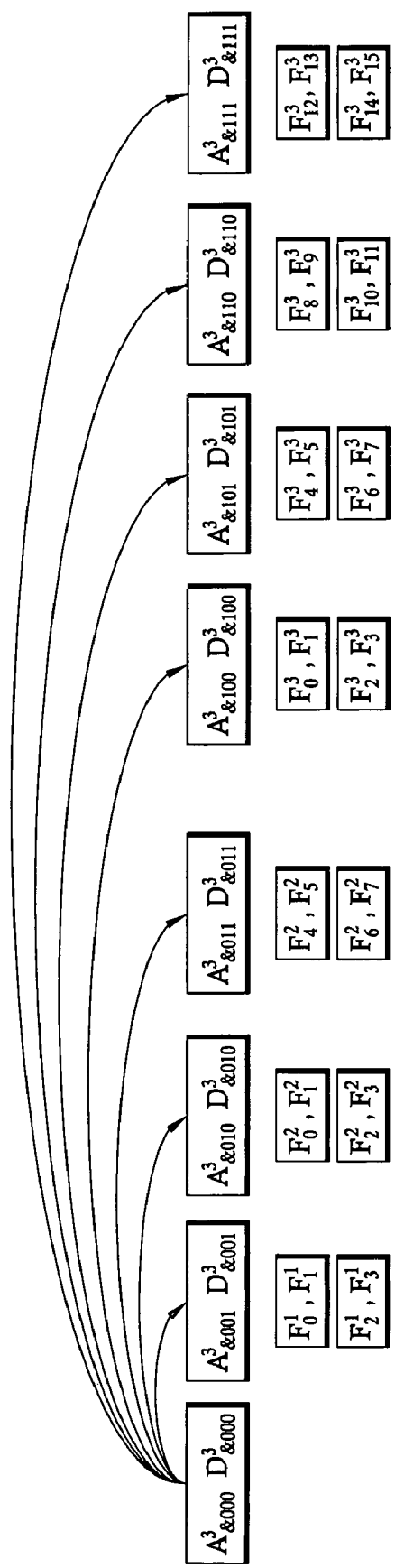
FIG. 4 shows an example of the derivation of the subbands of the Overcomplete Wavelet Transform of level 3 using a prediction-filter method in accordance with an embodiment of the invention.

Equations (141), (142) and (143) represent the calculation of the "left-half" and "right-half" of the overcomplete pyramid as seen from FIG. 5. Notice that each of the two subbands $A_0^k, D_0^k$ contains $$\frac{N}{2^k}$$

coefficients. From (141), (142), (143), it can be noticed that in the level-by-level framework, the calculation of the overcomplete subbands with the prediction filters described by the sets of equations (6) and (8) are reduced to a compact form that depends only on the critically-sampled subbands of current level, and on the set of the filters $F_m^l$ with $l \in [1 k], l \in Z$ and $m \in [0, 2^{l+1}-1], m \in Z$. As an example, by replacing $k=3$ one can extract from (141), (142) and (143) the necessary convolutions for the particular example of the level-by-level derivation of the subbands of level 3 via the prediction-filters method. This particular example is illustrated in FIG. 4.

The total calculation budget can be reduced if instead of performing directly the convolutions in (142) and (143) with the filters $$F_{8i+\{0,\ldots,7\}}^{l+1},$$

$l \in [1, k-1]$, $i=0, 1, \ldots, 2^{l-2}-1$, one replaces their expressions with their equivalent form given in equations (9)-(16). From these equations, it can be seen that the direct convolution with the filters $$F_{8i+(0,\ldots,7)}^{l+1}$$

can be replaced by convolutions with the filters $$F_{4i,0}^{l-1}, F_{4i,1}^{l-1},$$

coupled with the reuse of the results of convolution with the filters $F_0^1, F_1^1, F_2^1, F_3^1$.

This means that an update structure can be implemented so that the initial convolutions performed with the filters $F_0^1$, $F_1^1, F_2^1, F_3^1$ in the calculation of the subbands $A_1^k, D_1^k$ given by (141) are reused in the calculations performed in (142) and (143). This observation is formalized in Table V, where for each of the equations (9)-(16), the necessary convolutions and the corresponding number of multiplications are given as a function of the number of input samples (N), the decomposition level (k) and the number of taps of the used filter, denoted by T $$T_{F_{4i,q}^{l-1}}$$

with $q=0,1$. Notice from Table V that the reused convolutions of equations (9)-(16) are: $[F_0^1[n]*A_0^k[n]]$, $[F_1^1[n]*D_0^k[n]]$, $[F_2^1[n]*A_0^k[n]]$ and $[F_3^1[n]*D_0^k[n]]$. Notice also that $[F_0^1[n]*A_0^k[n]]$ is equivalent to $-[F_3^1[n]*A_0^k[n]]$, as it comes out from equations (17), (18), and hence can be used also for the convolution $F_3^1[n]*A_0^k[n]$ which appears in (9).

By summing up the multiplications reported in Table V and the necessary multiplications required for the filters of the first level, one can derive the number of the multiplication operations needed to calculate in the FO mode the subbands for every level k for an N-point input signal:

$$M_{P-Filters,FO} = \frac{N}{2^k}\left(\sum_{i=2}^{k}\sum_{i=0}^{2^{i-2}-1} 6\left(T_{F_{4i,0}^{i-1}} + T_{F_{4i,1}^{i-1}}\right) + \sum_{i=0}^{3} T_{F_i^1}\right) = \quad (144)$$

$$\frac{N}{2^k}\left(6\sum_{i=2}^{k}\sum_{i=0}^{2^{i-2}-1} T_{F_{4i}^{i-1}} + \sum_{i=0}^{3} T_{F_i^1}\right).$$

In the HFO mode, where only the high-frequency subbands of the overcomplete transform are calculated, only the filters $F_{8i_L+2}^{l+1}$, $F_{8i_L+3}^{l+1}$, $F_{8i_L+6}^{l+1}$, $F_{8i_L+7}^{l+1}$ and $F_{8i_R+2}^k, F_{8i_R+3}^k$, $F_{8i_R+6}^k, F_{8i_R+7}^k$ $\forall i_L, i_R$ have to be used for the "left-half" and "right-half" parts, as seen from (142) and (143). For every value of k, this corresponds to filters $F_{8i+2}^k, F_{8i+3}^k$ and $F_{8i+6}^k$, $F_{8i+7}^k$ of equations (11), (12) and (15),(16). Thus the situation is limited to the second and the fourth row of Table V and to filters $F_2^1$ and $F_3^1$ for the first decomposition level (equation (141)). As a result, if one assumes that the system is operating in the HFO mode, equation (144) is modified to:

$$M_{P-Filters,HFO} = \frac{N}{2^k}\left(\sum_{i=2}^{k}\sum_{i=0}^{2^{i-2}-1} 3\left(T_{F_{4i,0}^{i-1}} + T_{F_{4i,1}^{i-1}}\right) + T_{F_2^1} + T_{F_3^1}\right) = \quad (145)$$

$$\frac{N}{2^k}\left(3\sum_{i=2}^{k}\sum_{i=0}^{2^{i-2}-1} T_{F_{4i}^{i-1}} + T_{F_2^1} + T_{F_3^1}\right).$$

For the prediction filters of level 1, one can reduce the number of multiplications by exploiting the point-symmetry (or half-point symmetry) properties of these filters, expressed in equations (93)-(98). In addition, the general symmetry-properties for the prediction filters of point-symmetric biorthogonal filter-pairs can be used to reduce the number of multiplications for the higher decomposition levels as well, as explained in the following.

Figure 6:
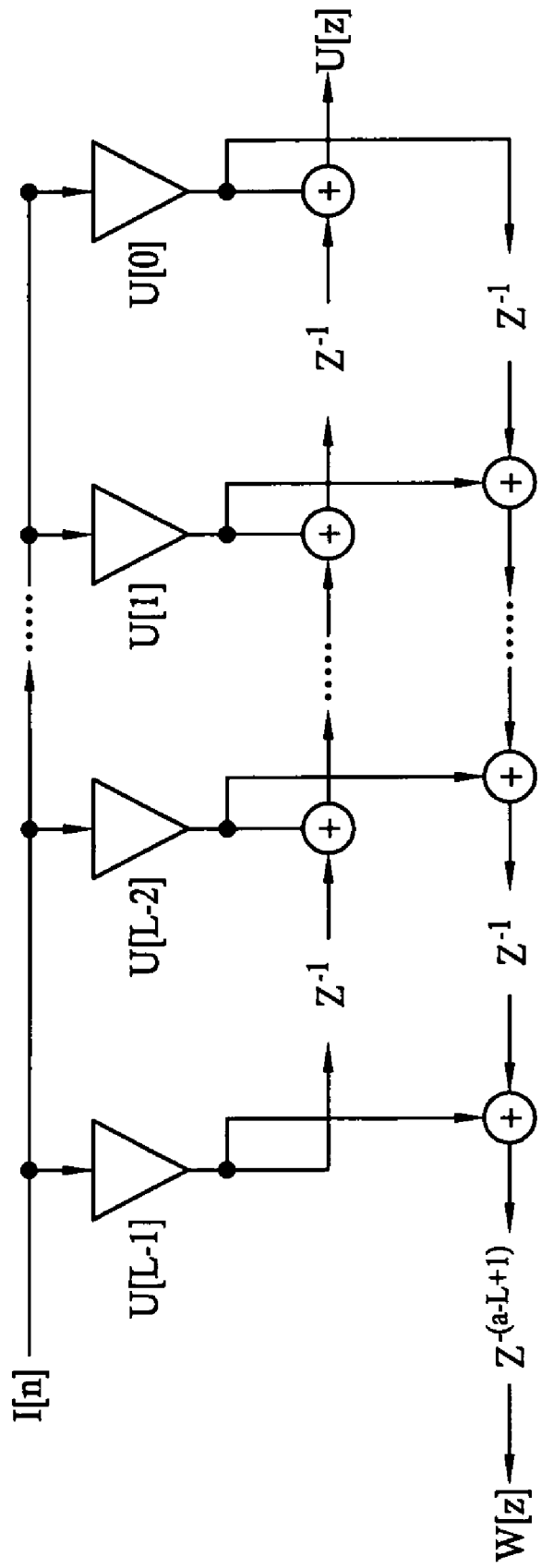
FIG. 6 shows a memory structure for the concurrent application of the L-tap filters U[n] and W[n] to the input sequence I[n] using a kernel with L multipliers according to an embodiment of the invention. The filters are linked with the relation $W(z)=z^{-a}U(z^{-1})$.

Convoluting an input sequence $I[n]$ with two FIR filters $U[n]$ and $W[n]$ that are linked with the relationship $W(z)=z^{-a}U(z^{-1})$ requires the same multiplications but performed in a different order. This is a corollary from the fact that by representing the two filters in the frequency domain, one has $W(e^{j\Omega})=e^{-j\Omega a}U(e^{j\Omega})^*$, and hence the sequences $U(e^{j\Omega}) \cdot I(e^{j\Omega})$, $U(e^{j\Omega})^* \cdot I(e^{j\Omega})$ represent the same multiplications but with alternating signs for the imaginary part (due to the complex conjugate in the frequency domain). As a result, a memory structure can be utilized to delay the intermediate results of the convolution in the time domain for the parallel calculation of U[n]*I[n] and W[n]*I[n]. For an L-tap filter U[n], such a memory structure is shown in FIG. 6. Similar forms are commonly utilized for the efficient realization of FIR orthogonal filter-banks. Using such memory structures for the parallel application of the prediction filters, the required number of multiplications can be reduced by half, for every set of prediction filters $F_i^l$. This can be seen from the example of FIG. 4, where, if four memory structures are utilized for the application of filters $F_0^2, F_1^2, F_2^2, F_3^2$ to the input sequences $A_0^3, D_0^3$, the results of the application of filters $F_4^2, F_5^2, F_6^2, F_7^2$ are obtained as well, due to the symmetry properties; see equations (99)-(102). Hence, subbands $A_2^3, D_2^3$ and $A_3^3, D_3^3$ are created in parallel by applying only one quadruplet of filters implemented with four memory structures similar to the one seen in FIG. 6. In the same fashion, the application of filters $F_0^3, F_1^3, F_2^3, F_3^3, F_4^3, F_5^3, F_6^3, F_7^3$ in FIG. 4 creates the results of $F_{12}^3, F_{13}^3, F_{14}^3, F_{15}^3, F_8^3, F_9^3, F_{10}^3, F_{11}^3$ respectively; see equations (89)-(92) with k=3.

Generalizing this property, for every level k, the convolutions of filters $F_0^1, F_1^1, F_2^1, F_3^1$ and filters $F_j^l$ or $F_{2^l+j}^l$ with $l \in [2,k]$ and $\forall l: j \in [0, 2^l-1]$ with the input subbands $A_0^l, D_0^l$ suffice for the calculation of all the subbands of the overcomplete representation of this level. Equivalently, a mixed calculation-order can be selected, i.e. the convolutions with filters $F_{4m}^l, F_{4m+1}^l, F_{4m+2}^l, F_{4m+3}^l$ can be used to produce filters $F_{4(2^{l-1}-m-1)}^l, F_{4(2^{l-1}-m-1)+1}^l, F_{4(2^{l-1}-m-1)+2}^l, F_{4(2^{l-1}-m-1)+3}^l$ respectively for the even values of m (and zero) and vice-versa for the odd values of m, with $m=0,1,\ldots,2^{l-2}-1$ and $l \in [2,k]$. For example, for the calculation of the overcomplete transform of level 3, the convolutions with filters $F_0^3, F_1^3, F_2^3, F_3^3$ and $F_8^3, F_9^3, F_{10}^3, F_{11}^3$ can provide the results of filtering with $F_{12}^3, F_{13}^3, F_{14}^3, F_{15}^3$ and $F_4^3, F_5^3, F_6^3, F_7^3$ respectively.

However, as mentioned before, in order to reuse the previously produced results, the implementation of the convolutions with filters $F_j^l$ and $F_{2^l+j}^l$ is based on the update structure shown in Table V and not on the direct application of the filters. Thus, filtering with $F_j^l$ and $F_{2^l+j}^l$ is performed by the separate applications of filters $F_{4i,0}^{l-1}(z), F_{4i,1}^{l-1}(z)$, as seen in Table V. As a result, in order for the multiplication-reductions to be valid in this update-structure implementation, it should be shown that all convolutions with the filters seen in Table V can produce the convolutions with the time-inverse filters as well, without additional multiplications. This is shown in the next paragraph.

By replacing z with $z^{-1}$ in equations (9)-(16), the time-inversed update-structure of the prediction filters can be written:

$$F_{8i}^k(z^{-1}) = F_{4i,0}^{k-1}(z^{-1}) - zF_3^1(z^{-1})F_{4i,1}^{k-1}(z^{-1}), \quad (146)$$

$$F_{8i+1}^k(z^{-1}) = zF_1^1(z^{-1})F_{4i,1}^{k-1}(z^{-1}), \quad (147)$$

$$F_{8i+2}^k(z^{-1}) = zF_2^1(z^{-1})F_{4i,1}^{k-1}(z^{-1}), \quad (148)$$

$$F_{8i+3}^k(z^{-1}) = F_{4i,0}^{k-1}(z^{-1}) + zF_3^1(z^{-1})F_{4i,1}^{k-1}(z^{-1}) \quad (149)$$

$$F_{8i+4}^k(z^{-1}) = F_{4i,1}^{k-1}(z^{-1}) + F_0^1(z^{-1})F_{4i,0}^{k-1}(z^{-1}), \quad (150)$$

$$F_{8i+5}^k(z^{-1}) = F_1^1(z^{-1})F_{4i,0}^{k-1}(z^{-1}), \quad (151)$$

-continued $$F_{8i+6}^k(z^{-1}) = F_2^1(z^{-1})F_{4i,0}^{k-1}(z^{-1}), \quad (152)$$

$$F_{8i+7}^k(z^{-1}) = F_{4i,1}^{k-1}(z^{-1}) + F_3^1(z^{-1})F_{4i,0}^{k-1}(z^{-1}) \quad (153)$$

For the filters seen in the right parts of expressions (146)-(153), the application of $z^{-a}F_{4i,0}^{l-1}(z^{-1}) \cdot I_1, z^{-a} F_{4i,1}^{l-1}(z^{-1}) \cdot I_2$, with $a=0,-1$, to any inputs $I_1, I_2$ can be performed by $F_{4i,0}^{l-1}(z) \cdot I_1, F_{4i,1}^{l-1}(z) \cdot I_2$ with the use of two memory structures such as the one seen in FIG. 6. In addition, based on the symmetry properties shown in equations (93)-(97), any convolution with filters $F_0^1(z^{-1}), F_1^1(z^{-1}), F_2^1(z^{-1}), F_3^1(z^{-1})$ is equivalent to the convolution with $F_0^1, F_1^1, F_2^1, F_3^1$ (with the appropriate delays). As a result, all the filter-applications shown in the time-inversed update-structure of (146)-(153) can be implemented by the convolutions shown in Table V and a number of memory structures such as the one shown in FIG. 6; hence the update-structure implementation can provide the convolutions with the time-inversed filters with no additional arithmetic operations. Summarizing, since the update-structure implementation of filters $F_j^l(z)$ can provide the results of filters $F_j^l(z^{-1})$, based on the prediction-filter symmetries, the results of filters $F_j^l(z^{-1})$ provide the convolutions with $F_{2^l+j}^l(z)$.

Exploiting this symmetry by selecting the filters to implement according to the mixed calculation-order that was mentioned before, the number of multiplications in the FO-mode with the prediction-filters method is reduced to the half of Table V. By choosing to implement equations (9)-(12), the required multiplications are:

$$M_{P-Filters,sym,FO} = \quad (154)$$
$$\frac{N}{2^k}\left(2\sum_{l=2}^{k}\sum_{i=0}^{2^{l-2}-1}\left(T_{F_{4i,0}^{l-1}} + 2T_{F_{4i,1}^{l-1}}\right) + \sum_{i=0}^{3}\left\lfloor\frac{T_{F_i^1}+1}{2}\right\rfloor\right).$$

Similarly, for the HFO-mode, the implementation of equations (11), (12) requires:

$$M_{P-Filters,sym,HFO} = \quad (155)$$
$$\frac{N}{2^k}\left(\sum_{l=2}^{k}\sum_{i=0}^{2^{l-2}-1}\left(T_{F_{4i,0}^{l-1}} + 2T_{F_{4i,1}^{l-1}}\right) + \left\lfloor\frac{T_{F_2^1}+1}{2}\right\rfloor + \left\lfloor\frac{T_{F_3^1}+1}{2}\right\rfloor\right).$$

Table VI shows for both the FO and the HFO-modes, the number of taps for the filters $$F_{4i}^{l-1}, F_{4i,0}^{l-1}, F_{4i,1}^{l-1}$$

for the typical 9/7 biorthogonal filter-pair, with $l \in [2,4]$. This table reports also the required number of multiplications for the LL-LBS method and for the prediction-filters method for the construction of all subbands of level 1 as calculated by equations (138), (140) and (154), (155) respectively. The last column of Table VI shows the percentage of the reduction in the multiplication budget.

The numbers of multiplications shown in parenthesis correspond to an approximation of the prediction filters where, for the filters of the update structure of every level, all taps smaller than a threshold are set to zero. In this way, the size of the filters of each level is reduced, while a good approximation of the final result is obtained. This technique cannot be applied in the LL-LBS approach since the taps of the biorthogonal filter-pairs do not have magnitudes below the chosen thresholds. Table VIII shows the values used for the thresholds and the resulting maximum mean-square error (MMSE) between the results obtained with the original and thresholded prediction filters when applied in the 2-D (row-column) manner to the 8-bit images of the JPEG-2000 test-set. It can be observed from the MMSE values that the chosen method for thresholding has a minimal effect on the results of the prediction filters while it reduces significantly the computational load.

Delay for the Calculation of the Subbands of Decomposition Level k.

The delay occurring in the calculation of the subbands of the overcomplete pyramid of decomposition level k using the prediction-filters and the LL-LBS methods is now presented. As in the previous sections, we discuss the case of biorthogonal, point-symmetric filter-pairs. Consider that the two methods are implemented in a system where one application of a filter-kernel on an input sequence requires $a_{LBS}$ processing cycles for the LL-LBS method and $a_{PF}$ processing cycles for the prediction-filters method. Furthermore, to diminish the side effects of scheduling algorithms for the multiple filtering operations, we assume the case of high parallelism, where one filter-kernel per required convolution is present. In this way, every filtering application initiates as soon as sufficient input is present. Moreover, to facilitate the description, the delay resulting from the storage or retrieval of intermediate results is not taken into account. In addition, in this case of high-parallelism, the delay for the calculations in the FO mode is equivalent to the one for the HFO mode, with the latter requiring less filter-kernels. Hence no distinction is made between the two modes in the following, and the numbers for the filter-kernels refer to the FO mode, which represents the worst case between the two.

Starting from the subbands $A_0^k, D_0^k$, the LL-LBS method performs k inverse transforms and $$\sum_{l=1}^{k} (2^l - 1)$$

forward transforms to produce the subbands of the overcomplete representation. See FIG. 3 for an example with k=3 and FIG. 5 which represents the overcomplete pyramid in the general case of k+1 decomposition levels. The cascade initiation of each of the inverse transforms at levels k-1, k-2, . . . , 1 requires $$\left\lfloor \frac{T_G + 1}{2} \right\rfloor$$

input samples to be present at every level, so that mirroring and the first filter-kernel application can take place. Such an example is given in the top-left part of FIG. 7 for the calculation of level k−1 from level k. Notice from this figure that since the subbands $D_0^l$ with l∈[1,k−1] are not available, the samples of the low-frequency subbands are interpolated with zeros at every level l.

Figure 7:
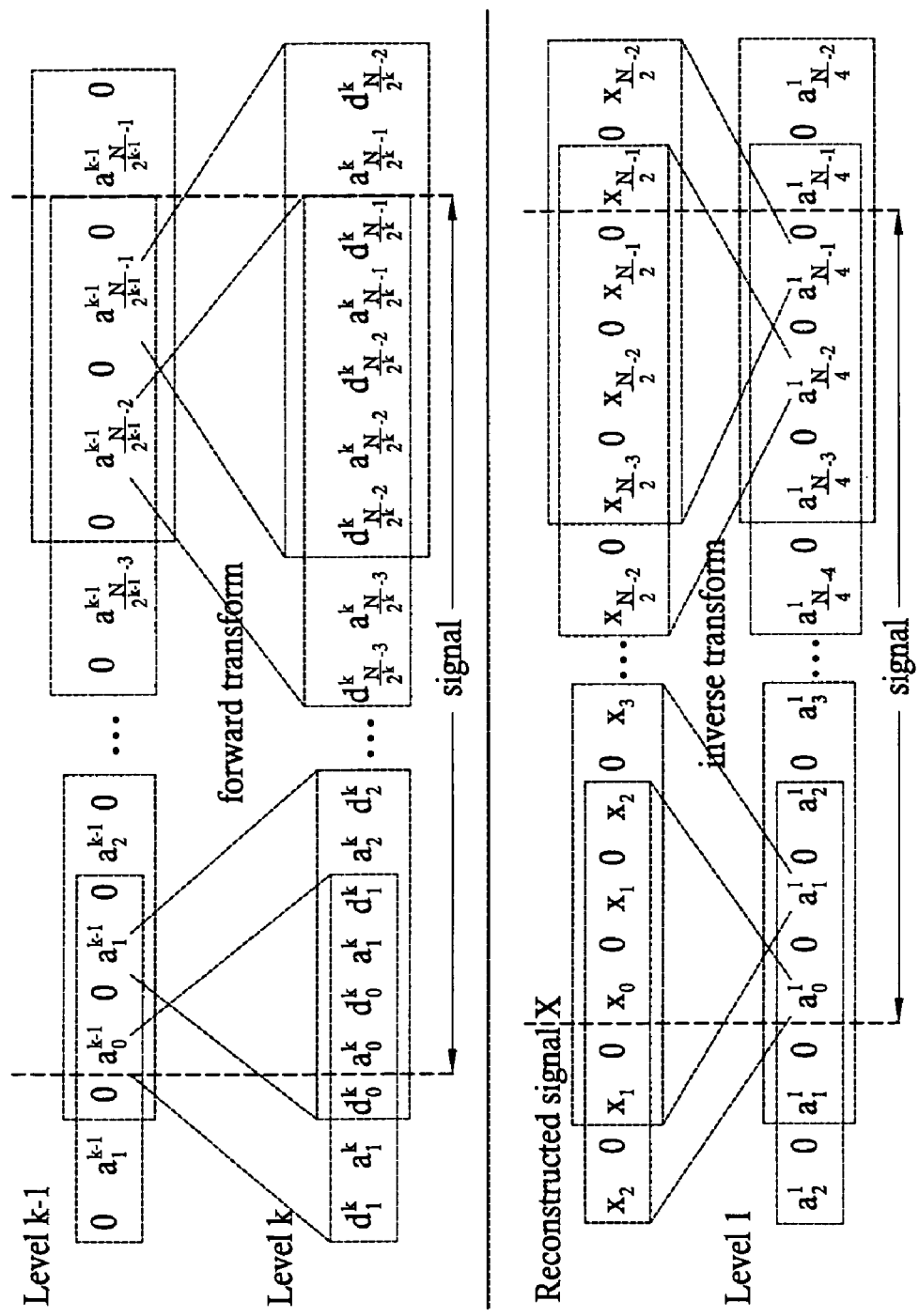
FIG. 7 shows in the upper half the mirroring at the subband edges and the initiation and finalization of the inverse transform for level k−1 that emerges from level k. The lower half shows the mirroring and initiation and finalization of the forward transform of level 1 that emerges from the reconstructed signal X. The figure represents the inverse and forward transforms with the 9/7 filter-pair, where $T_H=9, T_G=7$.

After the initiation phase, all filter-kernels of every level work in parallel to perform the inverse transforms; this is equivalent to the inverse RPA algorithm of Vishwanath, but without considering the high-frequency subbands. In order to produce $$\left\lfloor \frac{T_G + 1}{2} \right\rfloor$$

samples at every level, the filter-kernel of the previous level is applied $$\left\lfloor \frac{\left\lfloor \frac{T_G + 1}{2} \right\rfloor + 1}{2} \right\rfloor$$

times, as seen in the top-left of FIG. 7 with $T_G$=7. Similarly, for the initiation of the entire forward transforms, $$\left\lfloor \frac{T_H + 1}{2} \right\rfloor$$

input samples is present in the signal X and at the levels 1,2, . . . , k−1. This implies $$\left\lfloor \frac{\left\lfloor \frac{T_H + 1}{2} \right\rfloor + 1}{2} \right\rfloor$$

applications of the filter-kernel in the previous level, to initiate the forward transform in the current level. An example of the mirroring and initiation of the forward transform of level 1 which is calculated from the signal x is given in the lower-left part of FIG. 7 with $T_H$=9. After this point, all filter-kernels of the LL-LBS system work in parallel. Hence, the latency occurring in the initiation phase of the production of all subbands of level k is:

$$L_{init,LL\text{-}LBS}(k) = \left[ (k-1) \left\lfloor \frac{\left\lfloor \frac{T_G + 1}{2} \right\rfloor + 1}{2} \right\rfloor + k \left\lfloor \frac{\left\lfloor \frac{T_H + 1}{2} \right\rfloor + 1}{2} \right\rfloor \right] \cdot a_{LBS}. \quad (156)$$

The total time required for the completion of all subbands is determined by the filtering of the sequence with the maximum length, since during this process the highest number of consecutive filter-kernel applications occurs. The sequence with the maximum length in the pyramid of the overcomplete transform is the sequence of the reconstructed signal X. The filtering of x requires $$\frac{N}{2}$$

applications of filter H to produce the subband $A_1^1$, as it can be noticed from the pictorial explanation given in the lower part of FIG. 7.

To summarize, the latency occurring in the production of the first coefficient of this sequence is $$(k-1)\left[\frac{\left\lfloor\frac{T_G+1}{2}\right\rfloor+1}{2}\right]a_{LBS}$$

processing cycles (see equation (156)). The filtering of X requires $$\frac{N}{2}a_{LBS}$$

processing cycles to produce the subband $A_1^1$. After the completion of this operation, finalized with the mirroring of the subband border, the coefficient $$a_{\frac{N}{4}-1}^1$$

is produced. The remaining filtering applications for the following decomposition levels (levels 1, 2, ..., k) require $$k\left[\frac{\left\lfloor\frac{T_H+1}{2}\right\rfloor+1}{2}\right]a_{LBS}$$

processing cycles, so that, in the same manner, all the coefficients $$a_{\frac{lN}{2^{l+1}}-1}^{l}$$

with l∈[2,k] are produced. As a result, the total delay of the LL-LBS system for the production of all the subbands of decomposition level k for an N-point input sequence is:

$$L_{LL-LBS}(k,N) = \qquad (157)$$

$$\left[(k-1)\left[\frac{\left\lfloor\frac{T_G+1}{2}\right\rfloor+1}{2}\right]+\frac{N}{2}+k\left[\frac{\left\lfloor\frac{T_H+1}{2}\right\rfloor+1}{2}\right]\right]a_{LBS} =$$

$$\left(L_{init,LL-LBS}(k)+\frac{N}{2}\right)a_{LBS}$$

For the prediction-filters method, the convolutions with the filters $F_0^2, F_1^2, F_2^2, F_3^2$, can be initiated in parallel for the calculation of the subbands $A_1^k, D_1^k$. Subsequently, the filters that produce the rest of the subbands of level k can also be applied in parallel using the update-structure implementation. The application of all these filter-kernels will occur as soon as enough coefficients from the sequences $[F_0^1[n]*A_0^k[n]]$, $[F_1^1[n]*D_0^k[n]]$, $[F_2^1[n]*A_0^k[n]]$, $[F_3^1[n]*D_0^k[n]]$ are calculated, so that the necessary mirroring in the update structure can be performed. In addition, a delay equal to the maximum filter-length is required so that the calculations of the subbands that are produced by the time-inversed impulse responses are initiated as well by the memory structures. Hence, the latency for the initiation of all the convolutions is:

$$L_{init,P-Filters}(k) = \qquad (158)$$

$$a_{PF}\cdot\left(\left[\frac{\max\{T_{F_{i,0}^l},T_{F_{i,1}^l},T_{F_j^l}\}+1}{2}\right]+\max\{T_{F_{i,0}^l},T_{F_{i,1}^l},T_{F_j^l}\}\right),$$

with l∈[2,k-1],i∈[0,$2^{l-2}$-1],j∈[0,3].

Then, the delay for the completion of the process is simply:

$$L_{P-Filters}(k,N) = L_{init,P-Filters}(k)+\frac{N}{2^k}a_{PF} = \qquad (159)$$

$$\left(\left[\frac{\max\{T_{F_{i,0}^l},T_{F_{i,1}^l},T_{F_j^l}\}+1}{2}\right]+\max\{T_{F_{i,0}^l},T_{F_{i,1}^l},T_{F_j^l}\}+\frac{N}{2^k}\right)a_{PF}.$$

The results of (157), (159) show that, under the same assumptions of system parallelism, the complete to overcomplete transform derivation of resolution level k for an N-point input sequence via the prediction-filters method achieves a delay proportional to $$\frac{N}{2^k}a_{PF}$$

processing cycles, while the LL-LBS approach produces the subbands of the same level with a fixed delay proportional to $$\frac{N}{2}a_{LBS}.$$

Table VII shows a comparison for a typical case where N=512,$T_H$=9,$T_G$=7 for various decomposition levels. We notice from these results that a significant gain is achieved in the reduction of the system delay with the prediction-filters method.

Extension to 2-D

The 2-D extension of the LL-LBS and the prediction-filters method can be intuitively performed by extending the 1-D application to a separate application to the rows of the input subbands and to the columns of the produced results. Such extensions are due to the separability property of the DWT. For the level-by-level construction of the overcomplete DWT of an N×M input frame, the separable row and column application leads to the same computational gains for the prediction-filters method in comparison to the LL-LBS approach as in the 1-D case. The delay of every method when applied in two dimensions is dependent on the level of parallelism for each system. Since the prediction filters method requires only the application of a set of filters in the row and column directions, under any practically-applicable level of parallelism, this method is expected to achieve a much lower delay for the production of the 2-D overcomplete transform than the 2-D LL-LBS method, which consists of a cascaded multirate filter-bank implementation. Similarly, every method can be implemented by two separate systems: one for the row and one for the column processing. If the results after the production of one row of every subband are immediately used for the continuation of the vertical filtering for all the columns of this subband, and the column filtering completes when the next row is received, the delay for the production of the results is simply the delay for the completion of the row-by-row filtering plus the delay for the completion of the columns' processing with the results of the last row. The column processing begins after an initiation latency so that enough coefficients exist columnwise for the mirroring and for the initiation of the filter-applications required for every method. Since the process is separable, the initiation latency is equivalent to the one of the 1-D case. Hence, for the LL-LBS method, the required processing-cycles are:

$$L_{2D,LL-LBS}(k, N \times M) = \left(N + \frac{L_{init,LL-LBS}(k)}{a_{LBS}}\right) L_{LL-LBS}(M) \quad (160)$$

$$= \left(\frac{L_{init,LL-LBS}(k)}{a_{LBS}} + N\right) [L_{init,LL-LBS}(k) -$$

$$k + \frac{M}{2}] a_{LBS}$$

while the prediction-filters method requires:

$$L_{2D,P-Filters}(k, N \times M) = \left(\frac{N}{2^k} + \frac{L_{init,P-Filters}(k)}{a_{PF}}\right) L_{P-Filters}(k, M) \quad (161)$$

$$= \left(\frac{L_{init,P-Filters}(k)}{a_{PF}} + \frac{N}{2^k}\right) (L_{init,P-Filters}(k) +$$

$$\frac{M}{2^k}) a_{PF}$$

The results of (160), (161) show that the prediction-filters method achieves a delay proportional to $$\frac{N \times M}{2^{2k}} a_{PF}$$

processing cycles for the complete to overcomplete transform derivation of resolution level k for an N×M input frame, while the LL-LBS approach achieves a fixed delay proportional to $$\frac{N \times M}{2} a_{LBS},$$

under the same assumptions of system parallelism.

From the above, the skilled person appreciates certain aspects of the invention as it relates to the complete to overcomplete DWT derivation. For the level-by-level calculation of the overcomplete DWT for biorthogonal point-symmetric filter-pairs, the required computational-budget is reduced by creating a structure that exploits the symmetries of this new approach. A complexity analysis reveals that the proposed prediction-filters scheme in accordance with the invention is more efficient than the conventional method for the complete to overcomplete transform derivation in a scalable video coding system because it offers computational savings and a scalable reduction in the system delay. These features lead to inherent computational scalability for the prediction-filters, since, under fixed delay-constraints for the performance of the complete-to-overcomplete transform for every resolution level, the codecs that work in resolution-level k can be implemented with filter-kernels that operate in $2^{2k-2}$ times smaller clock-frequency than the kernels used in the system that operates in the full-resolution level (k=1). Conversely, using the same implementation technology for all resolution levels, in the low-resolution codecs the level of parallelism can be reduced by well-known techniques such as folding or retiming without surpassing the delay-constraint of the full-resolution codec. This in turn leads to simple and more power-efficient. The scalability in the power consumption can be a critical point in the total system design since in many cases very-low resolution video-codecs are designed for portable devices.

From the flexibility point of view, by thresholding the filter-taps of the update structure implementation, the number of multiplications required for the prediction filters is reduced without a substantial loss in the accuracy of the produced results, something that is not the case for the LL-LBS method. In addition, the prediction-filters system possesses a simple implementation structure, since it consists of the parallel application of a set of filters to the same input (single-rate), while the LL-LBS approach requires precise control on the data-flow in the multirate implementation-structure in order to achieve a high-parallel system. As a result, the selective construction of specific blocks of the various subbands of the overcomplete transform in the decoder is expected to be much easier in the prediction-filters system than in the conventional LL-LBS approach.

In the following implementations of the above methods are described. In further embodiments of the invention a video encoder and/or decoder based on the in-band motion compensation theory (codec of FIG. 8), either in the spatial or wavelet domain, are disclosed.

In a second embodiment the 'bottom-up' ODWT (overcomplete discrete wavelet transform), based on the in-band motion compensation methods described above, can be used in a wavelet video encoder in the following way (see FIGS. 8 and 9). The wavelet video encoder has the in-band structure, which means that motion compensation (MC) performed in the motion compensation module 128 is performed in the wavelet domain. The motion vectors (MV) 132, provided by a motion estimation (ME) algorithm (e.g., block-based) carried out in the motion estimation module 130, are preferably given with highest possible accuracy and are either estimated in the spatial (see embodiment of FIG. 8) or in the wavelet domain (see embodiment of FIG. 9). The 'bottom-up' ODWT module 122 takes as input the reconstructed reference wavelet subband image after the inverse quantization IQ in IQ module 111 and summation in summer 114. The overcomplete representation generated by application of a digital filter is stored in a memory buffer (Oref FM) 124. The motion compensation process carried out in the motion compensation module 128 takes as input the motion vectors and this overcomplete representation. Depending on the motion vectors, blocks of coefficients are selected using a selection means in the motion compensation unit 128 from the overcomplete representation. These coefficients are combined into a wavelet decomposition that is a prediction of the wavelet decomposition of the current image of the video sequence.

This prediction is subtracted from the wavelet decomposition of the current image in subtracter 106 resulting in a wavelet subband error image. This subband error image is subsequently quantized in quantizer 107 and coded in subband coder 108. The subband error image is also inversely quantized in IQ module 111 and added to the previous prediction from the MC module 128 in adder 114 in order to obtain the next reconstructed reference wavelet subband image to be used by the 'bottom-up' ODWT module 122 in the following iteration.

Figure 8:
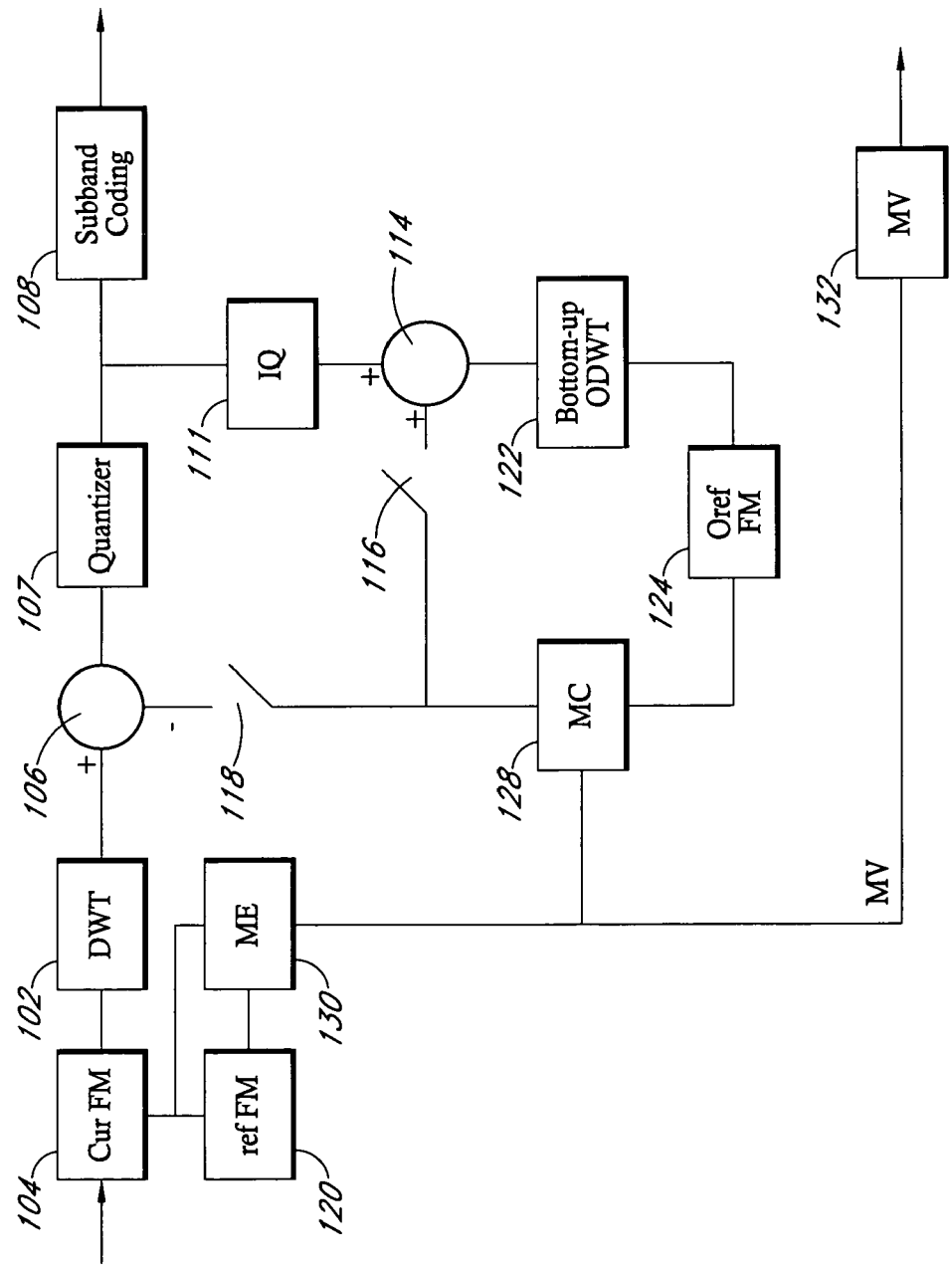
FIG. 8 shows a wavelet video encoder according to an embodiment of the invention based on 'bottom-up' ODWT; motion estimation in spatial domain.
Figure 9:
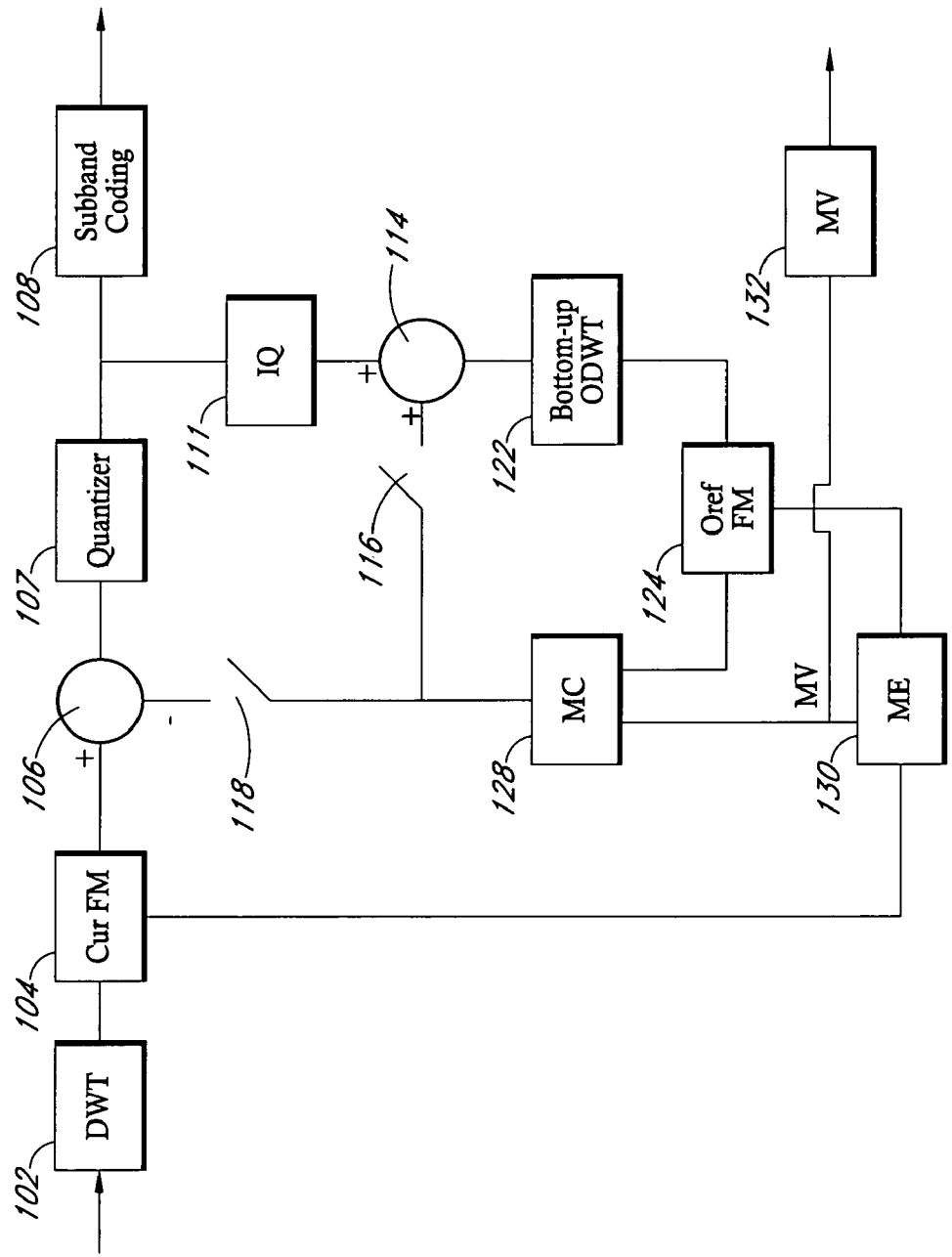
FIG. 9 shows a wavelet video encoder according to an embodiment of the invention based on 'bottom-up' ODWT; motion estimation in wavelet domain.

The main difference between FIGS. 8 and 9 is that in FIG. 8 the motion estimation is carried out in the spatial domain whereas in FIG. 9 these vectors are determined in the wavelet domain. In the embodiment of FIG. 8 the motion vectors are supplied to the motion compensation module and the receiver from the motion estimation module 130. A selection means in MC module 128 selects the most appropriate subbands, e.g., block subbands, from the overcomplete representation in buffer 124. In FIG. 9 the motion estimation is made using the subbands of the overcomplete representation stored in buffer 124. This motion cestimation can be made level-by-level.

Figure 10:
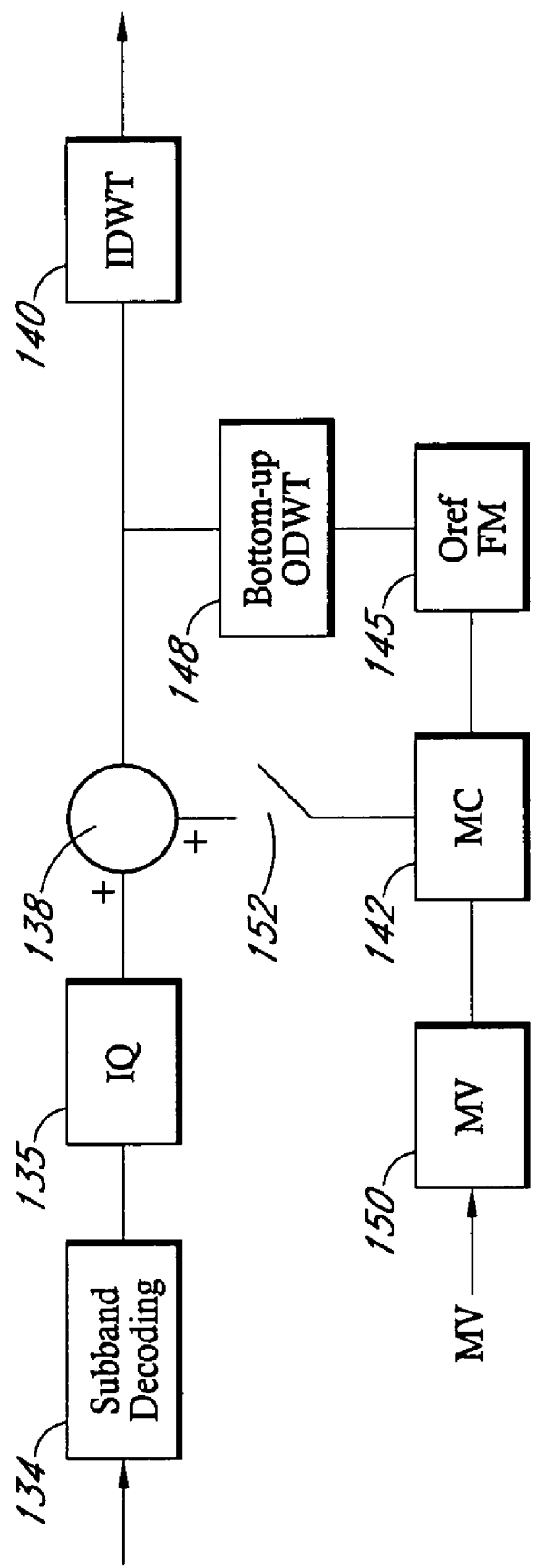
FIG. 10 shows a wavelet video decoder in accordance with an embodiment of the invention based on 'bottom-up' ODWT.

The wavelet video decoder (see FIG. 10, having modules common to both embodiments of FIGS. 8 and 9) operates in an analogous way. The input for the subband decoder module 134 is the quantized and coded wavelet subband error image. The decoded error image is supplied to the inverse quantizer 135 which ouputs an inversely quantized subband error image which is summated in the summer 138 with the predicted wavelet subband image originating from the motion compensation module 142. This results in the reconstruction of the current wavelet subband image of the video sequence, which will subsequently be reconstructed by the IDWT (inverse DWT) module 140. The reconstructed wavelet subband image is also the input for the 'bottom-up' ODWT module 148 that generates the overcomplete representation to be stored into the memory buffer (Oref FM), e.g., using application of predictor digital filters as described above. Then the motion compensation module 142 selects wavelet coefficients from this overcomplete representation based on the decoded motion vectors 150. These wavelet coefficients are combined into a wavelet decomposition that is a prediction of the current wavelet subband image of the video sequence. This prediction will be summated to the decoded and inversely quantized wavelet subband error image in the following iteration in summer 138. Note that the switches 116, 118; 152 in both the encoders of FIGS. 8 and 9 and the decoder of FIG. 10, respectively provide either the intra (open switch) or the inter (closed switch) encoding/decoding state. The text above is a description of the inter encoding/decoding state. In the intra encoding/decoding state, a full wavelet subband image is processed instead of a subband error image.

Figure 14:
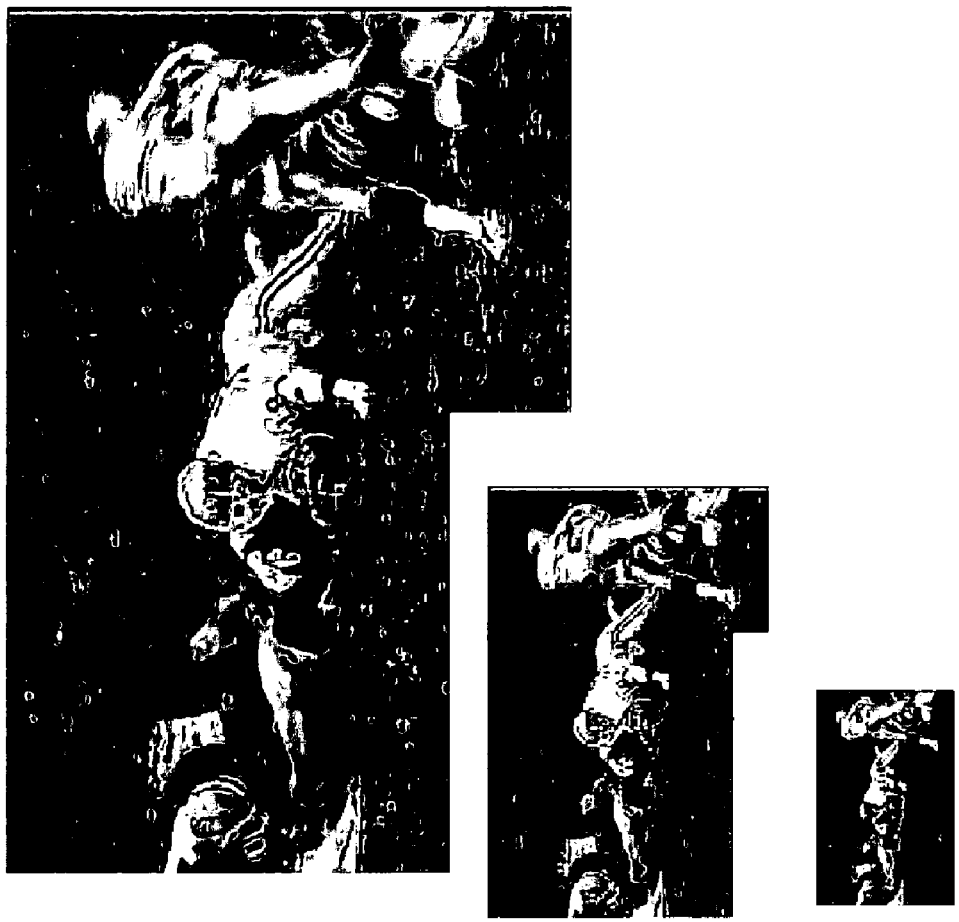
FIG. 14 shows frame 5 of a football sequenve decomprtessed at 760 kps in different resolutions. From top to bottom: original size, half resolution and quarter resolution.

Alternatively formulated the proposed coding scheme with motion estimation in the wavelet domain can be applied to the encoder shown in FIG. 1*a*. The operation shows a hybrid coding structure; thus when coding in intra-frame mode, the current frame is wavelet decomposed (DWT module 2) and compressed with a block-based intra-band coder (SBC module 8). This intra-compressed frame is decompressed (SBD module 12) and the reconstructed wavelet decomposition is used by the CODWT module 22. This module 22 operates in a subband-by-subband manner and constructs from the critically-sampled decomposition of every level, the overcomplete transform of that level, which contains all the subband information that is missing from the critically sampled pyramid due to the subsampling operations of every level. An important feature of the invention is that for this operation, methods of the invention provide fast calculation-algorithms with identical algorithmic performance to LBS. These calculations include digital filters. The overcomplete representation is used for in-band motion estimation since it is shift invariant. The motion compensation is performed in module 28 in the critically-sampled pyramid, which is subsequently subtracted from the current frame and coded (error frame) in the subtractor 6. The decoder operates in a similar manner as seen from the lower part of FIG. 1*b*. Thus in the proposed structure, there are transform-domain intra-frames and error-frames. The embeddedness of wavelet-based coding and the level-by-level operation for the motion estimation and compensation guarantees that drift-free scalability in the decoding can be achieved. To evaluate the performance of the proposed framework, some preliminary results are shown in Table IX for the first 48 frames of the football sequence (luminance component) for two different bit-rates. The compression was performed by using one I-frame (intra) and seven P-frames (inter); the target bit-rates of Table IX for the decompression were simply met by decompressing at fixed rates the intra and error frames. For example, for 760 Kbps, the I-frames were decompressed at 1.0 bpp and the P-frames at 0.2 bpp. It can be seen that the proposed algorithm, even without any sophisticated rate-allocation mechanism, is competitive to the 3-D SPIHT algorithm of Kim and Pearlman and outperforms MPEG-2. FIG. 14 shows an example of frame 5 decompressed at various resolutions with the proposed scheme. For all experiments, the sequence was compressed once and all the presented results where achieved by simply decompressing to various bit-rates and resolutions. The conclusion is that the approach provides resolution, quality and temporal scalability in video compression with the hybrid-coding structure if the in-band approach is adopted. The hybrid in-band (motion estimation and compensation in the transform domain) approach using overcomplete representations equipped with the fast calculation methods can decode to a variety of bit-rates and resolutions achieving at the same time very competitive performance to state of the art 3-D wavelet video-coding and coding standards, which are often proposed in the literature as the best solution for fine granularity scalability in video compression.

In a third embodiment wavelet video encoders and decoder based on the in-band motion compensation theory exploiting the in-band motion compensation theory based prediction rules are disclosed.

Figure 11:
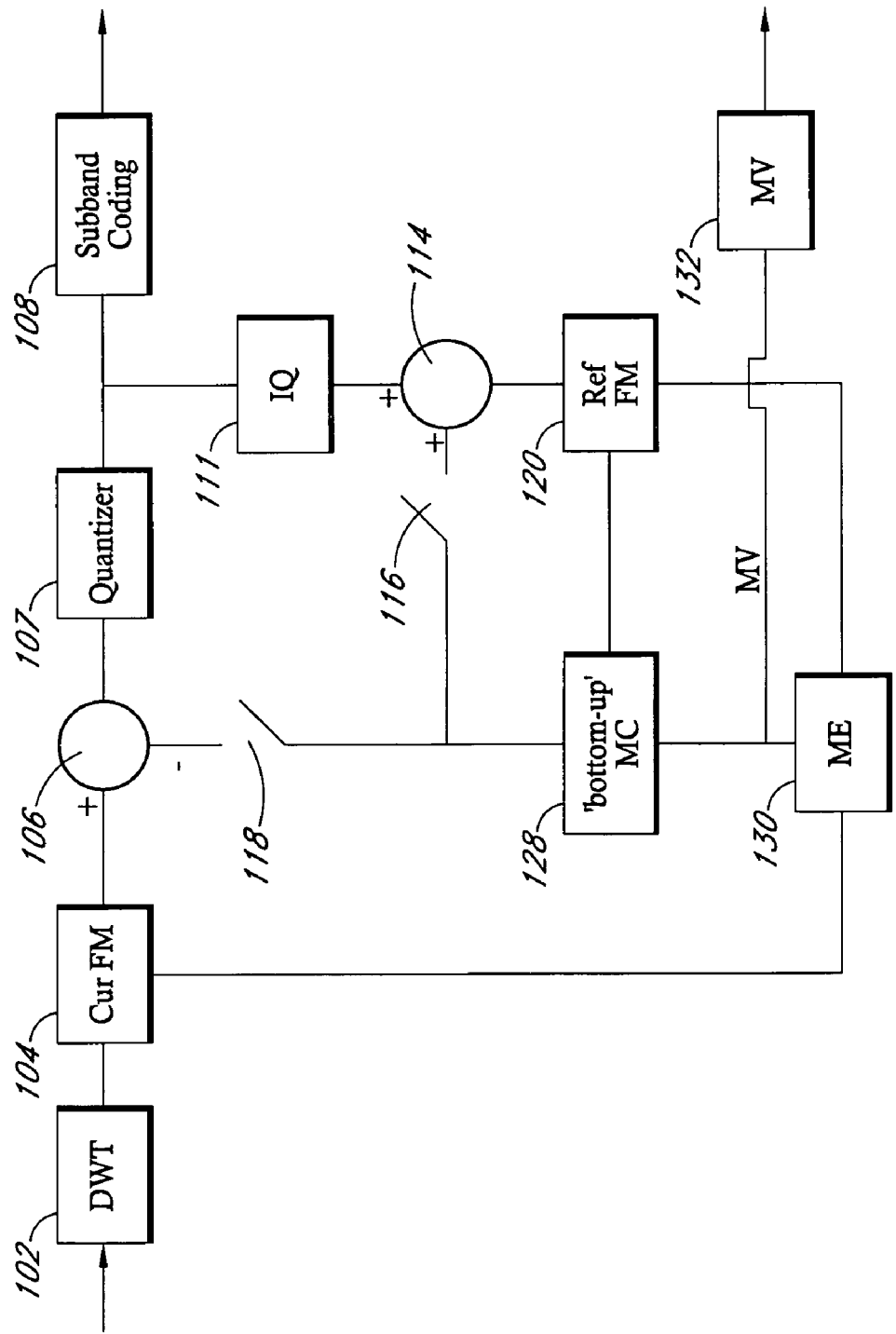
FIG. 11 shows a wavelet video encoder in accordance with an embodiment of the invention based on 'bottom-up' MC; motion estimation in wavelet domain.
Figure 12:
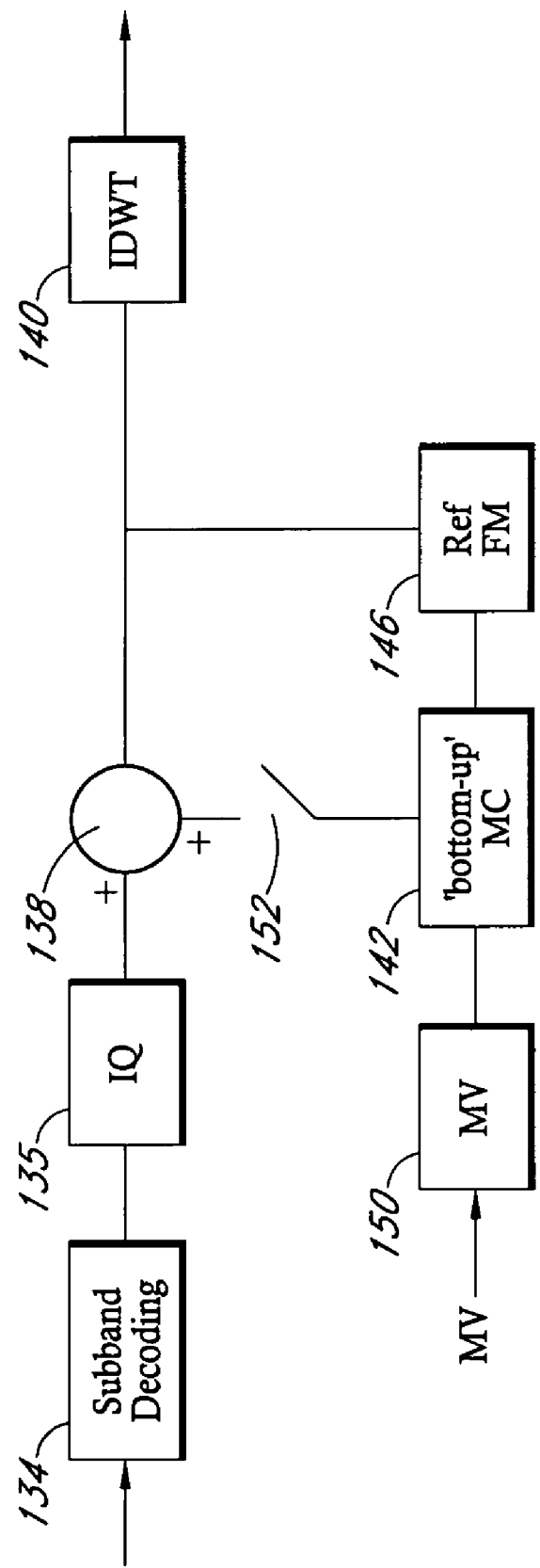
FIG. 12 wavelet video decoder in accordance with an embodiment of the invention based on 'bottom-up' MC.

Instead of using the 'bottom-up' ODWT in the video encoder, the wavelet coefficients required by the motion compensation process can directly be calculated from the reference wavelet subband image without the need for calculating all of the subbands of an overcomplete representation. Instead, only those subbands are calculated as required, whereby these subbands can belong to the set of subbands of the overcomplete representation. The propositions in the in-band motion compensation theory provide the required motion compensating prediction rules that correspond to all possible translations. These prediction rules make use of prediction filters and of particular subbands of the reference wavelet subband image. Which prediction filters to use and which subbands to choose, is determined by the motion vectors. If the motion estimation process is block-based, then the prediction rules only take as input blocks of wavelet coefficients from the reference wavelet subband image. Hence, this 'bottom-up' motion compensation process does not require the computation of a total overcomplete representation, but calculates the required wavelet coefficients directly on a block-by-block basis. Such a wavelet video encoder is shown schematically in FIG. 11 and the decoder in FIG. 12. The major difference between the embodiment of FIG. 11 and that of FIG. 9 is that the motion compensation module 128 uses the motion vector information obtained from the motion estimation module 130 to calculate only the best subbands for motion compensation. The method of calculation relies on digital predictor filters as described above but avoids the requirement to calculate all the subbands of the overcomplete representation. In FIG. 11 motion estimation is performed in the wavelet domain, but it can also be performed in the spatial domain as in FIG. 8.

In a fourth embodiment resolution scalable wavelet video encoders and decoders based on the in-band motion compensation theory are disclosed.

The wavelet video codecs, disclosed in the first to third embodiments, are both capable of supporting resolution scalability while avoiding a drift between the encoder and the decoders of different resolution levels. Conversely, a spatial domain motion compensation encoder causes a drift between what is encoded at full resolution and what is being decoded at a lower resolution. The reason for this drift is that the encoder uses all information available in the full resolution image (all subbands), which is not all transmitted to the decoders. A solution would be to code every resolution level independently from each other so that all possible configurations of decoders are supported, i.e. multicasting. Multicasting is however very inefficient from the encoders point of view, because multiple encoded streams have to be generated. Also from a compression point of view, the efficiency is very low and a lot of redundancy between resolution levels remains. This redundancy can partially be removed by working in a layered fashion, which is the MPEG-4 and H.263+ approach. First a base layer, with lowest resolution, is encoded with a certain image quality. The result is subtracted frame by frame (after upsampling and interpolating) from a version of the video sequence with twice the resolution of the base layer. The resulting error frames form an enhancement layer and are coded (with or without motion compensation). Several enhancement layers can be generated in this way. Although this principle is an improvement of multicasting, a further improvement can be obtained by a hierarchical coding approach. This approach requires a 'hierarchical' transform like the wavelet transform. The advantage of the wavelet transform is that it is critically sampled and supports multiple resolution scales. This is in contrast to the layered approach, where the total number of coded 'coefficients' is higher than the number of pixels of the full resolution image. Hence, an improved coding efficiency can be expected from the hierarchical coding approach. However, motion compensation should be performed in the transform domain to make full advantage of the hierarchical resolution property of the wavelet transform for video coding, hence the wavelet video codec structures of FIGS. 8 and 11, respectively are required. In order to exploit the resolution scalability property of the wavelet transform in the second and third embodiment coders, a simple precaution needs to be taken. When performing motion compensation on subbands (or subband blocks for the third embodiment coder) that are required to reconstruct a certain resolution level, subbands of lower wavelet levels should not be used in the motion compensation process (lower wavelet level corresponds to higher resolution level). For the 'bottom-up' ODWT this means that subbands of lower wavelet levels than the level of the subbands of which an overcomplete representation is generated, should not be used. The reason for this is that a decoder for this particular resolution level, does not receive the information that corresponds to the subbands of the lower wavelet levels and hence can not use it. In practice this means that the propositions or prediction rules of the in-band motion compensation theory should be adjusted. Terms in these prediction rules, which correspond to lower wavelet level subbands, should be neglected to enable resolution scalability by the wavelet video encoders of the first two embodiments.

In a fifth embodiment a method for wavelet-based in-band motion compensation and a digital, being useful for the first four embodiments is disclosed.

A novel in-band motion compensation method for wavelet-based video coding is proposed, derived here for the 1-D discrete wavelet transform but not limited thereto. The fundamental idea is the computation of the relationships between the subbands of the non-shifted input signal and the subbands corresponding to all translations of the input signal. The motion compensation method is formalized into prediction rules.

The in-band motion compensation algorithm can be extended to 2-D images, decomposed using the separable 2-D WT. The chosen approach is valid for N-level decompositions. The prediction rules of the algorithm allow the in-band motion compensation process to reach a zero prediction error for all translations of the image pixels. Besides the applicability of this 2-D in-band motion compensation algorithm for scalable video codecs, other applications are envisaged such as in-band motion estimation, overcomplete wavelet decompositions, etc.

The discrete wavelet transform (WT) is inherently scalable in resolution and quality, which is a very much wanted property for streaming video e.g., on the Internet. A possible codec structure exploiting the WT for video coding is the in-band codec. In-band means that motion compensation is performed on the wavelet coefficients. However, the periodic translation-invariance of the critically sampled WT prohibits from reaching a zero prediction error on wavelet decomposition level J, if the shift or translation r of the image pixels does not belong to $\tau = 2^J k$, with $k \in Z$. In the following, we suppose that the translation of the image pixels is known. The novel motion compensation algorithm or method will be derived for the 1-D WT.

Concerning the concept of periodic translation invariance we denote by Y(z) the result of filtering the input signal X(z) with filter H(z). Y(z) subsampled with factor M=2 is not invariant with respect to integer shifts or translations $\tau \in Z$ of X(z). This is caused by the subsampling operator that retains, depending on $\tau$, either a shifted version of the even or the odd indexed samples of Y(z), which we denote by $Y_{even}(z)$ and $Y_{odd}(z)$. In general, only a limited number of possible delayed outputs exist, equal to the subsampling factor M. Therefore, this system is called periodic translation-invariant. Given an even translation $\tau = 2k$ with $k \in Z$, we obtain the following expression for the shifted, filtered and subsampled signal $Y^{2k}(z)$:

$$Y^{2k}(z) = z^k [H_0(z) X_0(z) + H_1(z) X_1(z)] = z^k Y_{even}(z), \qquad (186)$$

with $X_0(z)$, $X_1(z)$ the polyphase components of X(z) and $H_0(z)$, $H_1(z)$ the Type I polyphase components of H(z) [20]. This actually is translation-invariance, because the output sequence $y^{2k}(n)$ is a shifted version of sequence $y^{even}(n)$, obtained for $\tau = 0$. Conversely, for an odd translation $\tau = 2k+1$ the output signal is given by:

$$Y^{2k+1}(z) = z^k [H_1(z) X_0(z) + z H_0(z) X_1(z)] = z^k Y_{odd}(z) \qquad (187)$$

Figure 13:
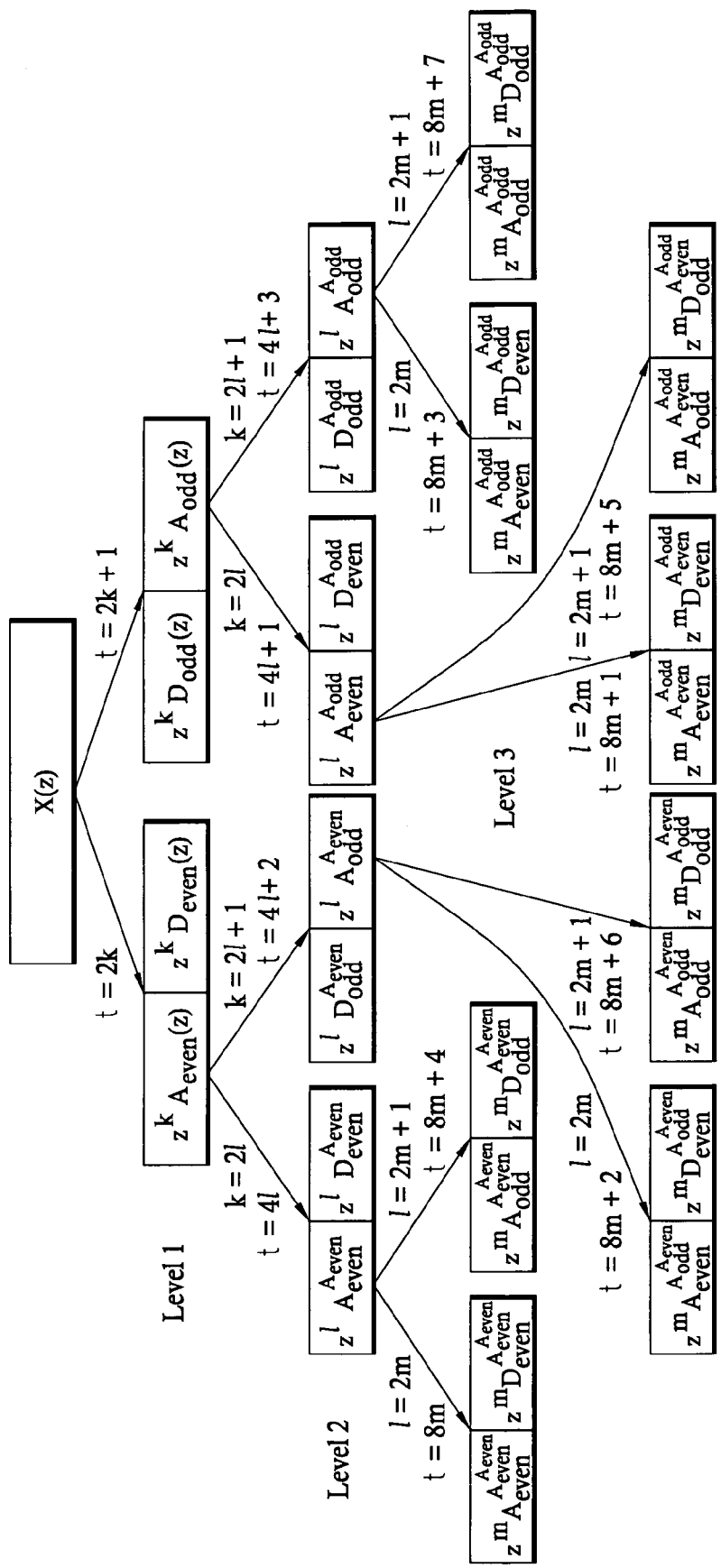
FIG. 13 shows three wavelet decompositions for different translations T of the input signals X(z).

Now in-band motion compensation for 1-D WT, Level 1 is derived. Depending on the translation r of the input signal, we obtain a shifted version of either $Y_{even}(z)$ or $Y_{odd}(z)$. Hence, motion compensation can be simplified to prediction of odd samples from even samples or vice versa. For the single level WT with filters H(z) and G(z), we denote respectively the average subband by $A_{even}(z)$, and the detail subband by $D_{even}(z)$. We obtain the output signals $z^k A_{even}(z)$, $z^k D_{even}(z)$ for $\tau=2k$, and $z^k A_{odd}(z)$ and $z^k D_{odd}(z)$ for $\tau=2k+1$. FIG. 13 (level 1) represents a decomposition tree containing the subbands of the single level WT for different translations $\tau$. Without any loss of generality one can drop the delays $z^k$, and one can reduce the in-band motion compensation problem to predicting the subbands $A_{odd}(z)$ and $D_{odd}(z)$ from the reference subbands $A_{even}(z)$ and $D_{even}(z)$. This results in the first prediction rule:

Translation $\tau=2k+1$, level 1:

$$D_{odd}(z)=P_0(z)A_{even}(z)+P_1(z)D_{even}(z), \text{ with} \quad (188)$$

$$P_0(z)=D^{-1}[G_1(z)G_1(z)-zG_0(z)G_0(z)], P_1(z)= D^{-1}[zH_0(z)G_0(z)-H_1(z)G_1(z)].$$

$$A_{odd}(z)=P_2(z)A_{even}(z)+P_3(z)D_{even}(z), \text{ with} \quad (189)$$

$$P_2(z)=D^{-1}[H_1(z)G_1(z)-zH_0(z)G_0(z)], P_3(z)= D^{-1}[zH_0(z)H_0(z)-H_1(z)H_1(z)].$$

Proof: From the system of equations formed by the expressions for $A_{even}(z)$ and $D_{even}(z)$ in polyphase notation (186), we can isolate the input signal polyphase components $X_0(z)$ and $X_1(z)$:

$$X_0(z) = \frac{1}{DetH_p(z)}[G_1(z)A_{even}(z) - H_1(z)D_{even}(z)], \quad (190)$$

$$X_1(z) = \frac{1}{DetH_p(z)}[H_0(z)D_{even}(z) - G_0(z)A_{even}(z)], \quad (191)$$

with $H_p(z)$ the analysis polyphase matrix [20]. Because the wavelet filters satisfy the perfect reconstruction condition, we necessarily have $DetH_p(z)=Dz^{-q}$ [21], with D and q constants. To simplify the formulas, we consider q=0. If we substitute the signal polyphase components into the polyphase expression (187) for $D_{odd}(z)$ we obtain (188). Similarly, if we substitute (190) and (191) into the expression (187) for $A_{odd}(Z)$ we obtain (189).

Similarly to the previous calculations, we have to determine the influence of the X(z) translation on the subbands of level 2. Consider the decomposition either of the subband $z^k A_{even}(z)$ or $z^k A_{odd}(z)$ as illustrated in FIG. 13. This is equivalent to a single level wavelet decomposition applied to the signals $A_{even}(z)$ and $A_{odd}(z)$ which are shifted either by an even or odd translation k, or equivalently k=2l and k=2l+1 with $\epsilon Z$. As a result, we obtain four alternative decompositions corresponding to the following translations $\tau$: $\tau=4l$, $\tau=4l+2$, $\tau=4l+1$ and $\tau=4l+3$, see FIG. 13.

From a motion compensation point of view, the invention predicts for all four translation types, the decomposition subbands starting from the reference subbands of the 2-levels WT, corresponding to $\tau=0$: $D_{even}(z)$, $A_{even}^{A_{even}}(z)$ and $D_{even}^{A_{even}}(z)$. The upper index indicates the decomposed subband of the lower level. If the translation is of type $\tau=4l$, then we have translation-invariance. All other translation types r belong to the translation-variant category. The following prediction rules can be formulated:

Translation $\tau=4l+2$, level 2:

Apply prediction rule for $\tau=2k+1$ to the subbands $A_{even}^{A_{even}}(z)$, and $D_{even}^{A_{even}}(z)$.

Translation $\tau=4l+1$, level 2:

$$A_{even}^{A_{odd}}(z) = Q_0(z)A_{even}^{A_{even}}(z) + Q_1(z)D_{even}^{A_{even}}(z) + A_{even}^{P_3(z)D_{even}(z)}(z), \text{ with} \quad (192)$$

$$Q_0(z) = P_{2,0}(z) - z^{-1}P_1(z)P_{2,1}(z), \qquad Q_1(z) = z^{-1}P_3(z)P_{2,1}(z),$$

$$D_{even}^{A_{odd}}(z) = Q_2(z)A_{even}^{A_{even}}(z) + Q_3(z)D_{even}^{A_{even}}(z) + D_{even}^{P_3(z)D_{even}(z)}(z), \text{ with} \quad (193)$$

$$Q_2(z) = z^{-1}P_0(z)P_{2,1}(z), \qquad Q_3(z) = P_{2,0}(z) + z^{-1}P_1(z)P_{2,1}(z).$$

$P_{2,0}(z)$ and $P_{2,1}(z)$ are the polyphase components of $$P_2(z); (A/D)_{even}^{P_3(z)D_{even}(z)}(z)$$

is the filtered and subsampled signal, originating from $P_3(z)$ $D_{even}(z)$ by respectively filtering with H(z) or G(z), and retaining the even samples.

Translation $\tau=4l+3$: analogous to $\tau=4l+1$.

The level 3 part of the 1-D WT in-band compensation rules is now discussed. The following classification of translation parameter $\tau$ on level 3 is found: $\tau=8m$, $\tau=8m+4$, $\tau=8m+2$, $\tau=8m+6$, $\tau=8m+1$, $\tau=8m+5$, $\tau=8m+3$ and $\tau=8m+7$ (FIG. 13). For the left branch of the decomposition tree of FIG. 13, i.e. the branch corresponding to even translations $\tau=2k$, we can apply the prediction rules from the previous section. However, for the right branch corresponding to odd translations $\tau=2k+1$, we describe the in-band motion compensation relationships through new prediction rules. We formulate the prediction rule for shift $\tau=8m+1$. We refer to detailed description for the other prediction rules and the proofs.

Translation $\tau=8m+1$, level 3:

$$A_{even}^{A_{odd}^{A_{even}}}(z) = R_0(z)A_{even}^{A_{even}^{A_{even}}}(z) + R_1(z)D_{even}^{A_{even}^{A_{even}}}(z) + z^{-1}A_{odd}^{zQ_1(z)D_{even}^{A_{even}}(z)} + A_{even}^{P_3(z)D_{even}(z)}, \quad (194)$$

$$R_0(z) = Q_{0,0}(z) - z^{-1}P_1(z)Q_{0,1}(z), \qquad R_1(z) = z^{-1}P_3(z)Q_{0,1}(z),$$

$$D_{even}^{A_{odd}^{A_{even}}}(z) = R_2(z)A_{even}^{A_{even}^{A_{even}}}(z) + R_3(z)D_{even}^{A_{even}^{A_{even}}}(z) + z^{-1}D_{odd}^{zQ_1(z)D_{even}^{A_{even}}(z)} + D_{even}^{P_3(z)D_{even}(z)}, \quad (195)$$

$$R_2(z) = z^{-1}P_0(z)Q_{0,1}(z), \qquad R_3(z) = Q_{0,0}(z) + z^{-1}P_1(z)Q_{0,1}(z).$$

The same approach can be followed as in the previous paragraphs to obtain prediction rules for higher decomposition levels. Furthermore, a recursive pattern is revealed when deriving the R-prediction filters from the Q-prediction filters. This allows us to deduce the prediction filters for the fourth level and for higher levels without relying on any calculations.

Figure 16:
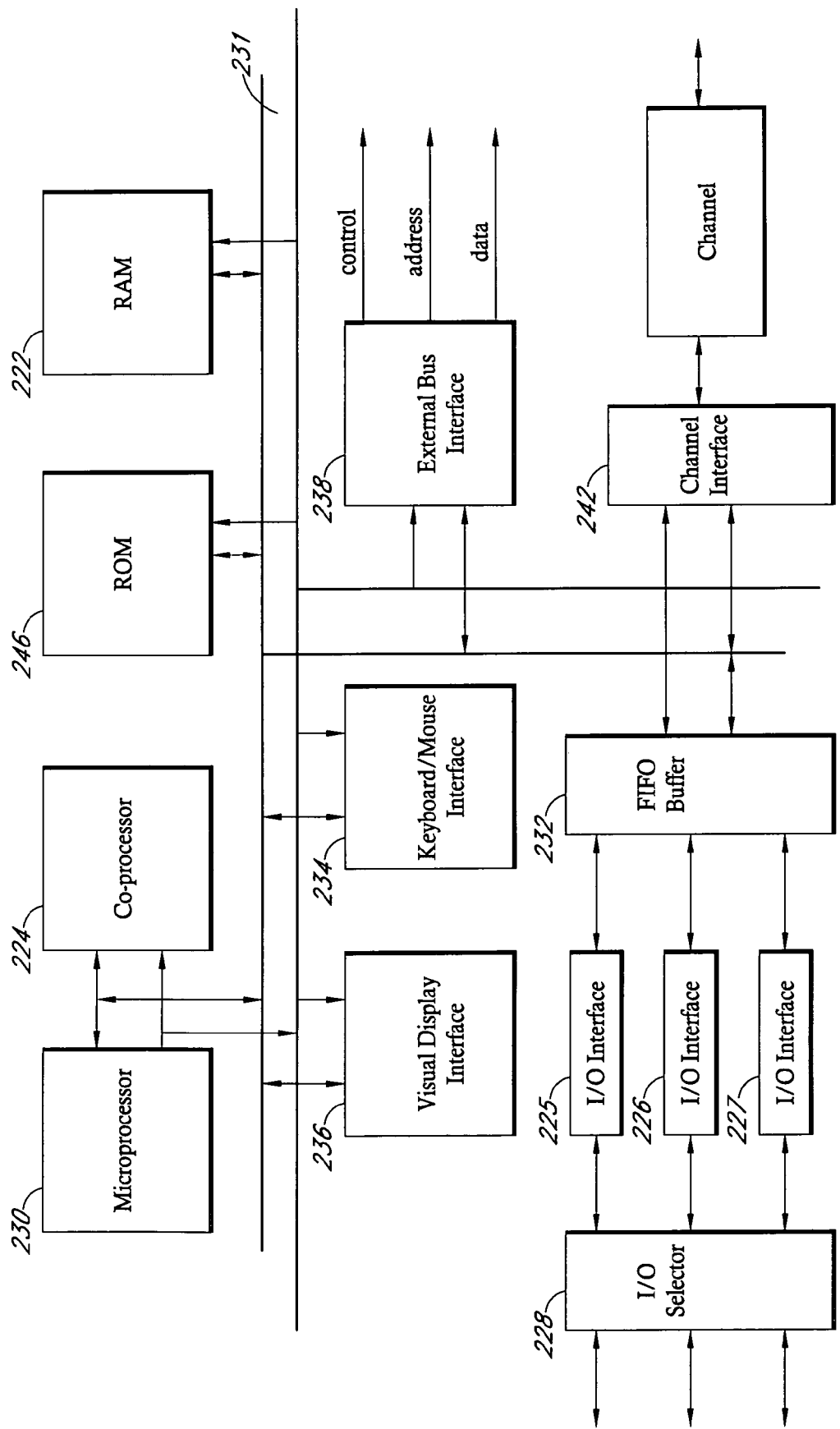
FIG. 16 shows a subband coding circuit in accordance with an embodiment of the invention.

FIG. 16 shows the implementation of a coder/decoder which can be used with the invention implemented using a microprocessor 230 such as a Pentium IV from Intel Corp. USA. The microprocessor 230 may have an optional element such as a co-processor 224, e.g., for arithmetic operations or microprocessor 230-224 may be a bit-sliced processor. A RAM memory 222 may be provided, e.g., DRAM. Various I/O (input/output) interfaces 225, 226, 227 may be provided, e.g., UART, USB, I$^2$C bus interface as well as an I/O selector 228. FIFO buffers 232 may be used to decouple the processor 230 from data transfer through these interfaces. A keyboard and mouse interface 234 will usually be provided as well as a visual display unit interface 236. Access to an external memory such as a disk drive may be provided via an external bus interface 238 with address, data and control busses. The various blocks of the circuit are linked by suitable busses 231. The interface to the channel is provided by block 242 which can handle the encoded video frames as well as transmitting to and receiving from the channel. Encoded data received by block 242 is passed to the processor 230 for processing.

Alternatively, this circuit may be constructed as a VLSI chip around an embedded microprocessor 230 such as an ARM7TDMI core designed by ARM Ltd., UK which may be synthesized onto a single chip with the other components shown. A zero wait state SRAM memory 222 may be provided on-chip as well as a cache memory 224. Various I/O (input/output) interfaces 225, 226, 227 may be provided, e.g., UART, USB, I$^2$C bus interface as well as an I/O selector 228. FIFO buffers 232 may be used to decouple the processor 230 from data transfer through these interfaces. A counter/timer block 234 may be provided as well as an interrupt controller 236. Access to an external memory may be provided an external bus interface 238 with address, data and control busses. The various blocks of the circuit are linked by suitable busses 231. The interface to the channel is provided by block 242 which can handle the encoded video frames as well as transmitting to and receiving from the channel. Encoded data received by block 242 is passed to the processor 230 for processing.

Software programs may be stored in an internal ROM (read only memory) 246 which may include software programs for carrying out subband decoding and/or encoding in accordance with any of the methods of the invention. In particular software programs may be provided for digital filters according to embodiments of the invention described above to be applied to a reference or other frame of data to generate one or more subbands of a set of subbands of an overcomplete representation of the frame by calculations at single rate. That is the software, when executed on the processor 230 carries out the function of any of the modules 22, 122, 48, 148, 128, 142 described above. Software may also combine the functions of several modules, e.g., the module 30 and module 22 of FIG. 1a or the module 130 and module 122 of FIG. 9, or a combination of the modules 22, 28 and 30 of FIG. 1a or modules 122, 128, 130 of FIGS. 8, 9 or 11 or modules 122 and 128 of FIG. 8 or modules 128 and 130 of FIG. 11 or modules 142 and 148 of FIG. 10. The methods described above may be written as computer programs in a suitable computer language such as C and then compiled for the specific processor in the design. For example, for the embedded ARM core VLSI described above the software may be written in C and then compiled using the ARM C compiler and the ARM assembler. Reference is made to "ARM System-on-chip", S. Furber, Addison-Wiley, 2000. The invention also includes a data carrier on which is stored executable code segments, which when executed on a processor such as 230 will execute any of the methods of the invention, in particular will execute digital filtering according to embodiments of the invention described above to be applied to a reference or other frame of data to generate one or more subbands of a set of subbands of an overcomplete representation of the frame by calculations at single rate. The data carrier may be any suitable data carrier such as diskettes ("floopy disks"), optical storage media such as CD-ROMs, DVD ROM's, tape drives, hard drives, etc. which are computer readable.

Figure 17:
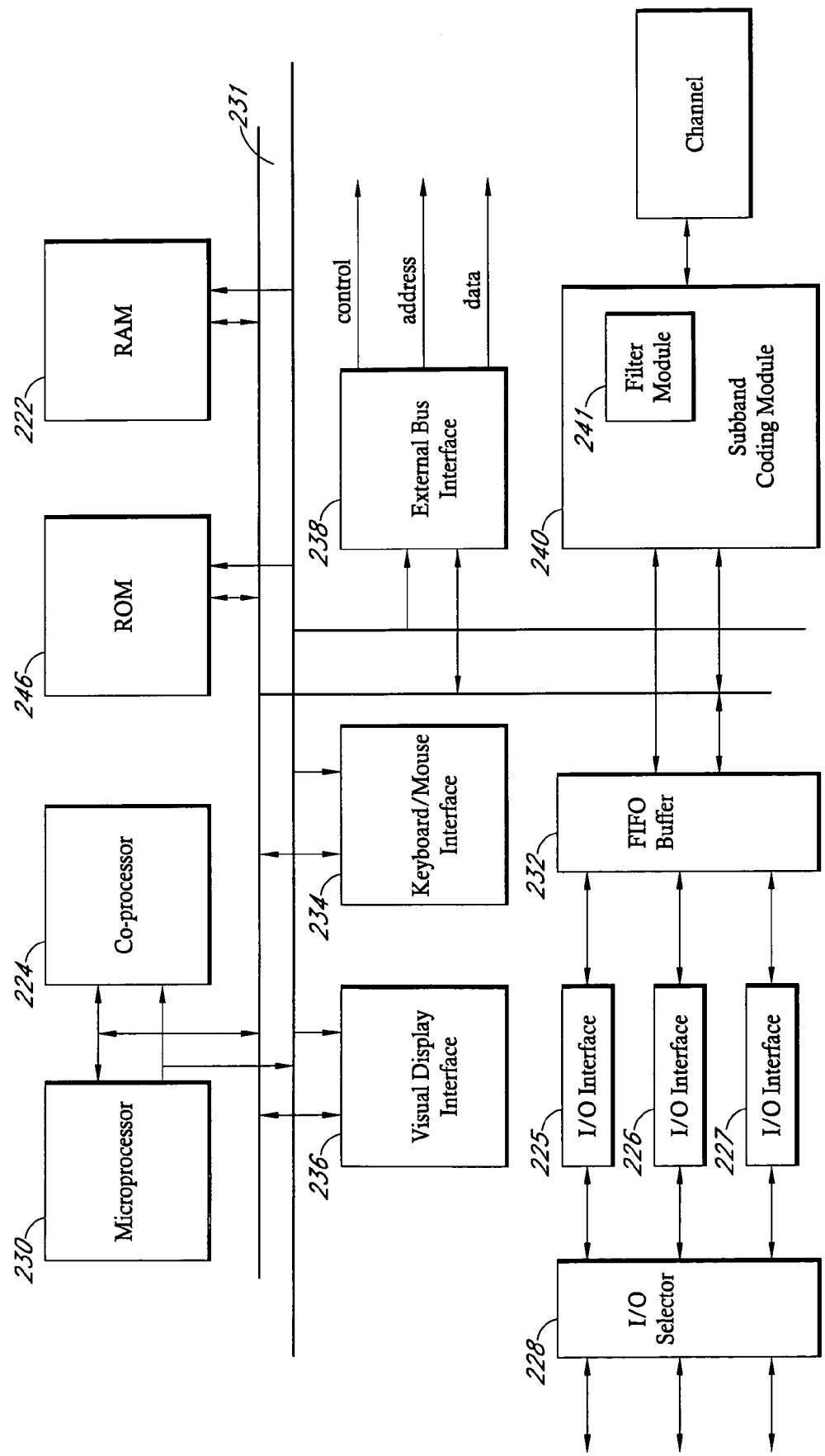
FIG. 17 shows a further subband coding circuit in accordance with an embodiment of the invention.

FIG. 17 shows the implementation of a coder/decoder which can be used with the invention implemented using an dedicated filter module. Reference numbers in FIG. 17 which are the same as the reference numbers in FIG. 16 refer to the same components—both in the microprocessor and the embedded core embodiments.

Only the major differences will be described with respect to FIG. 17. Instead of the microprocessor 230 carrying out methods required to subband encode and decode a bitstream this work is now taken over by a subband coding module 240. Module 240 may be constructed as an accelerator card for insertion in a personal computer. The subband module has means for carrying out subband decoding and/or encoding in accordance with any of the methods of the invention. In particular, the module may be provided with means for digital filtering according to embodiments of the invention described above to be applied to a reference or other frame of data to generate one or more subbands of a set of subbands of an overcomplete representation of the frame by calculations at single rate. These filters may be implemented as a separate filter module 241, e.g., an ASIC (Application Specific Integrated Circuit) or an FPGA (Field Programmable Gate Array) having means for digital filtering according to embodiments of the invention described above to be applied to a reference or other frame of data to generate one or more subbands of a set of subbands of an overcomplete representation of the frame by calculations at single rate.

Similarly, if an embedded core is used such as an ARM processor core or an FPGA, a subband coding module 240 may be used which may be constructed as a separate module in a multi-chip module (MCM), for example or combined with the other elements of the circuit on a VLSI. The subband module 240 has means for carrying out subband decoding and/or encoding in accordance with any of the methods of the invention. In particular, the module may be provided with means for digital filtering according to embodiments of the invention described above to be applied to a reference or other frame of data to generate one or more subbands of a set of subbands of an overcomplete representation of the frame by calculations at single rate. As above, these filters may be implemented as a separate filter module 241, e.g., an ASIC (Application Specific Integrated Circuit) or an FPGA (Field Programmable Gate Array) having means for digital filtering according to embodiments of the invention described above. The invention also includes other integrated circuits such as ASIC's or FPGA's which carry out the function of any of the modules 22, 122, 48, 148, 128, 142 described above. Such integrated circuits may also combine the functions of several modules, e.g., the module 30 and module 22 of FIG. 1a or the module 130 and module 122 of FIG. 9, or a combination of the modules 22, 28 and 30 of FIG. 1a or modules 122, 128, 130 of FIGS. 8, 9 or 11 or modules 122 and 128 of FIG. 8 or modules 128 and 130 of FIG. 11 or modules 142 and 148 of FIG. 10.

While the invention has been shown and described with reference to certain embodiments, it will be understood by those skilled in the art that various changes or modifications in form and detail may be made without departing from the scope and spirit of this invention.

TABLES

TABLE I

The 9/7 filter-bank modified so that Det = $H_0G_1 - G_0H_1 = -1$.
In this case G is centered around zero (linear phase).

| n | h(n) | M | g(m) |
|---|---|---|---|
| 1 | 0.85269867900889 | 0 | 0.78848561640558 |
| 0, 2 | 0.37740285561283 | −1, 1 | −0.41809227322162 |
| −1, 3 | −0.11062440441844 | −2, 2 | −0.04068941760916 |
| −2, 4 | −0.02384946501956 | −3, 3 | 0.06453888262870 |
| −3, 5 | 0.03782845550726 | −4, 4 | |

TABLE II

The prediction filters of level 1 for the 9/7 filter pair of Table I.

| Degree in Z | $F_0^1$ | $F_1^1$ | $F_2^1$ | $F_3^1$ |
|---|---|---|---|---|
| 4 | −0.00244140625001 | 0.00143099204607 | −0.00416526737096 | 0.00244140625001 |
| 3 | 0.02392578125006 | −0.00893829770284 | 0.05562204500420 | −0.02392578125006 |
| 2 | −0.11962890624961 | 0.09475201933935 | −0.18500077367828 | 0.11962890624961 |
| 1 | 0.59814453124955 | −0.32145927076690 | 0.26708799209208 | −0.59814453124955 |
| 0 | 0.59814453124955 | 0.46842911416863 | −0.18500077367828 | −0.59814453124955 |
| −1 | −0.11962890624961 | −0.32145927076690 | 0.05562204500420 | 0.11962890624961 |
| −2 | 0.02392578125006 | 0.09475201933935 | −0.00416526737096 | −0.02392578125006 |
| −3 | 0.00244140625001 | −0.00893829770284 | | 0.00244140625001 |
| −4 | | 0.00143099204607 | | |

TABLE III

The prediction filters of level 2 for the 9/7 filter pair of Table I.

| Degree in Z | $F_0^2$ | $F_1^2$ | $F_2^2$ | $F_3^2$ |
|---|---|---|---|---|
| 5 | −0.00005841255188 | 0.00003423760266 | −0.00009965727597 | 0.00005841255188 |
| 4 | −0.00088787078858 | 0.00064208431103 | −0.00116063101768 | 0.00088787078858 |
| 3 | 0.01174092292788 | −0.00325056581524 | 0.02934202037389 | −0.01174092292788 |
| 2 | −0.06254196166961 | 0.05005002314451 | −0.11091074747671 | 0.05765914916960 |
| 1 | 0.26671171188334 | −0.19238483073456 | 0.17732657799233 | −0.50596952438255 |
| 0 | 0.88179588317802 | 0.31072164151829 | −0.14082618249241 | 0.31449317932109 |
| −1 | −0.12007284164365 | −0.24526493865167 | 0.05464973467748 | 0.16792440414377 |
| −2 | 0.02710342407219 | 0.09377374163572 | −0.00869377426124 | −0.02710342407219 |
| −3 | −0.00403046607971 | −0.01586242405270 | 0.00036249037151 | 0.00403046607971 |
| −4 | 0.00023365020752 | 0.00169389067232 | 0.00001016910979 | −0.00023365020752 |
| −5 | 0.00000596046448 | −0.00014936599745 | | −0.00000596046448 |
| −6 | | −0.00000349363292 | | |

| Degree in Z | $F_4^2$ | $F_5^2$ | $F_6^2$ | $F_7^2$ |
|---|---|---|---|---|
| 6 | 0.00000596046448 | −0.00000349363292 | 0.00001016910979 | −0.00000596046448 |
| 5 | 0.00023365020752 | −0.00014936599745 | 0.00036249037151 | −0.00023365020752 |
| 4 | −0.00403046607971 | 0.00169389067232 | −0.00869377426124 | 0.00403046607971 |
| 3 | 0.02710342407219 | −0.01586242405270 | 0.05464973467748 | −0.02710342407219 |
| 2 | −0.12007284164365 | 0.09377374163572 | −0.14082618249241 | 0.16792440414377 |
| 1 | 0.88179588317802 | −0.24526493865167 | 0.17732657799233 | 0.31449317932109 |
| 0 | 0.26671171188334 | 0.31072164151829 | −0.11091074747671 | −0.50596952438255 |
| −1 | −0.06254196166961 | −0.19238483073456 | 0.02934202037389 | 0.05765914916960 |
| −2 | 0.01174092292788 | 0.05005002314451 | −0.00116063101768 | −0.01174092292788 |
| −3 | −0.00088787078858 | −0.00325056581524 | −0.00009965727597 | 0.00088787078858 |
| −4 | −0.00005841255188 | 0.00064208431103 | | 0.00005841255188 |
| −5 | | 0.00003423760266 | | |

TABLE IV

The prediction filters of level 3 for the 9/7 filter pair of Table I.

| Degree in Z | $F_0^3$ | $F_1^3$ | $F_2^3$ | $F_3^3$ |
|---|---|---|---|---|
| 6  | 0.00000014260877  | −0.00000008358790  | 0.00000024330390  | −0.00000014260877 |
| 5  | −0.00003006192856 | 0.00001732327610   | −0.00005215310877 | 0.00003006192856 |
| 4  | −0.00036325305700 | 0.00027118376662   | −0.00044706508018 | 0.00036325305700 |
| 3  | 0.00523493974471  | −0.00142451855033  | 0.01314750521441  | −0.00523493974471 |
| 2  | −0.02866946801063 | 0.02253736185968   | −0.05285711618290 | 0.02689372643348 |
| 1  | 0.11828768299888  | −0.09155949520252  | 0.09104952775264  | −0.24337160633810 |
| 0  | 0.96858347300390  | 0.15937234774348   | −0.08001261890323 | 0.79500829335214 |
| −1 | −0.07875438081051 | −0.13957337353587  | 0.03592212357721  | 0.13296122895490 |
| −2 | 0.01854321861163  | 0.06187507024177   | −0.00704239128113 | −0.01807591819659 |
| −3 | −0.00303826271556 | −0.01244586898594  | 0.00027485003322  | 0.00303826271556 |
| −4 | 0.00019600149244  | 0.00107109829644   | 0.00001711950208  | −0.00019600149244 |
| −5 | −0.00000998261385 | −0.00013523300959  | −0.00000002482693 | −0.00000998261385 |
| −6 | −0.00000001455192 | −0.00000582084131  |                   | 0.00000001455192 |
| −7 |                   | 0.00000000852938   |                   |                  |

| Degree in Z | $F_4^3$ | $F_5^3$ | $F_6^3$ | $F_7^3$ |
|---|---|---|---|---|
| 6  | 0.00000216765329  | −0.00000127053604  | 0.00000369821923  | −0.00000216765329 |
| 5  | 0.00013144733384  | −0.00008156099626  | 0.00021111880330  | −0.00013144733384 |
| 4  | −0.00354297226295 | 0.00173673401727   | −0.00698737064387 | 0.00354297226295 |
| 3  | 0.02792382379991  | −0.01348353219813  | 0.06026756896080  | −0.02804064890367 |
| 2  | −0.13103966135465 | 0.10299880531837   | −0.17816629613736 | 0.15452150721042 |
| 1  | 0.75361341703605  | −0.30990650725195  | 0.24203685966003  | −0.22018999326938 |
| 0  | 0.43101294059278  | 0.42438892216659   | −0.15941216055657 | −0.67115862388007 |
| −1 | −0.09466141927950 | −0.27675857877612  | 0.04435604503300  | 0.08660048712007 |
| −2 | 0.01815370982519  | 0.07550649033473   | −0.00220859321570 | −0.01814178889623 |
| −3 | −0.00153230270371 | −0.00547825603015  | −0.00009989690557 | 0.00153230270371 |
| −4 | −0.00006058020517 | 0.00104172325094   | −0.00000097321559 | 0.00006058020517 |
| −5 | −0.00000057043508 | 0.00003669634916   |                   | 0.00000057043508 |
| −6 |                   | 0.00000033435159   |                   |                  |

| Degree in Z | $F_8^3$ | $F_9^3$ | $F_{10}^3$ | $F_{11}^3$ |
|---|---|---|---|---|
| 6  | −0.00000057043508 | 0.00000033435159   | −0.00000097321559 | 0.00000057043508 |
| 5  | −0.00006058020517 | 0.00003669634916   | −0.00009989690557 | 0.00006058020517 |
| 4  | −0.00153230270371 | 0.00104172325094   | −0.00220859321570 | 0.00153230270371 |
| 3  | 0.01815370982519  | −0.00547825603015  | 0.04435604503300  | −0.01814178889623 |
| 2  | −0.09466141927950 | 0.07550649033473   | −0.15941216055657 | 0.08660048712007 |
| 1  | 0.43101294059278  | −0.27675857877612  | 0.24203685966003  | −0.67115862388008 |
| 0  | 0.75361341703605  | 0.42438892216659   | −0.17816629613736 | −0.22018999326938 |
| −1 | −0.13103966135465 | −0.30990650725195  | 0.06026756896080  | 0.15452150721042 |
| −2 | 0.02792382379991  | 0.10299880531837   | −0.00698737064387 | −0.02804064890367 |
| −3 | −0.00354297226295 | −0.01348353219813  | 0.00021111880330  | 0.00354297226295 |
| −4 | 0.00013144733384  | 0.00173673401727   | 0.00000369821923  | −0.00013144733384 |
| −5 | 0.00000216765329  | −0.00008156099626  |                   | −0.00000216765329 |
| −6 |                   | −0.00000127053604  |                   |                  |

| Degree in Z | $F_{12}^3$ | $F_{13}^3$ | $F_{14}^3$ | $F_{15}^3$ |
|---|---|---|---|---|
| 7  | −0.00000001455192 | 0.00000000852938   | −0.00000002482693 | 0.00000001455192 |
| 6  | 0.00000998261385  | −0.00000582084131  | 0.00001711950208  | −0.00000998261385 |
| 5  | 0.00019600149244  | −0.00013523300959  | 0.00027485003322  | −0.00019600149244 |
| 4  | −0.00303826271556 | 0.00107109829644   | −0.00704239128113 | 0.00303826271556 |
| 3  | 0.01854321861163  | −0.01244586898594  | 0.03592212357721  | −0.01807591819659 |
| 2  | −0.07875438081051 | 0.06187507024177   | −0.08001261890323 | 0.13296122895490 |
| 1  | 0.96858347300390  | −0.13957337353587  | 0.09104952775264  | 0.79500829335214 |
| 0  | 0.11828768299888  | 0.15937234774348   | −0.05285711618290 | −0.24337160633810 |
| −1 | −0.02866946801063 | −0.09155949520252  | 0.01314750521441  | 0.02689372643348 |
| −2 | 0.00523493974471  | 0.02253736185968   | −0.00044706508018 | −0.00523493974471 |
| −3 | −0.00036325305700 | −0.00142451855033  | 0.00005215310877  | 0.00036325305700 |
| −4 | −0.00003006192856 | 0.00027118376662   | 0.00000024330390  | 0.00003006192856 |
| −5 | 0.00000014260877  | 0.00001732327610   |                   | −0.00000014260877 |
| −6 |                   | −0.00000008358790  |                   |                  |

TABLE V

The multiplications required for the production of the subbands of level k (the filters for subbands $A_1^k, D_1^k$ are omitted), with $l \in [2, k]$ and $i \in [0, 2^{l-2} - 1]$. At level k, subbands $A_0^k, D_0^k$ contain $\frac{N}{2^k}$ coefficients.

| Equation Number | Convolutions | Multiplications for level k |
|---|---|---|
| (9) | $F_{4i,0}^{l-1}$, $F_{4i,1}^{l-1}$ | $\frac{N}{2^k}\left(T_{F_{4i,0}^{l-1}} + T_{F_{4i,1}^{l-1}}\right)$ |
| (10) | $F_{4i,1}^{l-1}[n] * [F_1^l[n] * D_0^k[n]]$ | $\frac{N}{2^k} T_{F_{4i,1}^{l-1}}$ |
| (11) | $F_{4i,1}^{l-1}$ | $\frac{N}{2^k} T_{F_{4i,1}^{l-1}}$ |
| (12) | $F_{4i,0}^{l-1}[n] * D_0^k[n]$, $F_{4i,1}^{l-1}[n] * [F_3^l[n] * D_0^k[n]]$ | $\frac{N}{2^k}\left(T_{F_{4i,0}^{l-1}} + T_{F_{4i,1}^{l-1}}\right)$ |
| (13) | $F_{4i,1}^{l-1}$, $F_{4i,0}^{l-1}$ | $\frac{N}{2^k}\left(T_{F_{4i,0}^{l-1}} + T_{F_{4i,1}^{l-1}}\right)$ |
| (14) | $F_{4i,0}^{l-1}[n] * [F_1^l[n] * D_0^k[n]]$ | $\frac{N}{2^k} T_{F_{4i,0}^{l-1}}$ |
| (15) | $F_{4i,0}^{l-1}$ | $\frac{N}{2^k} T_{F_{4i,0}^{l-1}}$ |
| (16) | $F_{4i,1}^{l-1}[n] * D_0^k[n]$, $F_{4i,0}^{l-1}[n] * [F_3^l[n] * D_0^k[n]]$ | $\frac{N}{2^k}\left(T_{F_{4i,0}^{l-1}} + T_{F_{4i,1}^{l-1}}\right)$ |

TABLE VI

Multiplication budget for the level-by-level production of the overcomplete representation. Two modes of operation are presented: FO-mode and HFO-mode. The results are presented per decomposition level both for the original and thresholded filters.

| Full Overcomplete (FO) mode | (9/7 filter-pair) Number of taps of prediction filters: $\{F_{4i}^{l-1} (F_{4i}^{l-1})\}$, $i \in [0, 2^{l-2}], i \in \mathbb{Z}$ | Multiplications for prediction-filters method | Multiplications for LL-LBS method | Reduction in multiplications (%) |
|---|---|---|---|---|
| Level l = 2 | $\{7\,(7)\}_0$ | 10.25 N (10.25 N) | 13.5 N | 24.1 (24.1) |
| Level l = 3 | $\{11\,(7)\}_0, \{11\,(7)\}_1$ | 13.375 N (10.375 N) | 18.25 N | 26.7 (43.2) |
| Level l = 4 | $\{13\,(7)\}_0, (12\,(8))_1, \{12\,(8)\}_2, \{13\,(7)\}_3$ | 16.0625 N (11.9375 N) | 23.125 N | 30.5 (48.4) |
| High-Frequency Overcomplete (HFO) mode | (9/7 filter-pair) Number of taps of prediction filters: $\{[F_{4i,0}^{l-1}(F_{4i,0}^{l-1})], [F_{4i,1}^{l-1}(F_{4i,1}^{l-1})]\}$, $i \in [0, 2^{l-2}], i \in \mathbb{Z}$ | Multiplications for prediction-filters method | Multiplications for LL-LBS method | Reduction in multiplications (%) |
| Level l = 2 | $\{[4\,(4)], [3\,(3)]\}_0$ | 5 N (5 N) | 9.75 N | 48.7 (48.7) |
| Level l = 3 | $\{[5\,(3)], [6\,(4)]\}_0, \{[6\,(4)], [5\,(3)]\}_1$ | 6.625 N (5.125 N) | 13.875 N | 52.3 (63.1) |
| Level l = 4 | $\{[7\,(3)], [6\,(4)]\}_0, \{[6\,(4)], [6\,(4)]\}_1, \{[6\,(4)], [6\,(4)]\}_2, \{[6\,(4)], [7\,(3)]\}_3$ | 8 N (5.9375 N) | 18.4375 N | 56.6 (67.8) |

Note:
In notation F (F), (F) is the number of filter-taps of filter F, with magnitude higher than the thresholds shown in Table VIII for the corresponding level l.

Table VI. Miltiplacation budget for the level-by-level production of the overcomplete representation. Two modes of operation are presented: FO-mode and HFO-mode. The results are presented per decomposition level both for the original and threshold filters. Note: In notation F (F), (F) is the number of filter taps of filter F, with magnatude higher than the thresholds shown in Table VIII for the corresponding level l.

TABLE VII

Comparison of the prediction-filters method with the LL-LBS method with respect to latency, delay and number of filter-kernels (F-Ks) used. A typical case of a 512-sample signal decomposed with the 9/7 filter-pair is presented. The numbers in parenthesis next to the filter-kernels show the maximum number of taps of these units (taking into account the filter symmetries) for every decomposition level.

| Decomposition level (k) | Prediction-filters | | | LL-LBS | | | $L_{LL\text{-}LBS}/L_{P\text{-}Filters}$ |
|---|---|---|---|---|---|---|---|
| | $L_{init,P\text{-}Filters}$ | $L_{P\text{-}Filters}$ | F-Ks | $L_{init,LL\text{-}LBS}$ | $L_{LL\text{-}LBS}$ | F-Ks | |
| 2 | $8a_{PF}$ | $136a_{PF}$ | 10 (5) | $8a_{LBS}$ | $264a_{LBS}$ | 10 (5) | $1.94 \frac{\sigma_{LBS}}{\sigma_{PF}}$ |
| 3 | $9a_{PF}$ | $73a_{PF}$ | 22 (6) | $13a_{LBS}$ | $269a_{LBS}$ | 22 (5) | $3.68 \frac{\sigma_{LBS}}{\sigma_{PF}}$ |
| 4 | $11a_{PF}$ | $43a_{PF}$ | 46 (7) | $18a_{LBS}$ | $274a_{LBS}$ | 46 (5) | $6.37 \frac{\sigma_{LBS}}{\sigma_{PF}}$ |

TABLE VIII

The maximum mean-square error (MMSE) per decomposition level between the results of the original and the thresholded prediction-filters for the grayscale images of the JPEG-2000 test-set. The filters are applied in the row-column manner and the thresholds refer to the filters of the update-structure implementation of every level.

| Decomposition level | Threshold value | MMSE |
| --- | --- | --- |
| 2 | $10^{-3}$ | 0.0 |
| 3 | $10^{-4}$ | 0.03315 |
| 4 | $10^{-5}$ | 0.12034 |

TABLE IX

Average PSNR for the first 48 frames of the football sequence at 30 frames per second.

| | | | | |
| --- | --- | --- | --- | --- |
| 760 Kbps | 29.2 | 27.9 | 27.3 | 26.9 |
| 2.54 Mbps | 34.0 | 34.2 | 33.5 | 33.0 |

*The bit-rate for the motion vectors is not included

APPENDIX I

For the proposition P(1) (equation (1)), the calculated subbands of the first decomposition level, namely subbands $A_0^1$, $D_0^1$ and $A_1^1, D_1^1$, are shown pictorially in FIG. 2. These subbands can be written using $X_0, X_1$ (the polyphase components of X) and the Type I polyphase components of H, G] as:

$$A_0^1 = H_0 X_0 + H_1 X_1, \quad (162)$$

$$D_0^1 = G_0 X_0 + G_1 X_1, \quad (163)$$

and $$A_1^1 = H_1 X_0 + z H_0 X_1, \quad (164)$$

$$D_1^1 = G_1 X_0 + z G_0 X_1. \quad (165)$$

By solving the system of (162), (163) for the polyphase components $X_0, X_1$ we derive:

$$X_0 = \frac{1}{(H_0 G_1 - G_0 H_1)} [G_1 A_0^1 - H_1 D_0^1], \quad (166)$$

$$X_1 = \frac{1}{(H_0 G_1 - G_0 H_1)} [-G_0 A_0^1 + H_0 D_0^1], \quad (167)$$

with Det $= H_0 G_1 - G_0 H_1$ the determinant of the analysis polyphase matrix $\underline{H}_p$ that is expressed in (19). By replacing (166), (167) in equations (164) and (165) the subbands $A_1^1$, $D_1^1$ of the first decomposition level are expressed as:

$$A_1^1 = Det^{-1} \cdot (H_1 G_1 - z H_0 G_0) A_0^1 + Det^{-1} \cdot (z H_0 H_0 - H_1 H_1) D_0^1, \quad (168)$$

$$D_1^1 = Det^{-1} \cdot (G_1 G_1 - z G_0 G_0) A_0^1 + Det^{-1} \cdot (z H_0 G_0 - H_1 G_1) D_0^1, \quad (169)$$

In equations (168), (169) the four filters reported in (17), (18) are shown. In addition equations (168), (169) are found as a special case of (3) for k=1, x=1. Hence they consist the proposition P(1).

For proposition P(2) (equation (2)) the calculated subbands of level 2 are shown pictorially in FIG. 2. Starting from subbands $A_1^2, D_1^2$, if subband $A_{01}$ is assumed as the input signal, then subbands $A_0^2, D_0^2$ and $A_1^2, D_1^2$ can be considered as an one-level overcomplete decomposition of $A_0^1$ (a "fictitious" pyramid). For this "fictitious" pyramid, proposition P(1) is applicable, hence:

$$A_1^2 = F_0^1 A_0^2 + F_1^1 D_0^2, \quad (170)$$

$$D_1^2 = F_2^1 A_0^2 + F_3^1 D_0^2. \quad (171)$$

We perform an inverse wavelet transform in order to calculate $A_0^1$ from subbands $A_0^2, D_0^2$. The result can be seen in equation (26) with k=1. Now that both subbands $A_0^1$ and $D_0^1$ are known, we can apply proposition P(1) to calculate subband $A_1^1$. The result is equation (27) with k=1, x=1. In this case, by the definitions of (8), the "tail" T(k−1,z) is void. With these settings for k,x,T, the procedure to calculate subbands $A_2^2$, $D_2^2$ is described in equations (29)-(60). Furthermore, the procedure to calculate subbands $A_3^2, D_3^2$ follows equations (67)-(74) with the same settings for k,x,T.

APPENDIX II

First some properties of the polyphase components of H and G are shown. Based on these properties, the roof of equations (93)-(98) is straightforward. As shown in the example of Table I, for biorthogonal point-symmetric filters with $Det^{-1} = -1$, G is a linear-phase and H becomes linear phase under a unit translation. These facts are immediately verified fro the perfect reconstruction condition and their mathematical formulation is:

$$G(z) = G(z^{-1}) \Leftrightarrow G(z^{1/2}) = G(z^{-1/2}), \quad (172)$$

$$G(-z) = G(-z^{-1}) \Leftrightarrow G(-z^{1/2}) = G(-z^{-1/2}), \quad (173)$$

$$H(z^{-1}) = z^2 H(z) \Leftrightarrow H(z^{-1/2}) = z \cdot H(z^{1/2}), \quad (174)$$

$$H(-z^{-1}) = z^2 H(-z) \Leftrightarrow H(-z^{-1/2}) = z \cdot H(-z^{1/2}). \quad (175)$$

The Type I polyphase components of H are:

$$H_0(z) = \tfrac{1}{2}(H(z^{1/2}) + H(-z^{1/2})), \quad (176)$$

$$H_1(z) = \tfrac{1}{2} z^{1/2} (H(z^{1/2}) - H(-z^{1/2})), \quad (177)$$

By substituting z with $z^{-1}$ in equation (176) and utilizing equations (174), (175) for components $H(z^{-1/2})$ and $H(-z^{-1/2})$, we get:

$$H_0(z^{-1}) = z \cdot H_0(z). \quad (178)$$

Similarly, by substituting z with $z^{-1}$ in equation (177) and utilizing equations (174), (175) for components $H(z^{-1/2})$ and $H(-z^{-1/2})$, we get:

$$H_1(z^{-1}) = H_1(z). \quad (179)$$

The identical procedure for the Type I polyphase components of G, with the utilization of equations (172), (173) derives the following relations:

$$G_0(z^{-1}) = G_0(z), \quad (180)$$

$$G_1(z^{-1}) = z^{-1} G_1(z), \quad (181)$$

The proof of the equations (93)-(98) is concluded by replacing z with $z^{-1}$ in the form of each filter $F_0^1(z), F_1^1(z)$, $F_2^1(z), F_3^1(z)$ (which is seen in (17), (18)) and replacing the resulting components $G_0(z^{-1}), G_1(z^{-1})$, $H_0(z^{-1}), H_1(z^{-1})$ by equations (178)-(181).

APPENDIX III

From equation (93), the following properties are immediately derived:

$$F_0^1(z^{-1/2}) = z^{-1/2} F_0^1(z^{1/2}), \quad (182)$$

$$F_0^1(-z^{-1/2}) = -z^{-1/2} F_0^1(-z^{1/2}), \quad (183)$$

Using equations (182), (183) and the Type I polyphase components of $F_0^1(z)$ with the replacement of z with $z^{-1}$, we derive:

$$F_{0,0}^1(z^{-1}) = \tfrac{1}{2}(F_0^1(z^{-1/2}) + F_0^1(-z^{-1/2})) \Leftrightarrow F_{0,0}^1(z^{-1}) = \tfrac{1}{2}z^{-1/2}(F_0^1(z^{1/2}) - F_0^1(-z^{1/2})) = z^{-1} F_{0,1}^1(z), \quad (184)$$

$$F_{0,1}^1(z^{-1}) = \tfrac{1}{2}z^{-1/2}(F_0^1(z^{-1/2}) - F_0^1(-z^{-1/2})) \Leftrightarrow F_{0,1}^1(z^{-1}) = \tfrac{1}{2}z^{-1}(F_0^1(z^{1/2}) + F_0^1(-z^{1/2})) = z^{-1} F_{0,0}^1(z). \quad (185)$$

the proof of equations (99)-(102) is concluded by replacing filters $F_4^2(z^{-1}), F_5^2(z^{-1}), F_6^2(z^{-1}), F_7^2(z^{-1})$ from equations (13)-(16) respectively (with k=2 and with the replacement of z with $z^{-1}$) and the replacement of $F_{0,0}^1(z^{-1})$, $F_{0,1}^1(z^{-1})$ and $F_0^1(z^{-1}), F_1^1(z^{-1}), F_2^1(z^{-1}), F_3^1(z^{-1})$ from equations (184), (185) and (93)-(96) respectively Section II contains the preliminary discussion about the LBS method and the introduction to the prediction filter approach. Section III present the proof of the generic formulation of the prediction filters and the proof of their symmetry properties, allowing efficient implementation. Section IV presents the complexity analysis of the prediction-filters algorithm and a comparison with the complexity of the LBS method when both methods operate in a level-by-level manner and are implemented with convolution. The analysis is formalized in the one-dimensional case for the sake of simplicity in the description, but the two-dimensional application of the methods is described as well. Finally section V discusses the presented results.

REFERENCES

[1] G. Karlsson and M. Vetterli, "Three dimensional subband coding of video," in *Proc. ICASSP '88*, vol. 3, pp. 1100-1103.

[2] A. S. Lewis and G. Knowles, "video compression using 3D wavelet transforms," *Electronics Letters*, vol. 26, no. 6, pp. 396-398, Mar. 1990.

[3] J.-R. Ohm: "Three-dimensional subband coding with motion compensation," *IEEE Trans. Image Processing*, vol. 3, no. 5, pp. 559-571, September 1994.

[4] D. Taubman and A. Zakhor, "Multirate 3-D subband coding of video," *IEEE Trans. Image Proc.*, vol. 3, pp. 572-588, September 1994.

[5] B.-J. Kim, Z. Xiong and W. A. Pearlman, "Low bit-rate scalable video coding with 3-D Set Partitioning in Hierarchical Trees (3-D SPIHT)," *IEEE Trans. Circuits Syst. Video Technol.*, vol. 10, no. 8, pp. 1374-1387, December 2000.

[6] V. Bottreau, M. Benetiere M, B. Felts, B. Pesquet-Popescu, "A fully scalable 3D subband video codec," in *Proc. ICIP '01*, vol. 2, pp. 1017-1020.

[7] A. Said and W. A. Pearlman, "A new fast and efficient image codec based on Set Partitioning in Hierarchical Trees," *IEEE Trans. Circuits Syst. Video Technol.*, vol. 6, no. 3, pp. 243-250, June 1996.

[8] A. Munteanu, J. Cornelis, G. Van der Auwera and P. Cristea, "Wavelet-based lossless compression scheme with progressive transmission capability," *Int. J. Imaging Syst. Technol.*, John Wiley & Sons, vol. 10, no. 1, pp. 76-85, January 1999.

[9] D. Taubman, "High Performance Scalable Image Compression with EBCOT," *IEEE Trans. Image Proc.*, vol. 9, no 7, pp. 1158-1170, July 2000.

[10] P. J. Tourtier, M. Pécot and J.-F. Vial, "Motion compensated subband coding schemes for compatible High Definition TV coding," *Signal Proc.: Image Commmun.*, vol. 4, pp. 325-344, 1992.

[11] S. J. Choi and J. W. Woods "Motion-compensated 3-D subband coding of Video", IEEE Trans. Image Proc., vol. 8, pp. 155-167, February 1999.

[12] P. J. Tourtier, M. Pecot and J. F. Vial, "Motion-compensated subband coding schemes for compatible high definition TV coding", Signal Proc.: Image Commmun., vol. 4, pp. 325-344, 1992.

[13] G. Van der Auwera. A. Munteanu, G. Lafruit, and J. Cornelis, "Video Coding Based on Motion Estimation in the Wavelet Detail Images," in *Proc. ICASSP-98*, pp. 2801-2804.

[14] H. W. Park and H. S. Kim, "Motion estimation using Low-Band-Shift method for wavelet-based moving-picture coding," *IEEE Trans. Image Proc.*, vol. 9, no. 4, pp. 577-587, April 2000.

[15] K. Sivaramakrishnan and T. Nguyen, "A uniform transform domain video codec based on Dual Tree Complex Wavelet Transform," in *Proc. ICCASSP '01*, vol. 3, pp. 1821-1824.

[16] H. Sari-Sarraf and D. Brzakovic, "A Shift-Invariant Discrete Wavelet Transform," *IEEE Trans. Signal Proc.*, vol. 45, no. 10, pp. 2621-2626, October 1997.

[17] G. Strang and T. Nguyen, *Wavelets and Filer Banks*. Wellesley-Cambridge Press, 1996.

[18] N. G. Kingsbury, "Shift invariant properties of Dual-Tree Complex Wavelet Transform ", in *Proc. ICASP '99*, vol. 3, pp. 1221-1224.

[19] I. W. Selesnick, "Hilbert transform pairs of wavelet bases," *Signal Proc. Letters*, vol. 8, no. 6, pp 170-173, June 2001.

[20] G. Strang and T. Nguyen, *Wavelets and Filer Banks*. Wellesley-Cambridge Press, 1996.

[21] J. Kovačević and Martin Vetterli, "Nonseparable Multidimensional Perfect Reconstruction Filter Banks and Wavelet Bases for $R^n$," *IEEE Trans. Inform. Theory*, vol. 38, pp 553-555, no. March 1992.

What is claimed is:

1. A method of digital encoding or decoding a video bit stream, the bit stream comprising a representation of a sequence of n-dimensional data structures, the method comprising:

providing a set of one or more subsampled subbands forming a multilevel subband transform of one data structure of the sequence; and after providing the set, inputting at least a part of the set to at least one digital filter so as to generate a further set of one or more subbands of a shifted version of said data structure, wherein said shifted version of said data structure is at least one of temporally shifted and spatially shifted in a video frame, and wherein the further set is generated based on the provided set, and the further set has at least one subsampled subband that is not included in the one or more subsampled subbands of the provided set.

2. The method according to claim 1, further comprising mapping at least a part of the data of one data structure of the sequence within predefined similarity criteria to at least a part of the data of another data structure of the sequence.

3. The method according to claim 1, wherein applying at least one digital filter includes applying the digital filter only to members of the set of subsampled subbands of the transform of the data structure.

4. The method according to claim 1, wherein the digital filter is characterized by at least two non-zero values.

5. The method according to claim 4, wherein the part of the data of one data structure comprises one block.

6. The method according to claim 1, wherein the digital subband transform comprises a wavelet.

7. The method according to claim 1, wherein the data structures comprise data frames and the set of subsampled subbands of the transform of the data structure define a reference frame.

8. The method according to claim 1, wherein the generation of the further set of one or more further subbands is performed in a level-by-level manner, wherein each level is a level of a subband pyramid containing the subbands of the subband transform.

9. The method of claim 1, wherein the digital filter generates the further set of one or more subbands at a single rate.

10. The method according to claim 1, further comprising transforming a video bit stream into the multilevel subband transform.

11. The method according to claim 1, further comprising, prior to inputting the at least part of the set to the at least one digital filter, selecting a set of one or more subsampled subbands of a shifted version of said data structure to be generated.

12. The method according to claim 11, further comprising prior to inputting the at least part of the set to the at least one digital filter, selecting an unneeded set of one or more subsampled subbands of a shifted version of said data structure to not be generated.

13. A computer readable medium comprising executable machine readable code which, when executed performs digital filtering to at least a part of a previously received set of subsampled subbands forming a multilevel subband transform of a video data structure to generate a further set of one or more subbands of a shifted version of said data structure, wherein said shifted version of said data structure is at least one of temporally shifted and spatially shifted in a video frame, and wherein the further set is generated based on the previously received set, and the further set has at least one subsampled subband that is not included the one or more subsampled subbands of the received set.

14. The method of claim 13, wherein the digital filtering generates the further set of one or more subbands at a single rate.

15. A method of digital encoding or decoding a video bit stream, the bit stream comprising a representation of a sequence of n-dimensional data structures, the method comprising:
receiving one or more subsampled subbands of an overcomplete representation of the data structure, the overcomplete representation comprising a shifted version of the data structure, wherein said shifted version of said data structure is at least one of temporally shifted and spatially shifted in a video frame, and the subsampled subbands forming a multilevel subband transform of at least one data structure of the sequence; and
after receiving the subbands, applying at least one digital filter to at least one of the one or more subsampled subbands to generate an additional one or more subbands of the overcomplete representation of the data structure, wherein the digital filter generates the additional one or more subbands at a single rate, and the additional one or more subbands are at the same level as the received one or more subsampled subbands, and wherein the additional subbands are generated based on the received subbands, and the further set has at least one subsampled subband that is not included in the one or more subsampled subbands of the received set.

16. The method according to claim 15, wherein the generation of the additional one or more subbands is performed according to a level-by-level method.

17. An apparatus for encoding or decoding a digital bit stream, the bit stream comprising a representation of a sequence of n-dimensional video data structures, the method comprising:
means for receiving a set of one or more subsampled subbands forming a multilevel subband transform of one data structure of the sequence; and
means for after receiving the set, generating a further set of one or more subbands of a shifted version of said data structure based at least in part on at least a part of the set of one or more subsampled subbands, wherein said shifted version of said data structure is at least one of temporally shifted and spatially shifted in a video frame, and wherein the further set is generated based on the received set, and the further set has at least one subsampled subband that is not included in the one or more subsampled subbands of the received set.

18. The method according to claim 17, wherein the means for generating is configured to generate the further set of one or more subbands according to a level-by-level method.

19. The method according to claim 17, wherein the means for generating is configured to generate the further set of one or more subbands at the same level as the received one or more subsampled subbands.

20. A method of digital encoding or decoding a video bit stream, the bit stream comprising a representation of a sequence of n-dimensional data structures, the method comprising:
transforming a video bit stream into a multilevel subband transform of one data structure of the sequence; and
after the transforming, applying at least one digital filter to the set of subsampled subbands of the data structure to generate a further set of one or more subbands of a shifted version of said data structure, wherein said shifted version of said data structure is at least one of temporally shifted and spatially shifted in a video frame, and the further set has at least one subsampled subband that is not included in the one or more subsampled subbands of the video stream.

21. A method of digital encoding or decoding a video bit stream, the bit stream comprising a representation of a sequence of n-dimensional data structures, the method comprising:
providing a set of one or more subsampled subbands forming a multilevel subband transform of one data structure of the sequence;
after providing the set, inputting a part of the set to at least one digital filter so as to generate a further set of one or more subbands of a shifted version of said data structure, wherein said shifted version of said data structure is at least one of temporally shifted and spatially shifted in a video frame, and wherein the further set is generated based on the provided set, and the further set has at least one subsampled subband that is not included in the one or more subsampled subbands of the provided set; and
providing the further set to a motion compensation module configured to perform motion compensation; and
generating a motion compensated video frame with the further set of subbands.

* * * * *